US010199000B2

(12) United States Patent
Shiibayashi et al.

(10) Patent No.: US 10,199,000 B2
(45) Date of Patent: Feb. 5, 2019

(54) SOURCE DRIVER IC CHIP

(71) Applicant: LAPIS Semiconductor Co., Ltd., Yokohama (JP)

(72) Inventors: Kenichi Shiibayashi, Yokohama (JP); Koji Higuchi, Yokohama (JP); Atsushi Hirama, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 15/395,089

(22) Filed: Dec. 30, 2016

(65) Prior Publication Data

US 2017/0110067 A1 Apr. 20, 2017

Related U.S. Application Data

(63) Continuation of application No. 15/194,003, filed on Jun. 27, 2016, now Pat. No. 9,570,011, which is a (Continued)

(30) Foreign Application Priority Data

Sep. 27, 2012 (JP) ................................ 2012-214492
Sep. 27, 2012 (JP) ................................ 2012-214493

(Continued)

(51) Int. Cl.

*G09G 3/36* (2006.01)
*G06F 3/038* (2013.01)

(Continued)

(52) U.S. Cl.

CPC ......... *G09G 3/3406* (2013.01); *G09G 3/3258* (2013.01); *G09G 3/3266* (2013.01);

(Continued)

(58) Field of Classification Search

CPC ......... G09G 2310/08; G09G 2330/021; G09G 3/3648

See application file for complete search history.

(56) References Cited

U.S. PATENT DOCUMENTS 9,099,026 B2 8/2015 Shiibayashi et al.
2004/0080521 A1 4/2004 Nose et al.

(Continued)

FOREIGN PATENT DOCUMENTS

JP H06-120222 A 4/1994
JP 2001-013478 A 1/2001

(Continued)

OTHER PUBLICATIONS

An Office Action; "Notice of Rejection," issued by the Japanese Patent Office dated Jun. 14, 2016, which corresponds to Japanese Patent Application No. 2012-214495 and is related to U.S. Appl. No. 15/194,003; with English language translation.

*Primary Examiner* — Nan-Ying Yang

(74) *Attorney, Agent, or Firm* — Studebaker & Brackett PC

(57) ABSTRACT

A source driver IC chip, designed to prevent flicker in images displayed on a display panel while suppressing power consumption and heat generation, includes: a reference gradation voltage generating part (220) configured to generate a reference gradation voltage based on a first or second gamma characteristic of the display panel, using first and second power supply voltages (VH) and (VL) inputted through first and second external terminals (PA2, PA3); and a third external terminal (PA4) for externally outputting said reference gradation voltage. The source driver IC chip further includes first and second gradation voltage generating parts configured to generate first and second gradation voltages respectively, using a reference gradation voltage based on a first gamma characteristic inputted through a (Continued)

fourth external terminal and a reference gradation voltage having a second gamma characteristic inputted through a fifth external terminal respectively.

6 Claims, 29 Drawing Sheets

Related U.S. Application Data continuation of application No. 14/743,890, filed on Jun. 18, 2015, now Pat. No. 9,406,279, which is a continuation of application No. 14/034,408, filed on Sep. 23, 2013, now Pat. No. 9,099,026.

(30) Foreign Application Priority Data

Sep. 27, 2012 (JP) ................................. 2012-214494
Sep. 27, 2012 (JP) ................................. 2012-214495

(51) Int. Cl.

| | |
|---|---|
| ***G09G 5/00*** | (2006.01) |
| ***G09G 5/10*** | (2006.01) |
| ***G09G 3/34*** | (2006.01) |
| ***G09G 3/3266*** | (2016.01) |
| ***G09G 3/3258*** | (2016.01) |

(52) U.S. Cl.

CPC ......... *G09G 3/3614* (2013.01); *G09G 3/3648* (2013.01); *G09G 3/3666* (2013.01); *G09G 3/3674* (2013.01); *G09G 3/3685* (2013.01); *G09G 3/3696* (2013.01); *G09G 5/10* (2013.01); *G09G 2300/04* (2013.01); *G09G 2310/027* (2013.01); *G09G 2310/0286* (2013.01); *G09G 2310/0291* (2013.01); *G09G 2310/0297* (2013.01); *G09G 2310/08* (2013.01); *G09G 2320/0247* (2013.01); *G09G 2320/0276* (2013.01); *G09G 2320/0626* (2013.01); *G09G 2320/0666* (2013.01); *G09G 2330/021* (2013.01); *G09G 2370/08* (2013.01)

(56) References Cited

U.S. PATENT DOCUMENTS

| | | | | |
|---|---|---|---|---|
| 2006/0170639 | A1* | 8/2006 | Kawaguchi ............ | G09G 3/342 345/98 |
| 2007/0070005 | A1 | 3/2007 | Okamura | |
| 2007/0126722 | A1 | 6/2007 | Hashimoto | |
| 2007/0205974 | A1 | 9/2007 | Iizuka et al. | |
| 2007/0206126 | A1* | 9/2007 | Lin ................... | G02F 1/136259 349/54 |
| 2007/0222743 | A1* | 9/2007 | Hirakata .............. | G09G 3/3413 345/102 |
| 2008/0252632 | A1 | 10/2008 | Im et al. | |
| 2009/0109247 | A1 | 4/2009 | Kimura | |
| 2009/0153534 | A1 | 6/2009 | Yokota et al. | |
| 2009/0213576 | A1 | 8/2009 | Chang et al. | |
| 2009/0243995 | A1 | 10/2009 | Kimura | |
| 2009/0284909 | A1* | 11/2009 | Liu ....................... | G02F 1/1345 361/679.21 |
| 2011/0007057 | A1 | 1/2011 | Fukuo | |
| 2011/0050749 | A1 | 3/2011 | Park | |
| 2011/0069091 | A1 | 3/2011 | Kim et al. | |
| 2011/0141098 | A1 | 6/2011 | Yaguma et al. | |
| 2011/0193848 | A1 | 8/2011 | Kojima | |
| 2012/0280954 | A1 | 11/2012 | Tomioka et al. | |
| 2013/0016087 | A1 | 1/2013 | Kishikawa | |
| 2013/0127930 | A1 | 5/2013 | Nishio | |
| 2013/0321384 | A1 | 12/2013 | Tsuchiya et al. | |
| 2013/0342520 | A1 | 12/2013 | Tsuchi | |

FOREIGN PATENT DOCUMENTS

| | | | |
|---|---|---|---|
| JP | 2005-345808 | A | 12/2005 |
| JP | 2009-015049 | A | 1/2009 |
| JP | 2009-015166 | A | 1/2009 |

* cited by examiner

SOURCE DRIVER IC CHIP

CROSS REFERENCE TO RELATED APPLICATIONS

This application is a Continuation of U.S. application Ser. No. 15/194,003 filed Jun. 27, 2016, which is a Continuation of U.S. application Ser. No. 14/743,890 filed Jun. 18, 2015, now U.S. Pat. No. 9,406,279, which is a Continuation of U.S. application Ser. No. 14/034,408 filed Sep. 23, 2013, now U.S. Pat. No. 9,099,026, which claims benefit of priority to Japanese Patent Application No. 2012-214492 filed Sep. 27, 2012, Japanese Patent Application No. 2012-214493 filed Sep. 27, 2012, Japanese Patent Application No. 2012-214494 filed Sep. 27, 2012 and Japanese Patent Application No. 2012-214495 filed Sep. 27, 2012, the entire content of each of which is incorporated herein by reference.

BACKGROUND OF THE INVENTION

1. Technical Field

The present invention relates to driver ICs which drive display panels and, more particularly, to a source driver IC chip which applies to each of source lines of a display panel a gradation voltage corresponding to a brightness level represented by an input video signal.

2. Description of the Related Art

Flat display panels, such as liquid crystal display panels and organic electroluminescent display panels, have a plurality of scanning lines and source lines. Each of the scanning lines is arranged to extend in a horizontal direction of a two-dimensional screen and each of the source lines is arranged to extend in a vertical direction of the two-dimensional screen. Such a display panel is mounted on a glass or film shaped substrate. Furthermore, in a peripheral region of such a display panel mounted on a substrate, a source driver is mounted which generates gradation voltages corresponding to brightness levels represented by an input video signal, and applies driving pulses corresponding to the gradation voltages to the respective source lines of the display panel.

As such a source driver, a source driver is known which includes a gradation voltage generating circuit which generates a plurality of gradation voltages as described above (see, for example, FIGS. 2 and 3 of Japanese Patent Application Laid-Open No. 2009-15166). This gradation voltage generating circuit is configured to generate gradation voltages ($V_1$ to $V_n$) by amplifying a plurality of externally supplied reference gradation voltages ($V_{E1}$ to $V_{Em}$) in operational amplifiers (23$_1$ to 23$_m$) respectively and applying the amplified voltages to respective input taps of a resistance ladder (24) respectively.

Recently, a source driver is also known which is divided into a plurality of source driver IC chips (hereinafter sometimes referred to simply as “a chip” or “chips”) disposed on a periphery of a display panel, so as to cope with increase in number of source lines associated with enhancement in image resolution of a display screen (see, e.g., FIG. 3 of Japanese Patent Application Laid-Open No. 2009-15166 or FIG. 3 of Japanese Patent Application Laid-Open No. 2001-013478).

However, when a configuration is adopted that a source driver is divided into a plurality of source driver IC chips, variation in offset voltages among respective operational amplifiers of the source driver IC chips results in variation in gradation voltages among the source driver IC chips, which causes a problem of flicker in the images displayed on the display panel.

Incorporation of the above-described gradation voltage generating circuits into the respective source driver IC chips eliminates the need of external circuits and achieves cost reduction. However, a problem is that the chip size of the source driver IC chips is increased by an amount corresponding to the gradation voltage generating circuits incorporated, and it leads to increases in power consumption and heat generation.

SUMMARY OF THE INVENTION

The present invention has been made to solve the above-described problem, and an object of the present invention is to provide a low power consumption and low heat generation source driver IC chip which can prevent flicker in images displayed on a display panel.

A source driver IC chip in accordance with the present invention is a source driver IC chip configured to apply a driving pulse having a first gradation voltage based on a first gamma characteristic and a driving pulse having a second gradation voltage based on a second gamma characteristic to respective source lines formed on a display panel in response to a video signal. The source driver IC chip includes: a first external terminal for receiving a first power supply voltage; a second external terminal for receiving a second power supply voltage; a reference gradation voltage generating part configured to generate a reference gradation voltage based on said first gamma characteristic or a reference gradation voltage based on said second gamma characteristic based on said first power supply voltage inputted through said first external terminal and said second power supply voltage inputted through said second external terminal; a third external terminal for externally outputting said reference gradation voltage generated in said reference gradation voltage generating part; a fourth external terminal for receiving the first reference gradation voltage based on said first gamma characteristic; a fifth external terminal for receiving the second reference gradation voltage based on said second gamma characteristic; a first gradation voltage generating part configured to generate said first gradation voltage based on said first reference gradation voltage inputted through said fourth external terminal; and a second gradation voltage generating part configured to generate said second gradation voltage based on said second reference gradation voltage inputted through said fifth external terminal.

In accordance with the present invention, when the first gradation voltage is generated on the basis of the reference gradation voltage based on the first gamma characteristic of the display panel, and the second gradation voltage is generated on the basis of the reference gradation voltage based on the second gamma characteristic of the display panel, only a reference gradation voltage based on one of the gamma characteristics is generated and outputted to the outside. The chips obtain this reference gradation voltage based on one of the gamma characteristics and the reference gradation voltage based on the other of the gamma characteristics through external input.

In the configuration that the source driver is divided into a plurality of source drivers, for example, a first source driver IC chip generates only the reference gradation voltage based on the first gamma characteristic out of the first and second gamma characteristics and externally outputs the generated reference gradation voltage, and a second source driver IC chip generates only the reference gradation voltage based on the second gamma characteristic and externally outputs the generated reference gradation voltage. Thus, it becomes possible for the first source driver IC chip to generate the first gradation voltage by receiving the reference gradation voltage based on the first gamma characteristic outputted by the first source driver IC chip itself, and to generate the second gradation voltage by receiving the reference gradation voltage based on the second gamma characteristic outputted by the second source driver IC chip. Likewise, it becomes possible for the second source driver IC chip to generate the second gradation voltage by receiving the reference gradation voltage based on the second gamma characteristic outputted by the second source driver IC chip itself, and to generate the first gradation voltage by receiving the reference gradation voltage based on the first gamma characteristic outputted by the first source driver IC chip.

In short, the present invention allows the reference gradation voltage generated in the reference gradation voltage generating part mounted on one of the source driver IC chips to be used commonly by all of the source driver IC chips.

Thus, the present invention requires only one set of operational amplifiers where normally two sets of operational amplifiers must be mounted, one for generating reference gradation voltages based on a first gamma characteristic and the other for generating reference gradation voltages based on a second gamma characteristic.

Therefore, according to the present invention, it becomes possible to reduce the size, power consumption and heat generation of the chip by amounts corresponding to the number of eliminated ones of amplifiers mounted on each source driver IC chip for the generation of reference gradation voltages.

Furthermore, the present invention allows reference gradation voltages generated in a reference gradation voltage generating part mounted on one of the source driver IC chips to be used commonly by all of the source driver IC chips, and thus, even if offset voltages of the operational amplifiers described above vary among the source driver IC chips, reference gradation voltages will not be affected by this within the respective gamma characteristics. Thus, flicker in the image displayed on the display panel can be prevented.

BRIEF DESCRIPTION OF THE DRAWINGS

FIGS. 8A to 8C are views showing an example of a connecting arrangement to connect a chip 3 placed on a display substrate 2 in the form of COG with a control substrate 1 via FPC 4, in which FIG. 8A shows the chip 3, FIG. 8B shows the control substrate 1 and display substrate 2 connected via the FPC 4, and FIG. 8C shows a cross-sectional view of the control substrate 1;

FIGS. 13A and 13B are views showing an example of the connecting arrangement to connect a chip 3 placed on a film substrate 7 in the form of COF (Chip On Film) with a control substrate 1 via an FPC 8, in which FIG. 13A shows the chip 3 and FIG. 13B shows the control substrate 1 and film substrate 7 connected via the FPC 8;

FIGS. 22A to 22C are views showing an example of the connecting arrangement to connect a chip 3 placed on the display substrate 6 in the form of COG with a control substrate 5 via FPC 4, in which FIG. 22A shows the chip 3, FIG. 22B shows the control substrate 5 and display substrate 6 connected via the FPC 4, and FIG. 22C shows a cross-sectional view of the control substrate 5;

DETAILED DESCRIPTION OF THE PREFERRED EMBODIMENTS

The present invention is a source driver IC chip configured to apply a driving pulse having a first gradation voltage based on a first gamma characteristic and a driving pulse having a second gradation voltage based on a second gamma characteristic to source lines of a display panel in response to a video signal. The source driver IC chip includes a reference gradation voltage generating part (220, 620) configured to generate reference gradation voltages based on a first or second gamma characteristic of a display panel based on a first power supply voltage (VH) inputted through a first external terminal (PA2) and a second gradation voltage (VL) inputted through a second external terminal (PA3), and a third external terminal (PA4) for externally outputting the generated reference gradation voltage. The source driver IC chip further includes a first gradation voltage generating part configured to generate the first gradation voltage based on the reference gradation voltage based on the first gamma characteristic inputted through a fourth external terminal, and a second gradation voltage generating part configured to generate the second gradation voltage based on the reference gradation voltage based on the second gamma characteristic inputted through a fifth external terminal.

Figure 1:
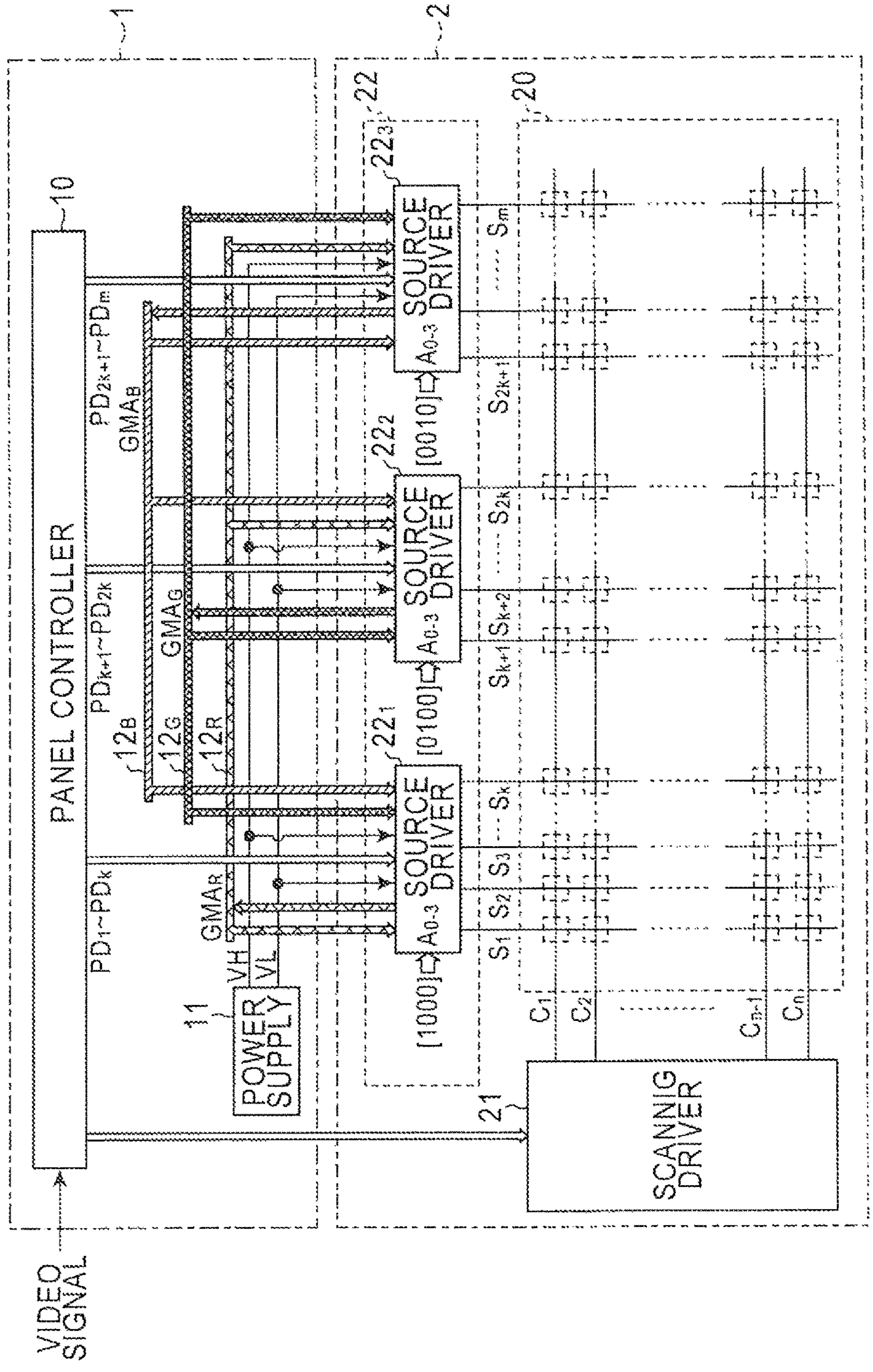
FIG. 1 is a diagram schematically showing the configuration of an organic electroluminecent display device having thereon a source driver in accordance with the present invention.

FIG. 1 is a diagram schematically showing the configuration of an organic electroluminescent display device having a source driver in accordance with the present invention.

In FIG. 1, a control substrate 1 is provided with a panel controller 10 and a power supply circuit 11, each of which is constituted by a separate IC chip.

A display substrate 2 has on its surface a display panel 20 as an organic electroluminescent panel, a scanning driver 21 and a source driver 22. The display substrate 2 is made of a film substrate or a glass substrate. The display panel 20 has n scanning lines $C_1$ to $C_n$ (n is a natural number greater than or equal to 2) each extending in a horizontal direction of a two-dimensional screen and source lines $S_1$ to $S_m$ (m is a natural number greater than or equal to 2) each extending in a vertical direction of the two-dimensional screen, and at respective intersections of the scanning lines C and source lines S organic EL (electroluminescent) cells carrying pixels are formed.

The power supply circuit 11 formed on the control substrate 1 generates a power supply voltage VH of a high potential side and a power supply voltage VL of a low potential side for the generation of a reference gradation voltage (described later), and supplies the generated voltages to the source driver 22. The panel controller 10 formed on the control substrate 1 generates a scanning control signal which causes the scanning lines $C_1$ to $C_n$ of the display panel 20 to be selected sequentially and alternatively in response to an input video signal, and supplies this signal to the scanning driver 21 provided on the display substrate 2. The scanning driver 21 sequentially and alternatively applies a scanning pulse to the scanning lines $C_1$ to $C_n$ of the display panel 20 in response to the scanning control signal. The panel controller 10 also generates pixel data PD representing brightness levels of the respective pixels in response to an input video signal. Every time m pixel data $PD_1$ to $PD_m$ for a display line are generated, the panel controller 10 divides the generated pixel data $PD_1$ to $PD_m$ into three divided-pixel-data series $PD_1$ to $PD_k$ (k=m/3), $PD_{k+1}$ to $PD_{2k}$, and $PD_{2k+1}$ to $PD_m$. The panel controller 10 separately supplies to the source driver 22 the three groups of divided-pixel-data series, $PD_1$ tp $PD_k$, $PD_{k+1}$ to $PD_{2k}$, and $PD_{2k+1}$ tp $PD_m$. The control substrate 1 further has printed wiring of a reference gradation voltage supply line group $\mathbf{12}_R$ for supplying a red reference gradation voltage group $GMA_R$ (described later), a reference gradation voltage supply line group $\mathbf{12}_G$ for supplying a green reference gradation voltage group $GMA_G$ (described later), and a reference gradation voltage supply line group $\mathbf{12}_B$ for supplying a blue reference gradation voltage group $GMA_B$ (described later). The respective wiring of the reference gradation voltage supply line groups $\mathbf{12}_R$, $\mathbf{12}_G$ and $\mathbf{12}_B$ are printed on the control substrate 1 to extend in a horizontal direction of a screen of the display panel 20.

The scanning control signal, pixel data $PD_1$ to $PD_m$ and power supply voltages VH, VL generated in the control substrate 1 as described above are supplied to the display substrate 2 through FPC (Flexible Printed Circuits) described later. The respective wiring of the reference gradation voltage supply line groups $\mathbf{12}_R$, $\mathbf{12}_G$ and $\mathbf{12}_B$ printed on the control substrate 1 are also connected to the display substrate 2 through the FPC.

As shown in FIG. 1, the source driver 22 provided on a surface of the display substrate 2 is divided into three source drivers $\mathbf{22}_1$ to $\mathbf{22}_3$, each of which is made of a source driver IC chip formed on an independent rectangular silicon substrate.

The source driver $\mathbf{22}_1$ receives divided-pixel-data series $PD_1$ to $PD_k$ supplied from the panel controller 10 sequentially for the respective pixels, generates k driving pulses (described later) having gradation voltages corresponding to brightness levels represented by the respective pixel data PD, and applies the generated driving pulses to the respective source lines $S_1$ to $S_k$ of the display panel 20. The source driver $\mathbf{22}_2$ receives divided-pixel-data series $PD_{k+1}$ to $PD_{2k}$ supplied from the panel controller 10 sequentially for the respective pixels, generates k driving pulses having gradation voltages corresponding to brightness levels represented by the respective pixel data PD, and applies the generated driving pulses to the respective source lines $S_{k+1}$ to $S_{2k}$ of the display panel 20. The source driver $\mathbf{22}_3$ receives divided-pixel-data series $PD_{2k+1}$ to $PD_m$ supplied from the panel controller 10 sequentially for the respective pixels, generates k driving pulses having gradation voltages corresponding to brightness levels represented by the respective pixel data PD, and applies the generated driving pulses to the respective source lines $S_{2k+1}$ to $S_m$ of the display panel 20.

Figure 2:
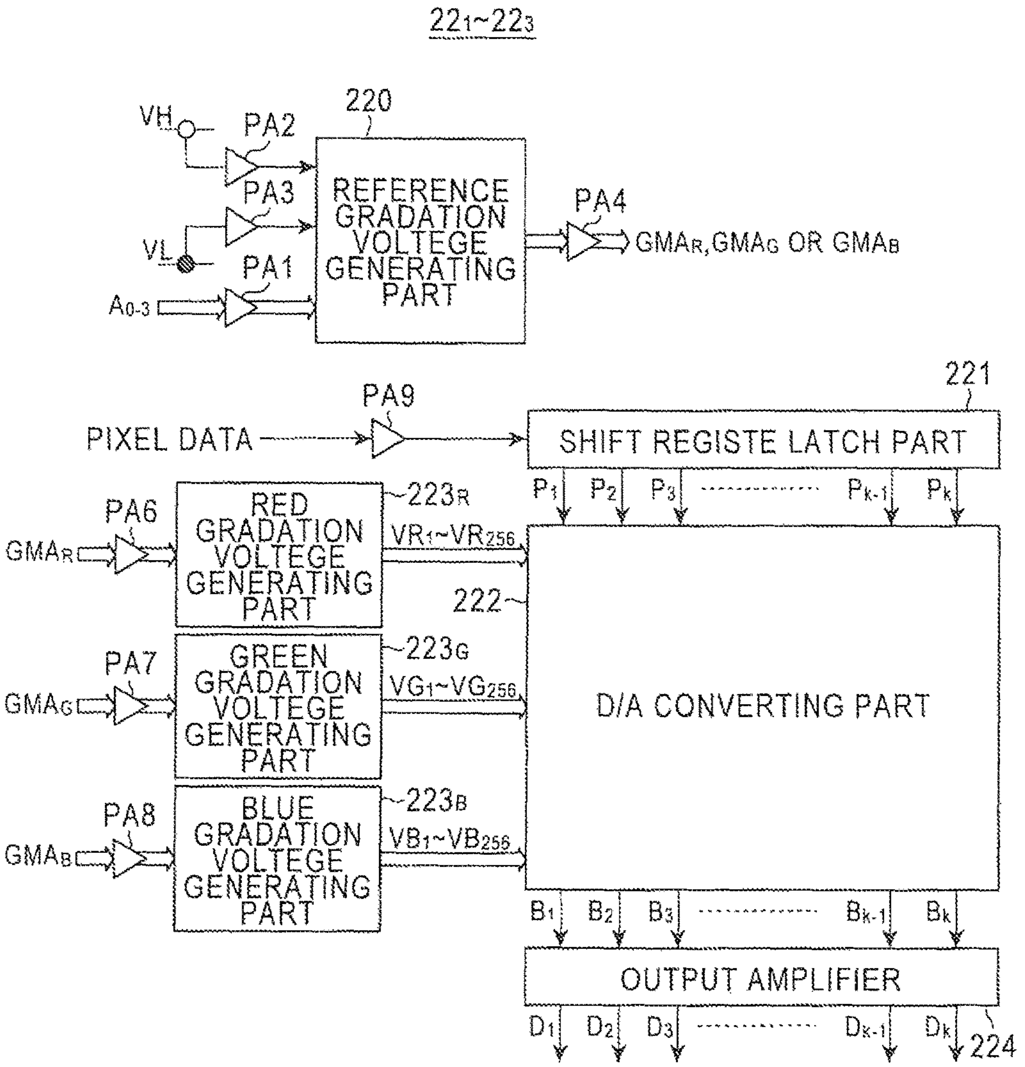
FIG. 2 is a block diagram showing the internal configuration of each of source drivers $\mathbf{22}_1$ to $\mathbf{22}_3$.

Each of the source drivers $\mathbf{22}_1$ to $\mathbf{22}_3$ has the same internal configuration as shown in FIG. 2. Hereinafter, connecting parts, such as external terminals, relay terminals, and input or output buffers, are referred to as "pads."

In FIG. 2, the reference gradation voltage generating part 220 generates, based on the power supply voltage VH inputted through the power supply pad PA2 and the power supply voltage VL inputted through the power supply pad PA3, reference gradation voltages $\mathbf{V1}_R$ to $\mathbf{V9}_R$ for red pixels, reference gradation voltages $\mathbf{V1}_G$ to $\mathbf{V9}_G$ for green pixels, and reference gradation voltages $\mathbf{V1}_B$ to $\mathbf{V9}_B$ for blue pixels, each of which reference gradation voltages includes nine kinds of voltages. Here, the reference gradation voltage generating part 220 selects one voltage group out of the reference gradation voltages $V1_R$ to $V9_R$, $V1_G$ to $V9_G$, $V1_B$ to $V9_B$ based on an address $A_{0-3}$ inputted through a pad group PAL When the reference gradation voltage generating part 220 selects the reference gradation voltages $V1_R$ to $V9_R$, the part 220 outputs to the outside of the chip through a pad group 4 a red reference gradation voltage group $GMA_R$ obtained by individually amplifying the respective reference gradation voltages $V1_R$ to $V9_R$ selected. When the reference gradation voltage generating part 220 selects the reference gradation voltages $V1_G$ to $V9_G$, the part 220 outputs to the outside of the chip through the pad group 4 a green reference gradation voltage group $GMA_G$ obtained by individually amplifying the respective reference gradation voltages $V1_G$ to $V9_G$ selected. When the reference gradation voltage generating part 220 selects the reference gradation voltages $V1_B$ to $V9_B$, the part 220 outputs to the outside of the chip through the pad group 4 a blue reference gradation voltage group $GMA_B$ obtained by individually amplifying the respective reference gradation voltages $V1_B$ to $V9_B$ selected.

Figure 3:
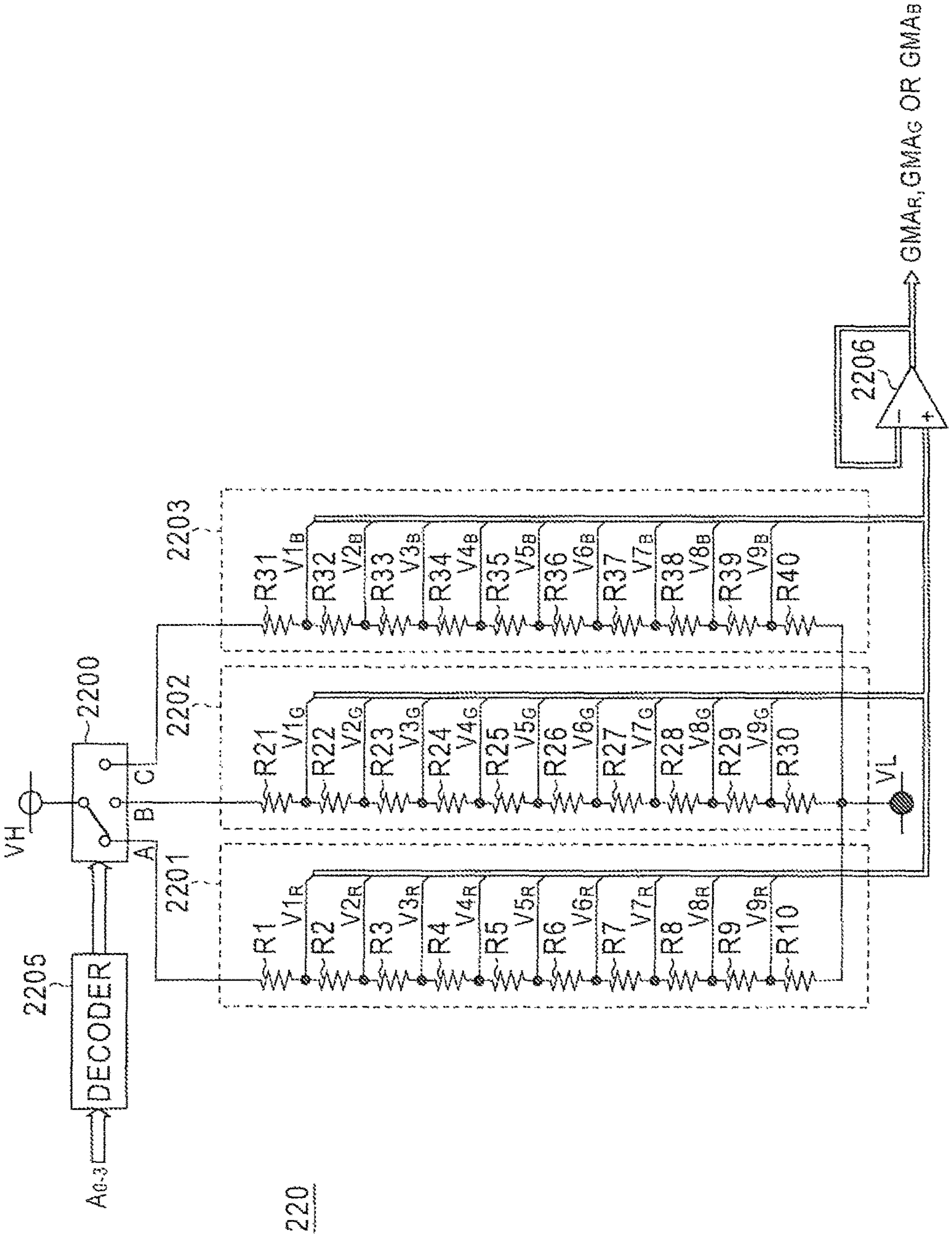
FIG. 3 is a circuit diagram showing an example of the internal configuration of a reference gradation voltage generating part 220.

FIG. 3 is a circuit diagram showing an example of the internal configuration of the reference gradation voltage generating part 220.

In FIG. 3, a voltage-dividing resistor circuit 2201 has ten resistors R1 to R10 serially connected. To one end of the resistor R1 of the voltage-dividing resistor circuit 2201 an output terminal A of a demultiplexer 2200 is connected, and to one end of the resistor R10 of the voltage-dividing resistor circuit 2201 the power supply voltage VL is fixedly supplied. When the power supply voltage VH is supplied to the end of the resistor R1 of the voltage-dividing resistor circuit 2201 through the demultiplexer 2200, the reference gradation voltages $V1_R$ to $V9_R$ having voltages based on a gamma characteristic for red pixels are generated from respective connection points between the respective adjacent twos of the resistors R1 to R10.

A voltage-dividing resistor circuit 2202 has ten resistors R21 to R30 serially connected. To one end of the resistor R21 of the voltage-dividing resistor circuit 2202 an output terminal B of the demultiplexer 2200 is connected, and to one end of the resistor R30 of the voltage-dividing resistor circuit 2202 the power supply voltage VL is fixedly supplied. When the power supply voltage VH is supplied to the end of the resistor R21 of the voltage-dividing resistor circuit 2202 through the demultiplexer 2200, the reference gradation voltages $V1_G$ to $V9_G$ having voltages based on a gamma characteristic for green pixels are generated from respective connection points between the respective adjacent twos of the resistors R21 to R30.

A voltage-dividing resistor circuit 2203 has ten resistors R31 to R40 serially connected. To one end of the resistor R31 of the voltage-dividing resistor circuit 2203 an output terminal C of the demultiplexer 2200 is connected, and to one end of the resistor R40 of the voltage-dividing resistor circuit 2203 the power supply voltage VL is fixedly supplied. When the power supply voltage VH is supplied to the end of the resistor R31 of the voltage-dividing resistor circuit 2203 through the demultiplexer 2200, the reference gradation voltages $V1_B$ to $V9_B$ having voltages based on a gamma characteristic for blue pixels are generated from respective connection points between the respective adjacent twos of the resistors R31 to R40.

When the address $A_{0-3}$ is [1000], a decoder 2205 generates a selection signal SEL which causes the reference gradation voltages for red pixels to be generated, and supplies the selection signal to the demultiplexer 2200. When the address $A_{0-3}$ is [0100], the decoder 2205 generates a selection signal SEL which causes the reference gradation voltages for green pixels to be generated, and supplies the selection signal to the demultiplexer 2200. When the address $A_{0-3}$ is [0010], the decoder 2205 generates a selection signal SEL which causes the reference gradation voltages for blue pixels to be generated, and supplies the selection signal to the demultiplexer 2200.

When the selection signal SEL which causes the reference gradation voltages for red pixels to be generated is supplied to the demultiplexer 2200, the demultiplexer 2200 supplies the power supply voltage VH only to the circuit 2201 out of the voltage-dividing resistor circuits 2201 to 2203 through the output terminal A. Thus, the reference gradation voltages $V1_R$ to $V9_R$ are generated by the voltage-dividing resistor circuits 2201, and these generated voltages are supplied to an operational amplifier 2206.

When the selection signal SEL which causes the reference gradation voltages for green pixels to be generated is supplied to the demultiplexer 2200, the demultiplexer 2200 supplies the power supply voltage VH only to the circuit 2202 out of the voltage-dividing resistor circuits 2201 to 2203 through the output terminal B. Thus, the reference gradation voltages $V1_G$ to $V9_G$ are generated by the voltage-dividing resistor circuits 2202, and these generated voltages are supplied to the operational amplifier 2206.

When the selection signal SEL which causes the reference gradation voltages for blue pixels to be generated is supplied to the demultiplexer 2200, the demultiplexer 2200 supplies the power supply voltage VH only to the circuit 2203 out of the voltage-dividing resistor circuits 2201 to 2203 through the output terminal C. Thus, the reference gradation voltages $V1_B$ to $V9_B$ are generated by the voltage-dividing resistor circuits 2203, and these generated voltages are supplied to an operational amplifier 2206.

The demultiplexer 2200 can be replaced with a selection circuit (multiplexer) and disposed in a stage preceding the operational amplifier 2203. In this case, the power supply voltage VH, for example, is connected to each of the voltage-dividing resistor circuits 2201 to 2203.

The operational amplifier 2206 has nine operational amplifiers which individually amplify respective nine reference gradation voltages contained in a set of reference gradation voltages actually generated out of three sets of reference gradation voltages, the reference gradation voltages $V1_R$ to $V9_R$, $V1_G$ to $V9_G$ and $V1_B$ to $V9_B$. When the reference gradation voltages $V1_R$ to $V9_R$ are generated, the operational amplifier 2206 outputs the reference gradation voltage group $GMA_R$ obtained by individually amplifying the respective voltages $V1_R$ to $V9_R$. When the reference gradation voltages $V1_G$ to $V9_G$ are generated, the operational amplifier 2206 outputs the reference gradation voltage group $GMA_G$ obtained by individually amplifying the respective voltages $V1_G$ to $V9_G$. When the reference gradation voltages $V1_B$ to $V9_B$ are generated, the operational amplifier 2206 outputs the reference gradation voltage group $GMA_B$ obtained by individually amplifying the respective voltages $V1_B$ to $V9_B$.

Figure 4:
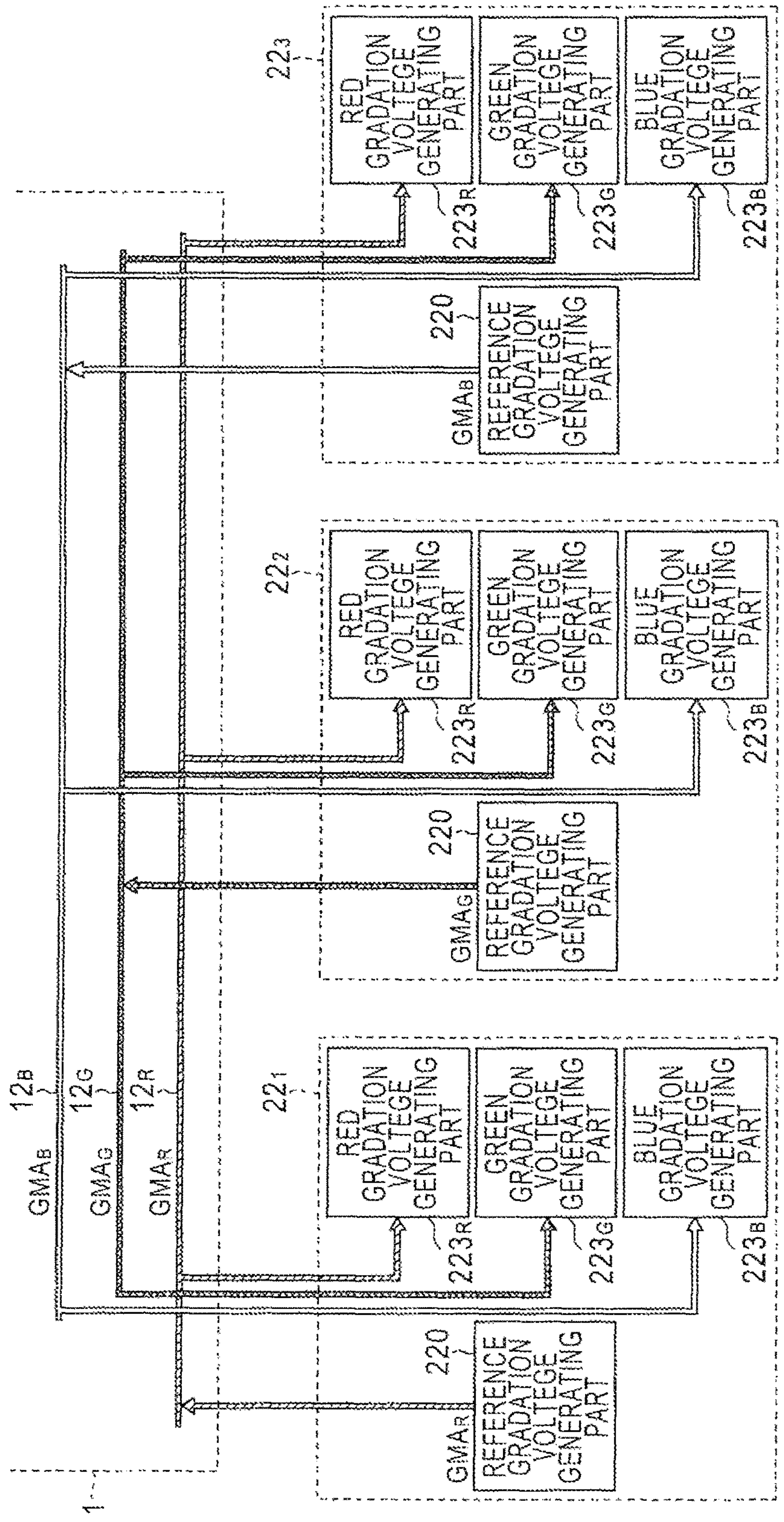
FIG. 4 is a block diagram showing an example of the internal connection between each of the source drivers $\mathbf{22}_1$ to $\mathbf{22}_3$ and a control substrate 1.

In the embodiment shown in FIG. 1, an address $A_{0-3}$ with a value of [1000] is fixedly inputted to the source driver $22_1$. Thus, as shown in FIG. 4, the reference gradation voltage generating part 220 formed in the source driver $22_1$ generates only the red reference gradation voltage group $GMA_R$, outputs the red reference gradation voltage group to the outside of the chip, and sends the red reference gradation voltage group to the reference gradation voltage supply line group $12_R$ in the control substrate 1. In this manner, the red reference gradation voltage group $GMA_R$ is supplied to a red gradation voltage generating part $223_R$ provided in each of the source drivers $22_1$ to $22_3$ through the reference gradation voltage supply line group $12_R$ formed in the control substrate 1 as shown in FIG. 4.

An address $A_{0-3}$ with a value of [0100] is fixedly inputted to the source driver $22_2$. Thus, as shown in FIG. 4, the reference gradation voltage generating part 220 formed in the source driver $22_2$ generates only the green reference gradation voltage group $GMA_G$, outputs the green reference gradation voltage group to the outside of the chip, and sends the green reference gradation voltage group to the reference gradation voltage supply line group $12_G$ in the control substrate 1. In this manner, the green reference gradation voltage group $GMA_G$ are supplied to a green gradation voltage generating part $223_G$ provided in each of the source drivers $22_1$ to $22_3$ through the reference gradation voltage supply line group $12_G$ formed in the control substrate 1 as shown in FIG. 4.

An address $A_{0-3}$ with a value of [0010] is fixedly inputted to the source driver $22_3$. Thus, as shown in FIG. 4, the reference gradation voltage generating part 220 formed in the source driver $22_3$ generates only the blue reference gradation voltage group $GMA_B$, outputs the blue reference gradation voltage group to the outside of the chip, and sends the blue reference gradation voltage group to the reference gradation voltage supply line group $12_B$ in the control substrate 1. In this manner, the blue reference gradation voltage group $GMA_B$ are supplied to a blue gradation voltage generating part $223_B$ provided in each of the source drivers $22_1$ to $22_3$ through the reference gradation voltage supply line group $12_B$ formed in the control substrate 1 as shown in FIG. 4.

As seen from the above, the reference gradation voltage generating part 220 generates, on the basis of the address $A_{0-3}$ as a gamma characteristic setting signal inputted from the outside, reference gradation voltages for either one system out of the following:

the reference gradation voltages $V1_R$ to $V9_R$ ($GMA_R$) based on a first gamma characteristic for red pixels;

the reference gradation voltages $V1_G$ to $V9_G$ ($GMA_G$) based on a second gamma characteristic for green pixels; and the reference gradation voltages $V1_B$ to $V9_B$ ($GMA_B$) based on a third gamma characteristic for blue pixels.

Accordingly, even though each of the reference gradation voltage generating parts 220 provided in the respective source drivers $22_1$ to $22_3$ generates a reference gradation voltage based on gamma characteristic different from each other, the reference gradation voltage generating parts 220 all have the same internal configuration (shown in FIG. 2). This allows manufacture of the source drivers $22_1$ to $22_3$ using a common mask pattern, thus making it possible to reduce production costs of the overall system.

Referring again to FIG. 2, a shift register latch part 221 sequentially receives each pixel data PD within the divided-pixel-data series inputted through a pad group 9, and every time k (k=m/3) pixel data PD have been received, the shift register latch part 221 at the same time supplies these k pixel data PD to a D/A converting part 222 as pixel data $P_1$ to $P_k$.

The red gradation voltage generating part $223_R$ receives through a pad group PA6 the red reference gradation voltage group $GMA_R$ supplied from the control substrate 1, generates red gradation voltages $VR_1$ to $VR_{256}$ for 256 gradations based on the red gamma characteristic based on the reference gradation voltages $V1_R$ to $V9_R$ of the red reference gradation voltage group $GMA_R$, and supplies the generated red gradation voltages $VR_1$ to $VR_{256}$ to the D/A converting part 222. The green gradation voltage generating part $223_G$ receives through a pad group PA7 the green reference gradation voltage group $GMA_G$ supplied from the control substrate 1, generates green gradation voltages $VG_1$ to $VG_{256}$ for 256 gradations based on the green gamma characteristic based on the reference gradation voltages $V1_G$ to $V9_G$ of the green reference gradation voltage group $GMA_G$, and supplies the generated green gradation voltages $VG_1$ to $VG_{256}$ to the D/A converting part 222. The blue gradation voltage generating part $223_B$ receives through a pad group PA8 the blue reference gradation voltage group $GMA_B$ supplied from the control substrate 1, generates blue gradation voltages $VB_1$ to $VB_{256}$ for 256 gradations based on the blue gamma characteristic based on the reference gradation voltages $V1_B$ to $V9_B$ of the blue reference gradation voltage group $GMA_B$, and supplies the generated blue gradation voltages $VB_1$ to $VB_{256}$ to the D/A converting part 222. In the above embodiment, gradation voltages for 256 gradations are used; however, this may be gradation voltages for 256 gradations or more, or 256 gradations or less.

The D/A converting part 222 selects, for each of pixel data $P_1$, $P_4$, $P_7$, . . . $P_{(k-2)}$ corresponding to red pixels out of the pixel data $P_1$ to $P_k$, one gradation voltage corresponding to the brightness level represented by the pixel data P out of the red gradation voltages $VR_1$ to $VR_{256}$, and supplies the selected gradation voltages to an output amplifier 224 as gradation brightness voltages $B_1$, $B_4$, $B_7$, . . . and $B_{(k-2)}$. The D/A converting part 222 selects, for each of pixel data $P_2$, $P_5$, $P_8$, . . . $P_{(k-1)}$ corresponding to green pixels out of the pixel data $P_1$ to $P_k$, one gradation voltage corresponding to the brightness level represented by the pixel data P out of the green gradation voltages $VG_1$ to $VG_{256}$, and supplies to the output amplifier 224 the selected gradation voltages as gradation brightness voltages $B_2$, $B_5$, $B_8$, . . . and $B_{(k-1)}$. The D/A converting part 222 selects, for each of pixel data $P_3$, $P_6$, $P_9$, . . . $P_k$ corresponding to blue pixels out of the pixel data $P_1$ to $P_k$, one gradation voltage corresponding to a brightness level represented by the pixel data P out of the blue gradation voltages $VB_1$ to $VB_{256}$, and supplies the selected gradation voltages to the output amplifier 224 as gradation brightness voltages $B_3$, $B_6$, $B_9$, . . . and $B_k$.

The output amplifier 224 amplifies the respective gradation brightness voltages $B_1$ to $B_k$ supplied from the D/A converting part 222 and outputs the amplified voltages as driving pulses $D_1$ to $D_k$. The output amplifier 224 formed in the source driver $22_1$ shown in FIG. 1 applies these driving pulses $D_1$ to $D_k$ to the source lines $S_1$ to $S_k$ of the display panel 20, respectively. The output amplifier 224 formed in the source driver $22_2$ applies these driving pulses $D_1$ to $D_k$ to the source lines $S_{k+1}$ to $S_{2k}$ of the display panel 20, respectively. The output amplifier 224 formed in the source driver $22_3$ applies these driving pulses $D_1$ to $D_k$ to the source lines $S_{2k+1}$ to $S_m$ of the display panel 20, respectively.

As described above, in the organic electroluminescent display device shown in FIG. 1, the source driver 22 is configured that it is divided into three source drivers $22_1$ to $22_3$ each of which is an independent IC chip. The source driver 22 applies to the source lines S of the display panel 20 driving pulses D having gradation voltages corresponding to brightness levels represented by an input video signals. Here, for generating, in the source driver 22, the red reference gradation voltage group $GMA_R$ based on the gamma characteristic of red, the green reference gradation voltage group $GMA_G$ based on the gamma characteristic of green, and the blue reference gradation voltage group $GMA_B$ based on the gamma characteristic of blue, each of which serves as a reference for gradation voltages, the source driver $22_1$ is provided with a reference gradation voltage generating part 220 which generates only the red reference gradation voltage group $GMA_R$. The source driver $22_2$ is provided with a reference gradation voltage generating part 220 which generates only the green reference gradation voltage group $GMA_G$, and the source driver $22_3$ with a reference gradation voltage generating part 220 which generates only the blue reference gradation voltage group $GMA_B$. As shown in FIG. 4, the red reference gradation voltage group $GMA_R$ generated in the reference gradation voltage generating part 220 of the source driver $22_1$ is once outputted to the outside of the chip and the outputted $GMA_R$ is supplied to the red gradation voltage generating parts $223_R$ formed in the respective source drivers $22_1$ to $22_3$ respectively through the reference gradation voltage supply line group $12_R$ printed on the control substrate 1. The green reference gradation voltage group $GMA_G$ generated in the reference gradation voltage generating part 220 of the source driver $22_2$ is once outputted to the outside of the chip and the outputted $GMA_G$ is supplied to the green gradation voltage generating parts $223_G$ formed in the respective source drivers $22_1$ to $22_3$ through the reference gradation voltage supply line group $12_G$ printed on the control substrate 1. The blue reference gradation voltage group $GMA_B$ generated in the reference gradation voltage generating part 220 of the source driver $22_3$ is once outputted to the outside of the chip and the outputted $GMA_B$ is supplied to the blue gradation voltage generating parts $223_B$ formed in the respective source drivers $22_1$ to $22_3$ through the reference gradation voltage supply line group $12_B$ printed on the control substrate 1.

In short, this is equivalent to distributing three reference gradation voltage generating parts needed to generate the red reference gradation voltage group $GMA_R$, the green reference gradation voltage group $GMA_G$, and the blue reference gradation voltage group $GMA_B$, each having different gamma characteristic for the brightness level of an input video signal, to the respective source drivers $22_1$ to $22_3$, with one source driver being provided with one reference gradation voltage generating part. The red reference gradation voltage group $GMA_R$, the green reference gradation voltage group $GMA_G$, and the blue reference gradation voltage group $GMA_B$ generated in the respective source drivers $22_1$ to $22_3$ are once outputted to the outside of the chip and then supplied to the red gradation voltage generating parts $223_R$, the green gradation voltage generating parts $223_G$, and the blue gradation voltage generating parts $223_B$ of the respective source drivers $22_1$ to $22_3$ through the reference gradation voltage supply line groups $12_R$, $12_G$ and $12_B$ of the control substrate 1.

Such configuration makes it possible to reduce the costs of the overall system because the reference gradation voltage generating parts 220 are provided within the source drivers.

Furthermore, according to the above described configuration, the three groups of the operational amplifiers 2206 necessary to generate the red reference gradation voltage group $GMA_R$, the green reference gradation voltage group $GMA_G$, and the blue reference gradation voltage group $GMA_B$ are distributed to the respective source drivers $22_1$ to $22_3$ with one source driver being provided with one operational amplifier as shown in FIG. 3.

This enables a smaller chip size of the respective source drivers compared with a case where operational amplifiers 2206 for three systems are provided in the respective source drivers, and also to reduction in power consumption and heat generation in the respective source drivers.

Furthermore, in the configuration shown in FIG. 1, the reference gradation voltage group ($GMA_R$, $GMA_G$, or $GMA_B$) generated in the reference gradation voltage generating part 220 mounted on one of the source drivers $22_1$ to $22_3$ is commonly used among the source drivers $22_1$ to $22_3$. Here, the operational amplifier 2206 contained within the reference gradation voltage generating part 220 which generates the red reference gradation voltage group $GMA_R$ is mounted only on the source driver $22_1$ out of the source drivers $22_1$ to $22_3$. The operational amplifier 2206 contained within the reference gradation voltage generating part 220 which generates the green reference gradation voltage group $GMA_G$ is mounted only on the source driver $22_2$ out of the source drivers $22_1$ to $22_3$. The operational amplifier 2206 contained within the reference gradation voltage generating part 220 which generates the blue reference gradation voltage group $GMA_B$ is mounted only on the source driver $22_3$ out of the source drivers $22_1$ to $22_3$.

Therefore, even if the offset voltages of the operational amplifiers 2206 are uneven between the source drivers $22_1$ to $22_3$, the offset voltage for each of the colors (red, green and blue) having gamma characteristics different from one another is generated in one reference gradation voltage generating part 220, and thus the reference gradation voltage group ($GMA_R$, $GMA_G$ or $GMA_B$) will not be affected by this between the source drivers $22_1$ to $22_3$. Therefore, flicker in the image displayed by the display panel 20 can be prevented.

In the source driver $22_1$ ($22_2$, $22_3$) in the above embodiment, the red reference gradation voltage group $GMA_R$ ($GMA_G$, $GMA_B$) generated in the reference gradation voltage generating part 220 is supplied to the red gradation voltage generating part $223_R$ ($223_G$, $223_B$) of its own after passing through the reference gradation voltage supply line group $12_R$ ($12_G$, $12_B$) in the control substrate 1 as shown in FIG. 4. However, the red reference gradation voltage group $GMA_R$ ($GMA_G$, $GMA_B$) generated in the reference gradation voltage generating part 220 in the source driver $22_1$ ($22_2$, $22_3$) may be supplied to the red gradation voltage generating part $223_R$ ($223_G$, $223_B$) of its own through wiring provided in the source driver $22_1$ ($22_2$, $22_3$) as shown in FIG. 5.

Figure 5:
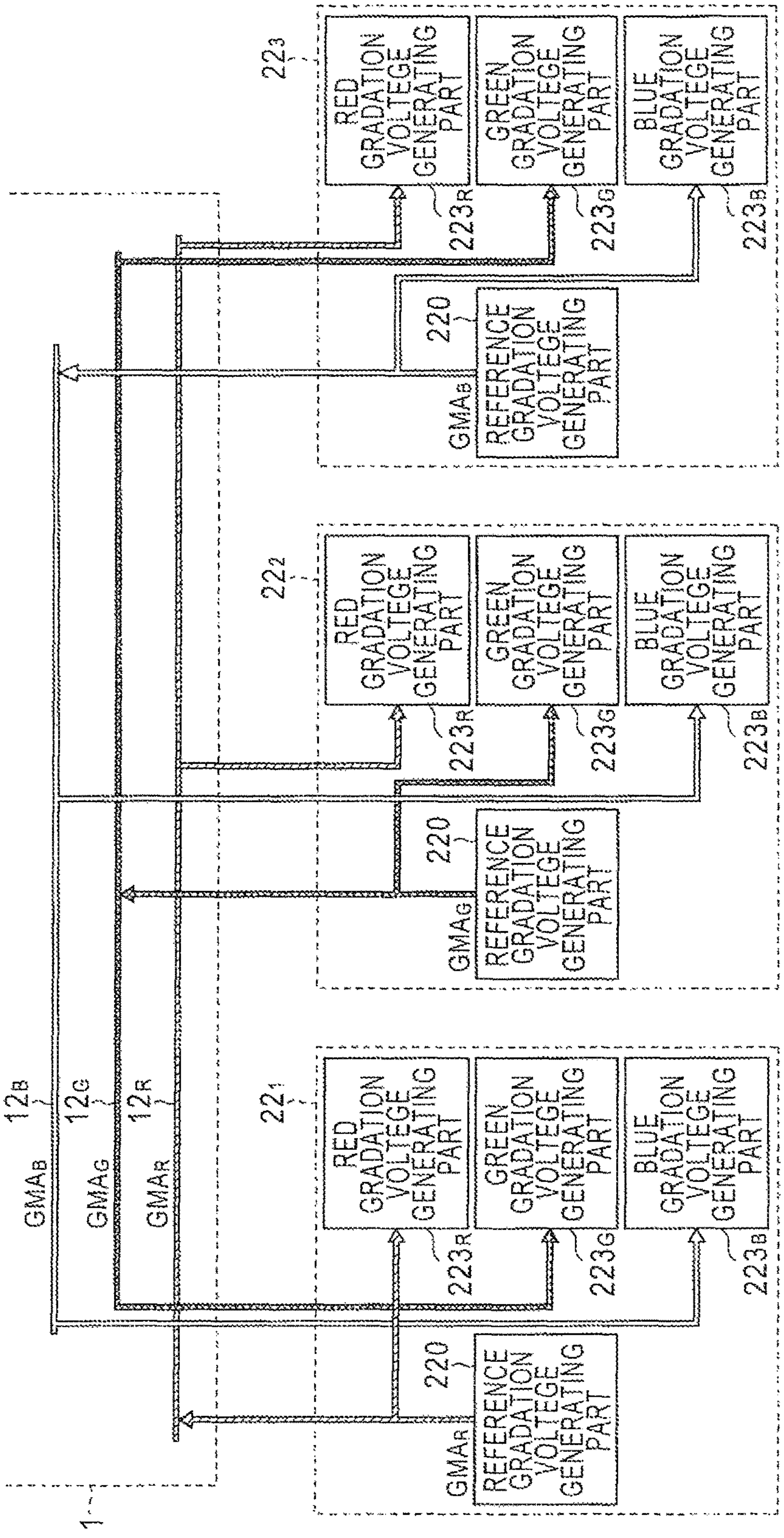
FIG. 5 is a diagram showing another example of the internal connection between each of the source drivers $\mathbf{22}_1$ to $\mathbf{22}_3$ and the control substrate 1.

The configuration shown in FIG. 5 requires less number of pad groups PA to be provided in each of the source drivers $22_1$ to $22_3$ compared with the configuration shown in FIG. 4.

In the above embodiment, the configuration was explained taking as an example a source driver 22 which is divided into three source drivers $22_1$ to $22_3$. However, the above configuration of the invention can be similarly applicable to a source driver divided into four or more source drivers.

Figure 6:
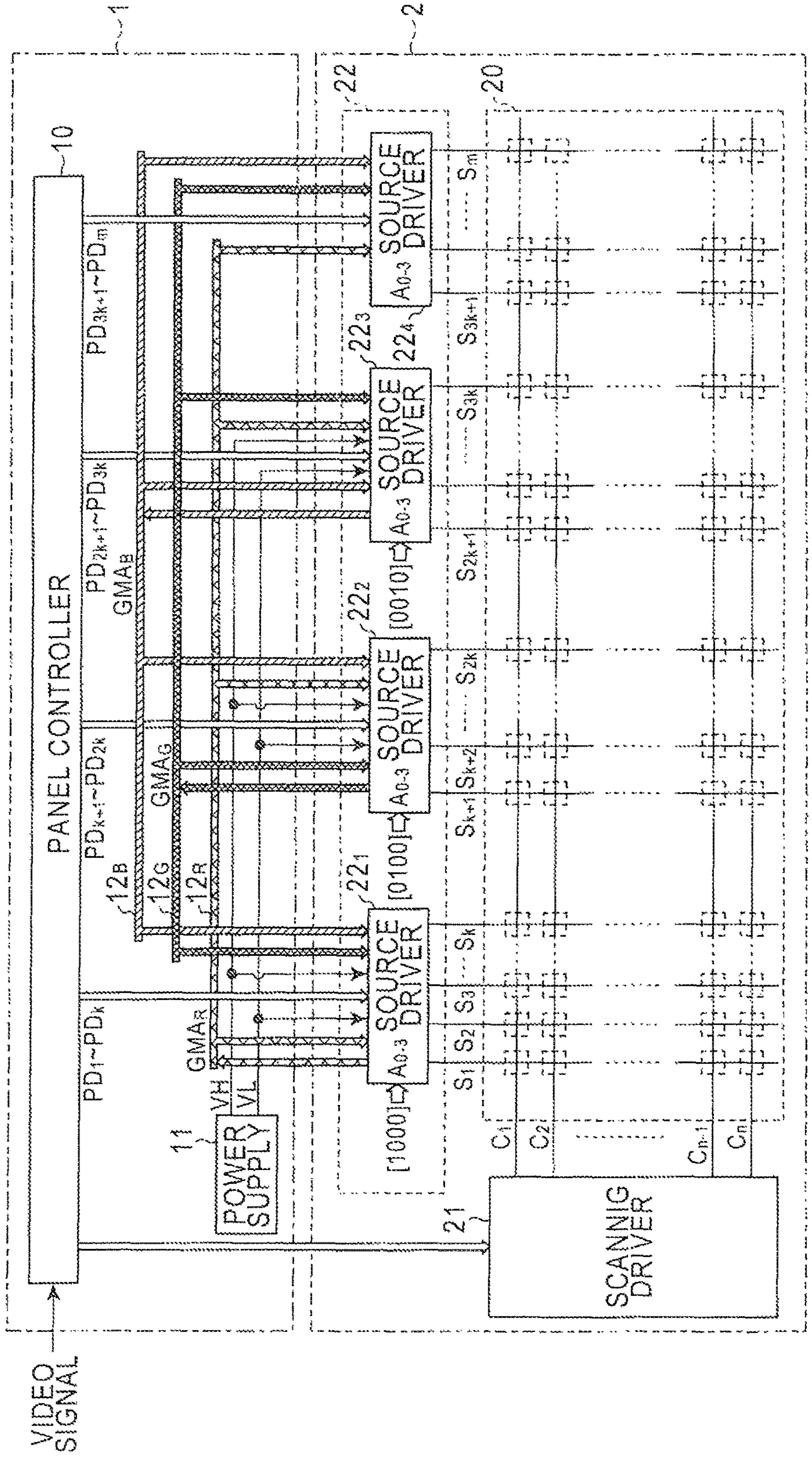
FIG. 6 is a diagram schematically showing another example of the configuration of an organic electroluminecent display device having thereon four source drivers $\mathbf{22}_1$ to $\mathbf{22}_4$.

FIG. 6 shows an example of a configuration wherein the source driver 22 is divided into four source drivers $22_1$ to $22_4$.

The configuration shown in FIG. 6 is the same as that shown in FIG. 1 except that the source lines $S_1$ to $S_m$ of the display panel 20 are driven separately by the four source drivers $22_1$ to $22_4$.

In the configuration shown in FIG. 6, the panel controller 10 divides the pixel data $PD_1$ to $PD_m$ for a display line generated in accordance with an input video signal into four divided-pixel-data series $PD_1$ to $PD_k$ (k=m/4), $PD_{k+1}$ to $PD_{2k}$, $PD_{2k+1}$ to $PD_{3k}$, and $PD_{3k+1}$ to $PD_m$. The panel controller 10 supplies the divided-pixel-data series $PD_1$ to $PD_k$, $PD_{k+1}$ to $PD_{2k}$, $PD_{2k+1}$ to $PD_{3k}$, and $PD_{3k+1}$ to $PD_m$ to the source drivers $22_1$, $22_2$, $22_3$ and $22_4$, respectively. The source drivers $22_1$ to $22_4$ all have the same internal configuration (shown in FIG. 2).

Therefore, the source driver $22_1$ generates driving pulses $D_1$ to $D_k$ corresponding to the pixel data $PD_1$ to $PD_k$ respectively and applies the generated driving pulses $D_1$ to $D_k$ to the source lines $S_1$ to $S_k$ of the display panel 20, respectively. The source driver $22_2$ generates driving pulses $D_1$ to $D_k$ corresponding to the pixel data $PD_{k+1}$ to $PD2_k$ respectively and applies the generated driving pulses $D_1$ to $D_k$ to the source lines $Sk+_1$ to $S2_k$ of the display panel 20, respectively. The source driver $22_3$ generates driving pulses $D_1$ to $D_k$ corresponding to the pixel data $PD2_{k+1}$ to $PD_{3k}$ respectively and applies the generated driving pulses $D_1$ to $D_k$ to the source lines $S_{2k+1}$ to $S_{3k}$ of the display panel 20, respectively. The source driver $22_4$ generates driving pulses $D_1$ to $D_k$ corresponding to the pixel data $PD_{3k+1}$ to $PD_m$ respectively and applies the generated driving pulses $D_1$ to $D_k$ to the source lines $S_{3k+1}$ to $S_m$ of the display panel 20, respectively.

Similarly to the configuration shown in FIG. 1, in the configuration shown in FIG. 6, an address $A_{0-3}$ with a value of [1000] is fixedly inputted to the source driver $22_1$, an address $A_{0-3}$ with a value of [0100] to the source driver $22_2$, and an address $A_{0-3}$ with a value of [0010] to the source driver $22_3$. Thus, similarly to the configuration shown in FIG. 1, the source driver $22_1$ is a supply source of the red reference gradation voltage group $GMA_R$ for all the source drivers $22_1$ to $22_4$, the source driver $22_2$ a supply source of the green reference gradation voltage group $GMA_G$ for all the source drivers $22_1$ to $22_4$, and the source driver $22_3$ a supply source of the blue reference gradation voltage group $GMA_B$ for all the source drivers $22_1$ to $22_4$. Here, in the configuration shown in FIG. 6, the address $A_{0-3}$ and the power supply voltages VH and VL are not supplied to the source driver $22_4$. In short, in the source drivers $22_4$, the pad group PA1 and the power supply pads PA2 and PA3 to which the address $A_{0-3}$ and the power supply voltages VH and VL are inputted respectively are left in an open state. Since the power supply voltages VH and VL are not supplied to the source driver $22_4$, the operation of the reference gradation voltage generating part 220 mounted on the source driver $22_4$ comes to a stopped state. In other words, since the source driver $22_4$ does not need to generate the reference gradation voltage, the pad group PA1 and the power supply pads PA2 and PA3 for the address $A_{0-3}$ and the power supply voltages VH and VL are left in an open state, thereby stopping the operation of the reference gradation voltage generating part 220 to suppress power consumption.

In the above embodiments, explanations have been made taking as an example a configuration where the source driver in accordance with the present invention is applied to an organic electroluminescent display device with three-color pixels of red, green and blue. The source driver in accordance with the present invention is similarly applicable to an organic electroluminescent display device with four or more color pixels. For example, when driving a display panel having pixels which emits yellow light in addition to red, green and blue light, the source driver 22 is divided into four source drivers, and a yellow gradation voltage generating part 223 which generates yellow gradation voltages for 256 gradations based on a yellow gamma characteristic is added within each of the source drivers. Here, a reference gradation voltage generating part 220 which generates reference gradation voltages for yellow pixels is mounted in one of the four source drivers. Further, a reference gradation voltage supply line group 12*y* for transmitting reference gradation voltages for yellow pixels is provided on the control substrate 1, and the reference gradation voltages for yellow pixels are supplied to the respective four source drivers through the reference gradation voltage supply line group $12_Y$.

Since the source driver $22_4$ need not generate reference gradation voltages, it is possible to assign an address $A_{0-3}$ with a value of [0000] to the source driver $22_4$ to stop the operation of the operational amplifier 2206. It is also possible to set the address $A_{0-3}$ the same as either one of the source drivers $22_1$ to $22_3$ to cause reference gradation voltages to be generated in parallel. It is further possible to supply a fixed potential such as a ground potential instead of not supplying the power supply voltages Vh and VL.

Next, the arrangement of respective functional blocks and wiring within the respective source driver $22_1$ to $22_3$ each as an independent IC chip, and connection configuration between the control substrate 1 and the respective source driver $22_1$ to $22_3$ will be explained referring only to the source driver $22_1$.

Figure 7:
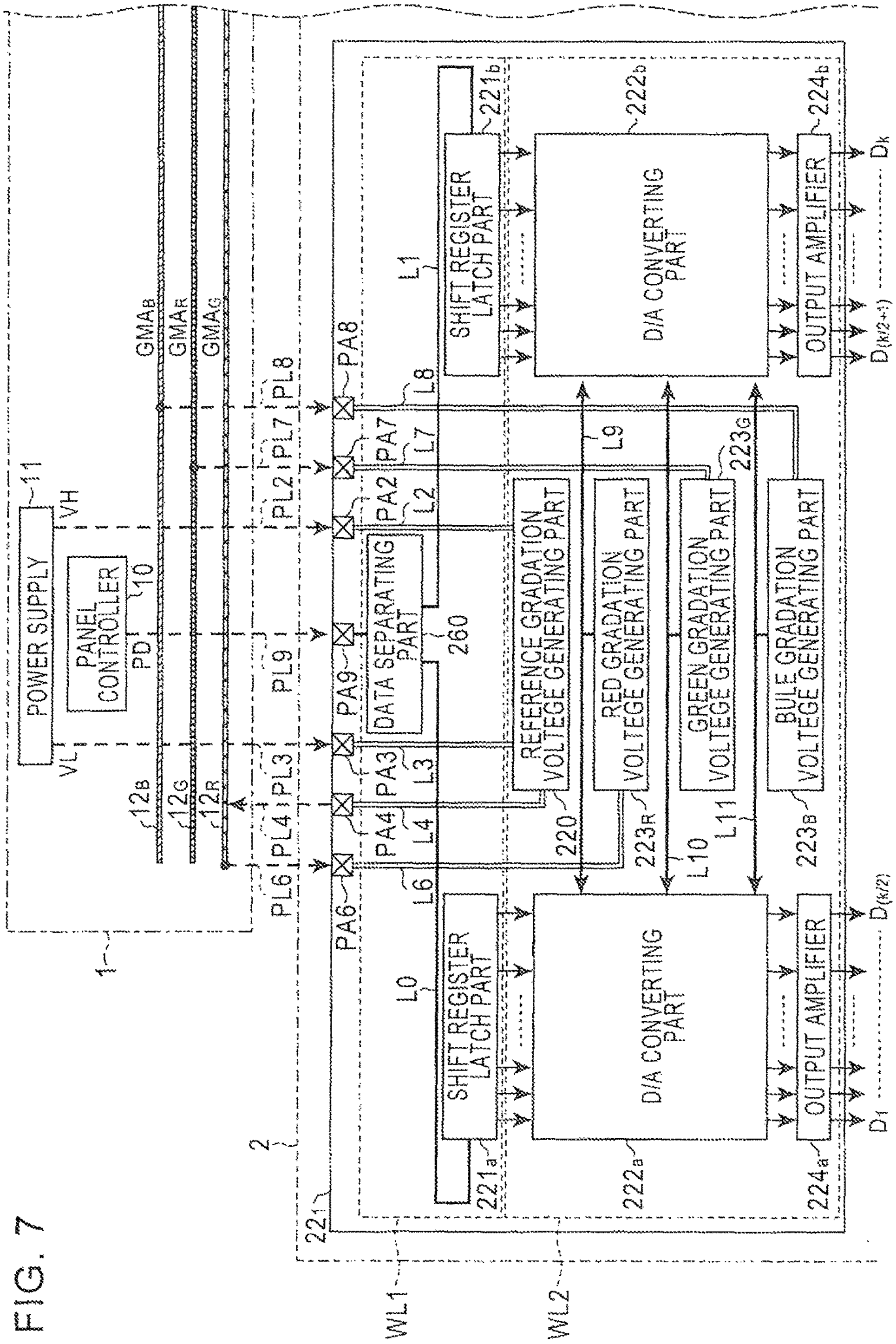
FIG. 7 is a layout chart showing the arrangement of functional blocks and wiring within the chip of the source driver $\mathbf{22}_1$ when the source driver $\mathbf{22}_1$ is formed on the display substrate 2 in the form of COG (Chip On Glass)

FIG. 7 is a layout chart showing the arrangement of functional blocks and wiring within the chip of the source driver $22_1$ which is applied to a case where the source drivers $22_1$ to $22_3$ are formed on the display substrate 2 in the form of COG (Chip On Glass), i.e., where the display substrate 2 is a glass substrate.

As shown in FIG. 7, the shift register latch part 221, the D/A converting part 222 and the output amplifier 224 as functional blocks are disposed within the chip being divided into two parts, one of which generates driving pulses $D_1$ to $D_{k/2}$ and the other of which driving pulses $D_{(k/2+1)}$ to $D_k$, out of driving pulses $D_1$ to $D_k$.

In other words, a shift register latch part 221*a*, a D/A converting part 222*a* and an output amplifier 224*a* as a first drive part are formed in an area on a left side of the center of the chip in a horizontal direction of a screen of the display panel 20. The first drive part generates the driving pulses $D_1$ to $D_{k/2}$ in response to input video signals to apply the generated driving pulses to the source lines $S_1$ to $S_{k/2}$ of the display panel 20, respectively. A shift register latch part 221*b*, a D/A converting part 222*b* and an output amplifier 224*a* as a second drive part are formed in an area on a right side of the center of the chip in the horizontal direction of the screen. The second drive part generates the driving pulses $D_{(k/2+1)}$ to $D_k$ in response to input video signals to apply the generated driving pulses to the source lines $S_{(k/2+1)}$ to $S_k$ of the display panel 20, respectively. The reference gradation voltage generating part 220 is formed in an intermediate area between the area in which the shift register latch part 221*a*, the D/A converting part 222*a* and the output amplifier 224*a* are formed and the area in which the shift register latch part 221*b*, the D/A converting part 222*b* and the output amplifier 224*b* are formed, i.e., in a central area of the chip. The red gradation voltage generating part $223_R$, the green gradation voltage generating part $223_G$ and the blue gradation voltage generating part $223_B$ are formed in locations in the intermediate area closer to the side of the display panel 20 than the reference gradation voltage generating part 220. Further, in the intermediate area, a data separating part 260 is constructed in a location closer to the control substrate 1 than the reference gradation voltage generating part 220 is.

Figure 8A:
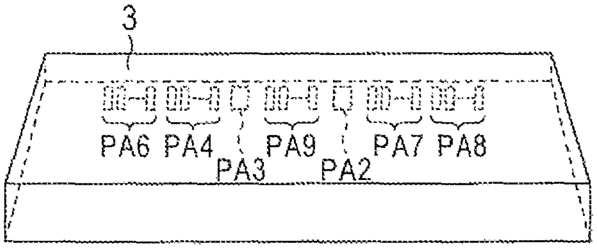

Furthermore, as shown in FIG. 7, the power supply pads PA2 and PA3 and the pad groups PA4 to PA9 described above are formed along a peripheral part on the side of the control substrate 1 out of four peripheral parts of the chip. In other words, on a bottom face of a chip 3 as shown in FIG. 8A on which the above-described source driver 22 is formed, the power supply pads PA2 and PA3 and the pad groups PA4 to PA9 are formed along the peripheral part on the side of the control substrate 1. "A pad group" refers to a group of pads constituted of a plurality of input/output pads. In FIG. 7, the pad group PA9 to which the pixel data PD is inputted is located in a central position of a peripheral part of the chip. The power supply pads PA2 and PA3 to which the power supply voltages VH and VL are inputted respectively are located adjacently on the right and left sides of the pad group PA9, respectively. The pad group PA7 to which the green reference gradation voltage group $GMA_G$ is inputted is disposed at a location adjacent to the power supply pad PA2 farther from the central position than the power supply pad PA2. The pad group PA8 to which the blue reference gradation voltage group $GMA_B$ is inputted is disposed at a location adjacent to the pad group PA7 farther from the central position than the pad group PA7. The pad group PA4 which externally outputs the reference gradation voltage group ($GMA_R$, $GMA_G$ or $GMA_B$) generated by the reference gradation voltage generating part 220 is disposed at a location adjacent to the power supply pad PA3 farther from the central position than the power supply pad PA3. The pad group PA6 to which the red reference gradation voltage group $GMA_R$ is inputted is disposed at a location adjacent to the pad group PA4 farther from the central position than the pad group PA4.

Figure 8B:
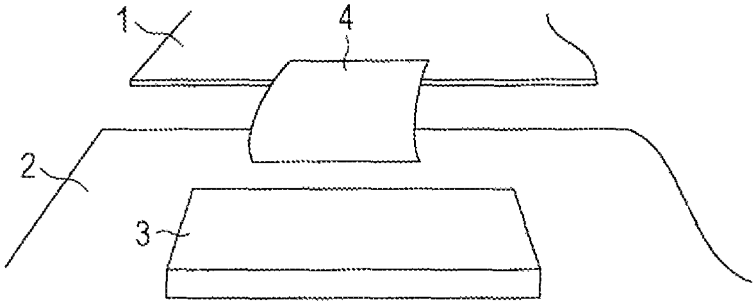

These power supply pads PA2, PA3 and pad groups PA4 to PA9 are connected to the power supply circuit 11, the panel controller 10 and the reference gradation voltage supply line groups $\mathbf{12}_R$,$\mathbf{12}_G$ and $\mathbf{12}_B$ formed on the control substrate 1 through an FPC (Flexible Printed Circuits) 4 which connects the control substrate 1 and the display substrate 2 as shown in FIG. 8B and metal line groups (PL2 to PL4 and PL6 to PL9) formed on a surface of (or in) the display substrate 2.

Figure 8C:
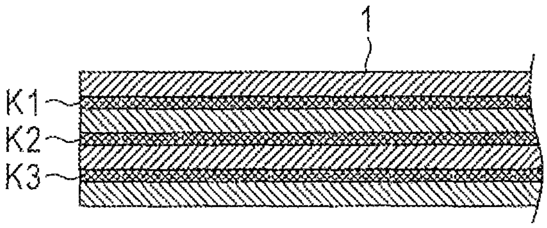

Specifically, the pad group PA9 is connected to the panel controller 10 through the metal line group PL9 wired in the display substrate 2 and the FPC 4. The power supply pads PA2 and PA3 are connected to the power supply circuit 11 through the respective metal lines PL2 and PL3 wired in the display substrate 2 and the FPC 4. The pad group PA4 is connected to the reference gradation voltage supply line group $\mathbf{12}_R$ formed on a first substrate layer K1 of the control substrate 1 as a multi-layer substrate as shown in FIG. 8C through the metal line group PL4 wired in the display substrate 2 and the FPC 4. The pad group PA6 is connected to the reference gradation voltage supply line group $\mathbf{12}_R$ formed on the first substrate layer K1 of the control substrate 1 as shown in FIG. 8C through the metal line group PL6 wired in the display substrate 2 and the FPC 4. The pad group PA7 is connected to the reference gradation voltage supply line group $\mathbf{12}_G$ formed on a second substrate layer K2 of the control substrate 1 as shown in FIG. 8C through the metal line group PL7 wired in the display substrate 2 and the FPC 4. The pad group PA8 is connected to the reference gradation voltage supply line group $\mathbf{12}_B$ formed on a third substrate layer K3 of the control substrate 1 as shown in FIG. 8C through the metal line group PL8 wired in the display substrate 2 and the FPC 4. When a multi-wiring-layer glass substrate is used as the display substrate 2 which is a glass substrate, the panel controller 10 and the power supply IC 11 can be mounted directly on the glass substrate without using the FPC4 and the control substrate 1.

In such chip, the data separating part 260 separates the divided-pixel-data series PD inputted through the pad group PA9 into first and second halves of the pixel-data series, and supplies the first half to the shift register latch part 221*a* through a metal line group L0 formed on a first wiring layer (not shown) in the chip. The data separating part 260 supplies the second half to the shift register latch part 221*b* through a metal line group L1 formed on the first wiring layer.

The power supply voltage VH inputted through the power supply pad PA2 is supplied to the reference gradation voltage generating part 220 through a metal line L2 formed on a second wiring layer (not shown) different from the first wiring layer. The power supply voltage VL inputted through the power supply pad PA3 is supplied to the reference gradation voltage generating part 220 through a metal line L3 formed on the second wiring layer.

The reference gradation voltage group $GMA_R$ ($GMA_G$, $GMA_B$) generated by the reference gradation voltage generating part 220 is sent to the pad group PA4 through a metal line group L4 formed on the second wiring layer.

The red reference gradation voltage group $GMA_R$ inputted through the pad group PA6 is supplied to the red gradation voltage generating part $\mathbf{223}_R$ through a metal line group L6 formed on the second wiring layer. The green reference gradation voltage group $GMA_G$ inputted through the pad group PA7 is supplied to the green gradation voltage generating part $\mathbf{223}_G$ through a metal line group L7 formed on the second wiring layer. The blue reference gradation voltage group $GMA_B$ inputted through the pad group PA8 is supplied to the blue gradation voltage generating part $\mathbf{223}_B$ through a metal line group L8 formed on the second wiring layer.

The red gradation voltages $VR_1$ to $VR_{256}$ generated by the red gradation voltage generating part $\mathbf{223}_R$ are supplied to the D/A converting parts 222*a* and 222*b* through a metal line group L9 formed on the first wiring layer. The green gradation voltages $VG_1$ to $VG_{256}$ generated by the green gradation voltage generating part $\mathbf{223}_G$ are supplied to the D/A converting parts 222*a* and 222*b* through a metal line group L10 formed on the first wiring layer. The blue gradation voltages $VB_1$ to $VB_{256}$ generated by the blue gradation voltage generating part $\mathbf{223}_B$ are supplied to the D/A converting parts 222*a* and 222*b* through a metal line group L11 formed on the first wiring layer.

In the layout shown in FIG. 7, a low-voltage functional block group (260, 221*a*, 221*b*) which operates at low voltages (e.g. 3.3 V) is formed in a low-voltage well area WL1 provided on the chip surface on a side closer to the control substrate 1. On the other hand, a high-voltage functional block group (220, 222*a*, 222*b*, 224*a*, 224*b*, $\mathbf{223}_R$, $\mathbf{223}_G$, $\mathbf{223}_B$) which handles relatively high voltages to be applied to the source lines of the display panel 20 is formed in a high-voltage well area WL2 provided on the chip surface on a side closer to the display panel 20 than the well area WL1.

As described above, in the layout shown in FIG. 7, voltage loss incident to the wiring length between the high-voltage functional block group and the display panel 20 is suppressed by forming the high-voltage functional block group which generates high voltages to be applied to the display panel 20 on the side of the chip closer to the display panel 20.

In reality, the D/A converting part (222*a*, 222*b*) shown in FIG. 7 has k D/A converting elements (not shown) corresponding to the respective source lines $S_1$ to $S_k$ arranged along one of the four peripheral parts of the chip (the peripheral part on the side closer to the display panel 20).

Therefore, if the D/A converting part (222*a*, 222*b*) is not divided in the manner as shown in FIG. 7, there will be a large difference between the wiring length of the metal line groups L9 to L11 for supplying gradation voltages to a D/A converting element corresponding to the source line $S_1$ and wiring length of the metal line groups L9 to L11 for supplying gradation voltages to a D/A converting element corresponding to the source line $S_k$. In short, there will be a large difference between the longest and shortest wiring lengths among the wiring lengths of the metal line groups L9 to L11 for the respective k D/A converting elements, thus causing variations in brightness incident to a large difference in wiring resistance.

Therefore, in the layout shown in FIG. 7, the drive part which includes the D/A converting part is dividedly provided, along one of the four peripheral parts of the chip, in an area on the left side and an area on the right side of the center of the chip in a horizontal direction of a screen, and the red gradation voltage generating part 223$_R$, the green gradation voltage generating part 223$_G$ and the blue gradation voltage generating part 223$_B$ are formed in an intermediate area between the two areas.

This will decrease the difference between the longest and shortest wiring lengths among the metal line groups L9 to L11 for the respective k D/A converting elements, thereby variations in brightness can be reduced.

Also, in the layout shown in FIG. 7, the reference gradation voltage generating part 220 is formed in the intermediate area, and the power supply voltages VH and VL are supplied to the reference gradation voltage generating part 220 through the metal lines L2 and L3, respectively. The power supply voltages VH and VL are inputted through the power supply pads PA2 and PA3 respectively which are provided on the left and right sides of the central position of the peripheral part of the chip on the side closer to the control substrate 1. Furthermore, the reference gradation voltage group (GMA$_R$, GMA$_G$ or GMA$_B$) generated by the reference gradation voltage generating part 220 is outputted externally through the pad group PA4 which is located leftward adjacent to the pad PA3 in the horizontal direction of the screen.

Specifically, the reference gradation voltage generating part 220 is formed in a central area of the chip, and the power supply pads PA2 and PA3 to which the power supply voltages VH and VL to be supplied to the reference gradation voltage generating part 220 are inputted are disposed in two areas separated by the central position of the peripheral part of the chip on the display panel side. Then, the pad group PA4 for externally outputting the reference gradation voltage group (GMA$_R$, GMA$_G$ or GMA$_B$) generated by the reference gradation voltage generating part 220 is disposed adjacent to the power supply pad PA3, thereby the length of the wiring which connects the reference gradation voltage generating part 220 and the control substrate 1 is reduced and the voltage loss caused by wiring resistance is suppressed.

Furthermore, the red reference gradation voltage group GMA$_R$ inputted through the pad group PA6 located leftward adjacent to the pad group PA4 in the horizontal direction of the screen is supplied to the red gradation voltage generating part 223$_R$ through the metal line group L6. The green reference gradation voltage group GMA$_G$ inputted through the pad group PA7 located rightward adjacent to the pad group PA2 in the horizontal direction of the screen is supplied to the green gradation voltage generating part 223$_G$ through the metal line group L7. The blue reference gradation voltage group GMA$_B$ inputted through the pad group PA8 located rightward adjacent to the pad group PA7 in the horizontal direction of the screen is supplied to the blue gradation voltage generating part 223$_B$ through the metal line group L8.

According to the layout described above, two sets of the metal line groups (L4, L6) and the pad groups (PA4, PA6) for transmitting a reference gradation voltage group (GMA$_R$) is located in the area on the left relative to the center of the chip in the horizontal direction of the screen. Two sets of the metal line groups (L7, L8) and the pad groups (PA7, PA8) for transmitting reference gradation voltage groups (GMA$_G$, GMA$_B$) are located in the area on the right relative to the center of the chip in the horizontal direction of the screen.

In this manner, two sets of metal line groups are equally disposed on each of the right and left areas relative to the chip center, and thus it becomes possible to dispose the data separating part 260 in the central position in the horizontal direction of the screen as shown in FIG. 7. Therefore, the wiring lengths of the metal line group L0 which supplies pixel data to the shift register latch parts 221*a* and the metal line group L1 which supplies pixel data to the shift register latch parts 221*b* can be made the same or the difference therebetween can be decreased.

Furthermore, in the configuration shown in FIG. 7, the reference gradation voltage generated in each of the source driver chips and externally outputted is supplied to each of the source driver chips through the reference gradation voltage supply line (12$_R$, 12$_G$, 12$_B$) printed on the control substrate 1 in a manner to extend in the horizontal direction of the display panel 20.

Therefore, connection between the respective source driver chips and the respective reference gradation voltage supply lines formed on the control substrate 1 can be made by the FPC, thus the number of production processes can be reduced and production costs can be suppressed compared with a case where the respective chips are individually connected with separate lines.

Figure 9:
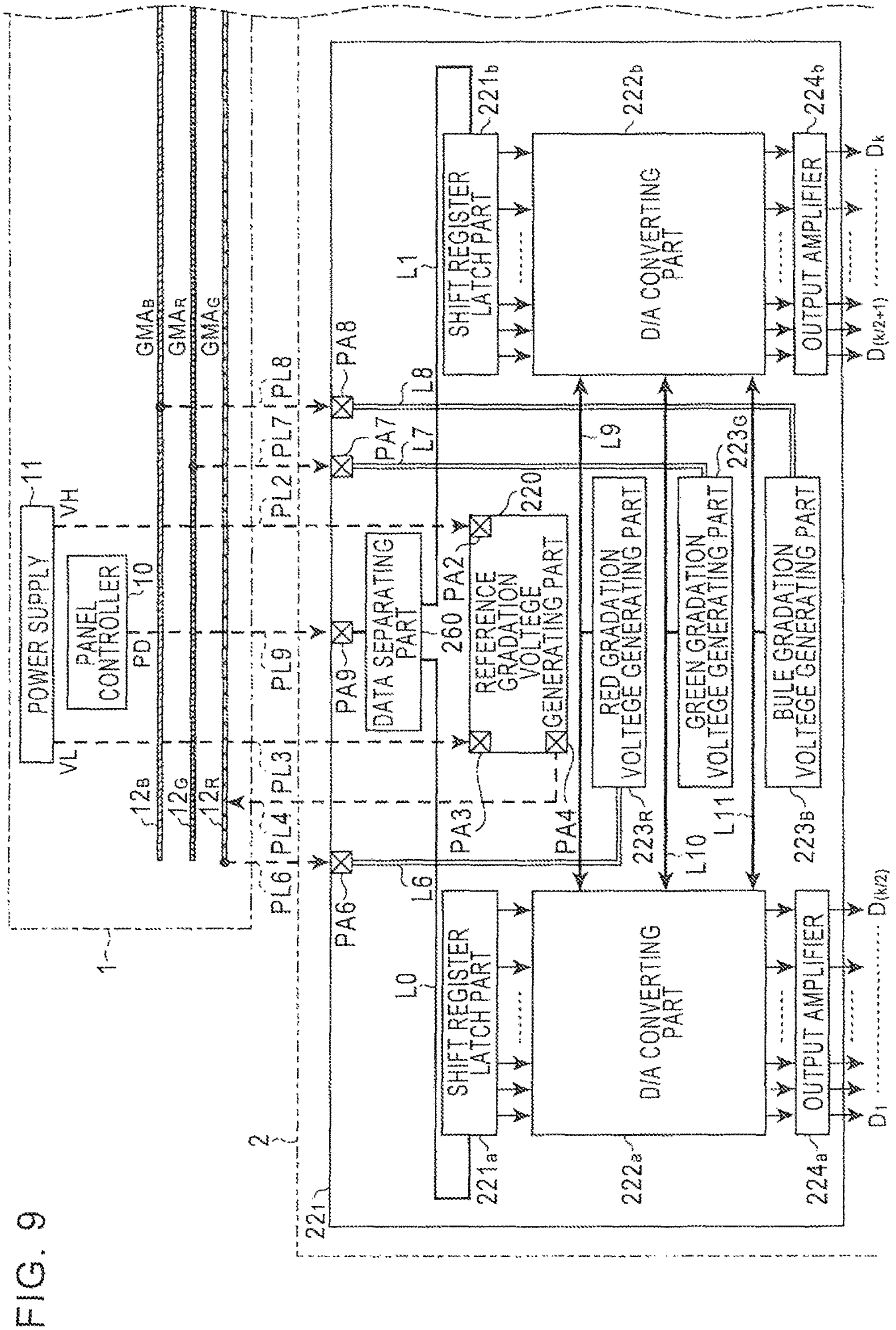
FIG. 9 is a layout chart showing a modification of the arrangement of functional blocks and wiring within the chip shown in FIG. 7.

FIG. 9 is a layout chart showing a modification of the arrangement of functional blocks and wiring within the chip shown in FIG. 7.

In FIG. 9, the arrangement of the respective functional blocks (220, 221*a*, 221*b*, 222*a*, 222*b*, 223$_R$, 223$_G$, 223$_B$, 224*a*, 224*b* and 260) and the pad groups PA6 to PA9, and the wiring arrangement of the respective metal line groups L0, L1 and L6 to L11 are the same as those shown in FIG. 7 and FIG. 8A to 8C.

In the layout shown in FIG. 9, however, the pad group PA4 for externally outputting the reference gradation voltage group GMA$_R$ generated in the reference gradation voltage generating part 220, and the power supply pads PA2 and PA3 to which the power supply voltages VH and VL to be used by the reference gradation voltage generating part 220 are inputted respectively are provided under an area on which the reference gradation voltage generating part 220 is formed. In other words, the power supply pads PA2, PA3 and the pad group PA4 are provided not along the peripheral part of the chip as shown in FIG. 7 but at a location on a bottom side of the chip corresponding to the area on which the reference gradation voltage generating part 220 is formed. This eliminates the need of the metal lines L2, L3 and metal line group L4 in the chip as shown in FIG. 7 which connect the reference gradation voltage generating part 220 and the power supply pads PA2, PA3 and pad group PA4.

In this manner, in the layout shown in FIG. 9, the power supply pads PA2, PA3 and the pad group PA4 are provided under the area on which the reference gradation voltage generating part 220 is formed, thereby connection with the control substrate 1 is made through the metal wiring (PL2 to PL4, PL6 to PL9) formed on the display substrate 2 and the FPC4 without through the metal wiring (L2 to L3) inside the chip as shown in FIG. 7. Here, various materials, including copper, are studied as wiring to be provided in the display substrate 2 and the FPC4, which can be thicker than the wiring to be used inside the chips. The material for the metal wiring (L2 to L3) inside the chip is aluminum, which has higher resistance than copper.

According to the layout shown in FIG. 9, voltage loss incident to wiring resistance can be suppressed compared with a case where the layout shown in FIG. 7 is adopted. Not only the power supply pads PA2, PA3 and the pad group PA4 but also the pad groups PA 6 to PA8 may also be provided under respective areas on which the red gradation voltage generating part $\mathbf{223}_R$, the green gradation voltage generating part $\mathbf{223}_G$ and the blue gradation voltage generating part $\mathbf{223}_B$ are formed.

Figure 10:
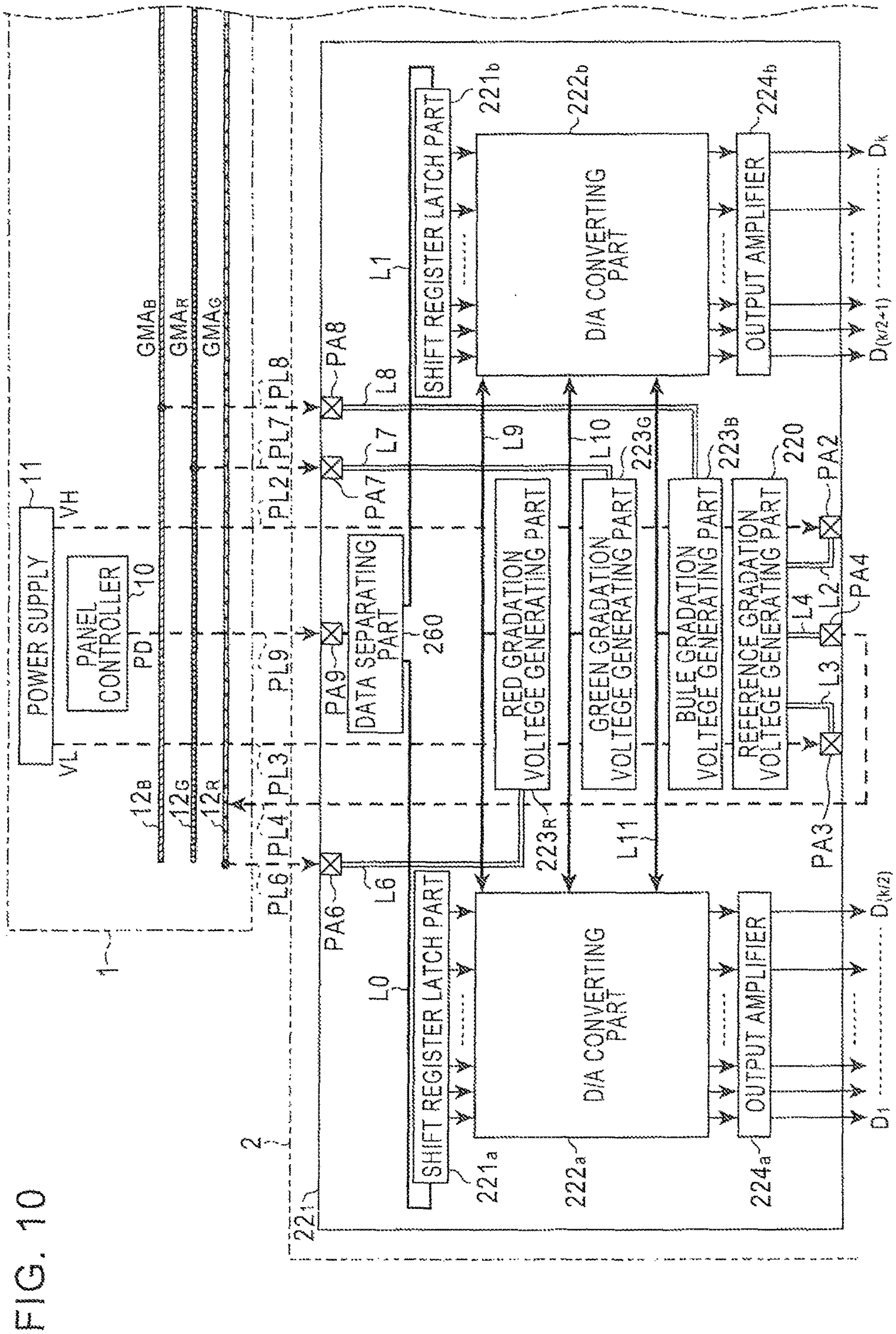
FIG. 10 is a layout chart showing a modification of the arrangement of functional blocks and wiring within the chip shown in FIG. 7.

FIG. 10 is a layout chart showing a modification of the arrangement of functional blocks and wiring within the chip shown in FIG. 7.

In the layout shown in FIG. 10, the layout and wiring arrangement are the same as those shown in FIGS. 7 and 8A to 8C except that the location at which the gradation voltage generating parts for the respective colors ($\mathbf{223}_R$, $\mathbf{223}_G$, $\mathbf{223}_B$) are formed is exchanged for the location at which the reference gradation voltage generating part 220 is formed, and the locations at which the power supply pads PA2, PA3 and the pad group PA4 are formed are shifted to a peripheral part of the chip closer to the display panel 20.

According to the layout shown in FIG. 10, the lengths of the respective metal wires (L2 to L4) inside the chip between the reference gradation voltage generating part 220 and the respective power supply pads PA2, PA3 and the pad group PA4 become shorter than a case where the layout shown in FIG. 7 is adopted.

Therefore, voltage loss incident to wiring resistance can be suppressed compared with a case where the layout shown in FIG. 7 is adopted.

Figure 11:
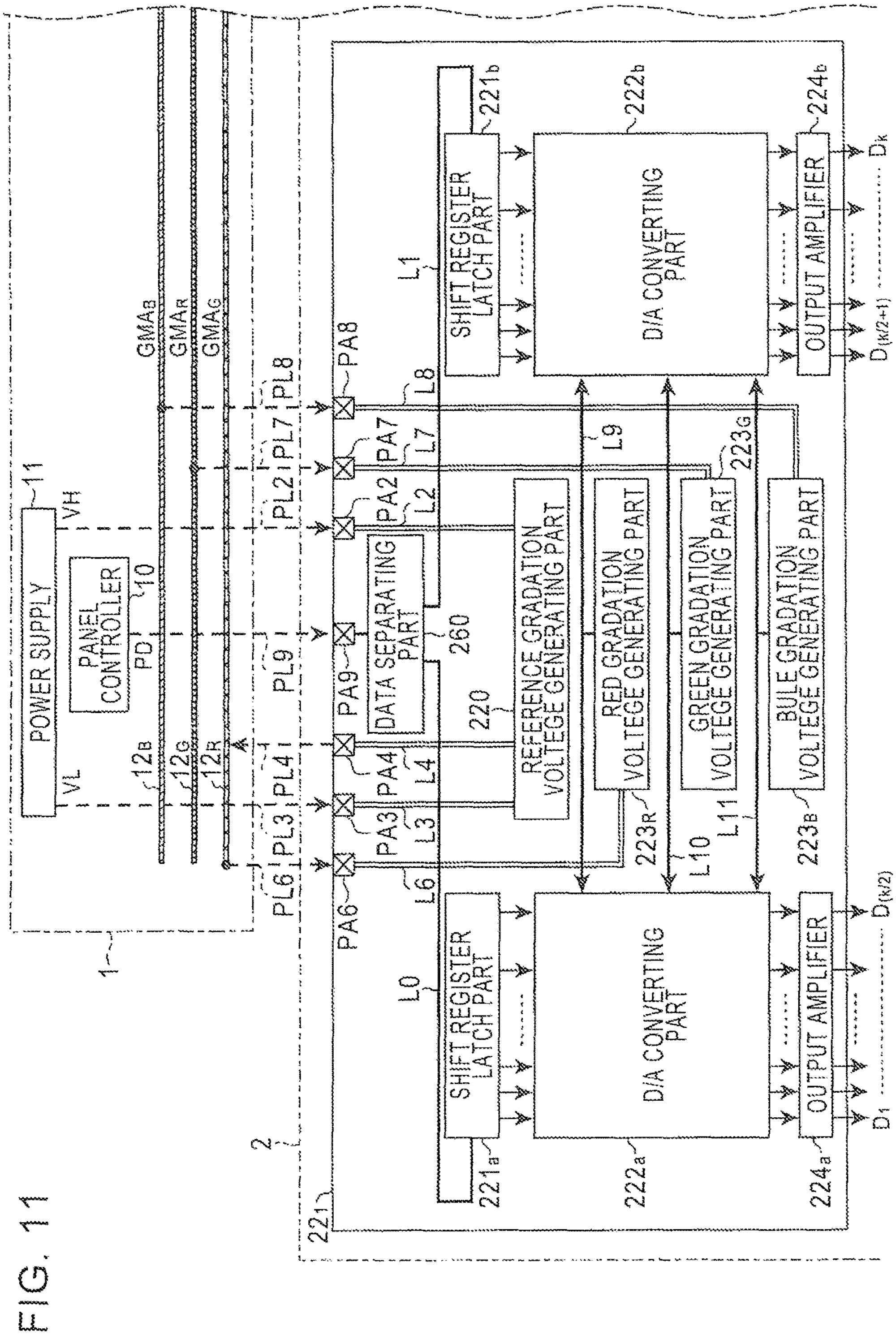
FIG. 11 is a layout chart showing a modification of the arrangement of functional blocks and wiring within the chip shown in FIG. 7.

FIG. 11 is a layout chart showing a modification of the arrangement of functional blocks and wiring configuration within the chip shown in FIG. 7.

In the layout shown in FIG. 11, the layout and wiring arrangement are the same as those shown in FIGS. 7 and 8A to 8C except that the location at which the power supply pad PA3 is formed is exchanged for the location at which the pad group PA4 is formed. According to the layout shown in FIG. 11, the wiring length of the metal line group L4 which transmits the reference gradation voltage group (GMA) generated in the reference gradation voltage generating part 220 to the pad group PA4 becomes shorter than a case where the layout shown in FIG. 7 is adopted. Therefore, if voltage loss inside of the chip when the reference gradation voltage group is sent to the control substrate 1 is large, adoption of the layout shown in FIG. 11 in place of that shown in FIG. 7 is preferable.

Figure 12:
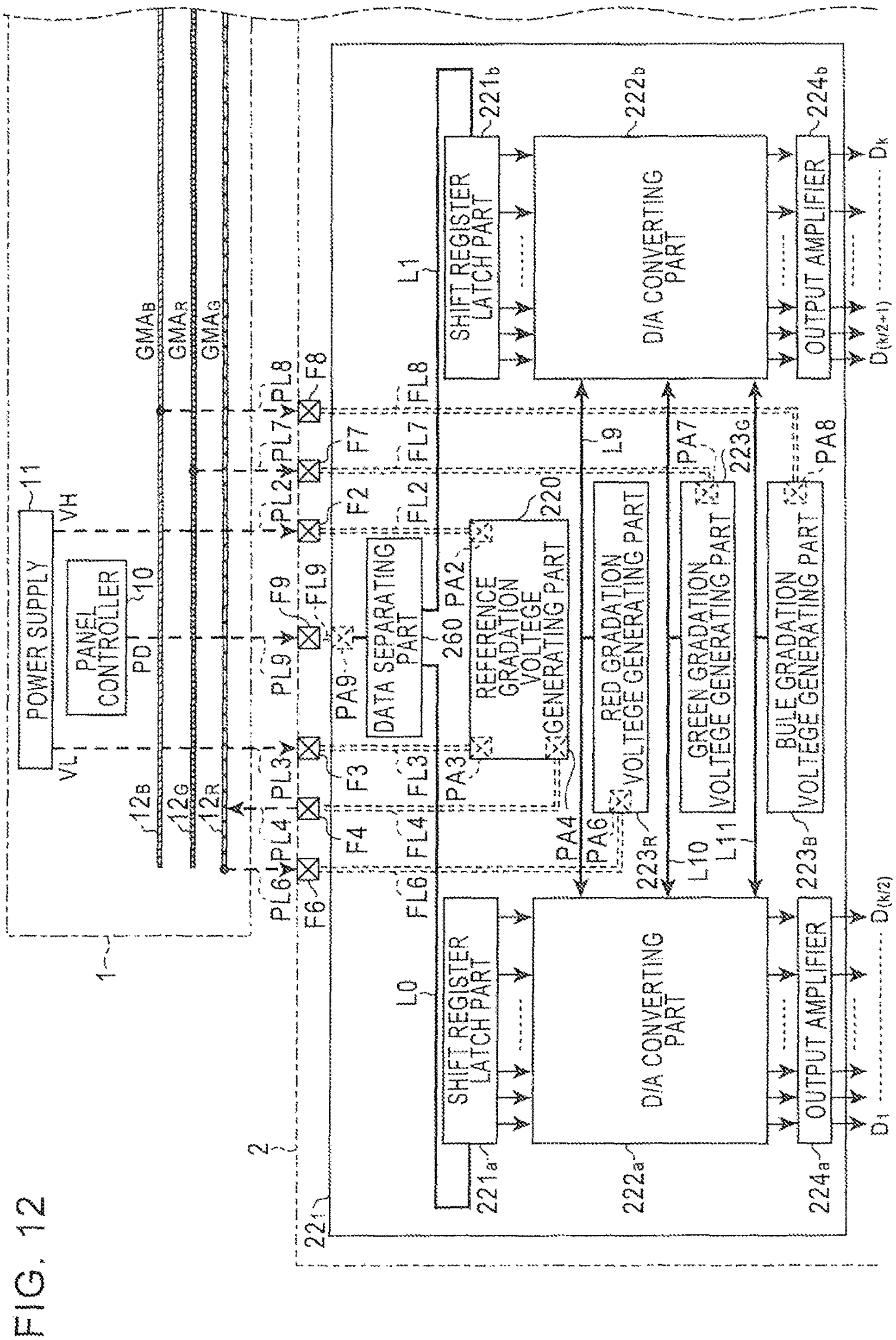
FIG. 12 is a layout chart showing the arrangement of functional blocks and wiring within the chip of the source driver $\mathbf{22}_1$ to be applied when the source driver $\mathbf{22}_1$ is formed in the form of COF (Chip On Film)

FIG. 12 is a layout chart showing the arrangement of functional blocks and wiring configuration within the chip of the source driver $\mathbf{22}_1$ to be applied when the source drivers $\mathbf{22}_1$, $\mathbf{22}_2$ and $\mathbf{22}_3$ are formed in the form of COF (Chip On Film), i.e., when the source drivers $\mathbf{22}_1$, $\mathbf{22}_2$ and $\mathbf{22}_3$ are formed on a film substrate 7 made of e.g. polyimide connected to the display substrate 2.

In the layout shown in FIG. 12, the arrangement of the respective functional blocks (220, 221*a*, 221*b*, 222*a*, 222*b*, $\mathbf{223}_R$, $\mathbf{223}_G$, $\mathbf{223}_B$, 224*a*, 224*b* and 260) is the same as that shown in FIG. 7. In addition, the layout shown in FIG. 12 is the same as that shown in FIG. 7 in that the data separating part 260 and the respective shift register latch parts 221*a* and 221*b* are connected by the respective metal line groups L0 and L1 formed on the first wiring layer, and that the respective gradation voltage generating parts ($\mathbf{223}_R$, $\mathbf{223}_G$, $\mathbf{223}_B$) are connected to the D/A converting parts 222*a* and 222*b* through the metal line groups L9 to L11, respectively.

In the layout shown in FIG. 12, however, the power supply pads PA2, PA3 and the pad group PA4 are provided under an area on which the reference gradation voltage generating part 220 is formed, and the pad groups PA6 to PA8 are provided under areas on which the red gradation voltage generating part $\mathbf{223}_R$, the green gradation voltage generating part $\mathbf{223}_G$ and the blue gradation voltage generating part $\mathbf{223}_B$ are formed, respectively.

Figure 13A:
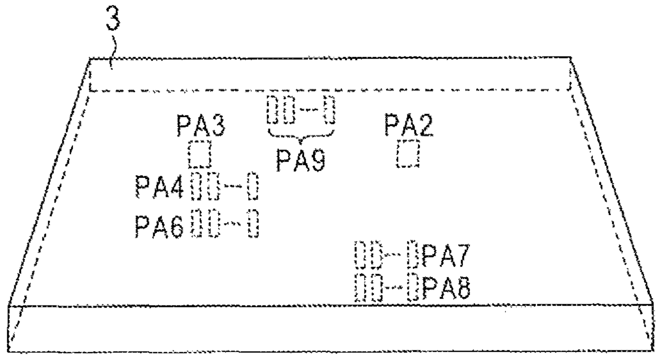

Specifically, as shown in FIG. 13A, the power supply pads PA2, PA3 and the pad groups PA4 to PA8 are provided at respective locations on a bottom surface of the chip 3 corresponding to the respective areas on which the reference gradation voltage generating part 220, the red gradation voltage generating part $\mathbf{223}_8$, the green gradation voltage generating part $\mathbf{223}_G$, and the blue gradation voltage generating part $\mathbf{223}_B$ are formed.

Furthermore, in the layout shown in FIG. 12, pads F2, F3 and pad groups F4 to F9 are disposed along a peripheral part closer to the control substrate 1 out of four peripheral parts of the film substrate 7. The pad group F9 is disposed in a central position of the peripheral part of the film substrate. The pads F2 and F3 are disposed rightward and leftward adjacent to the pad group F9, respectively. The pad group F7 is disposed at a location adjacent to the pad group F2 farther from the central position than the pad F2. The pad group F8 is disposed at a location adjacent to the pad group F7 farther from the central position than the pad F7. The pad group F4 is disposed at a location adjacent to the pad F3 farther from the central position than the pad F3. The pad group F6 is disposed at a location adjacent to the pad group F4 farther from the central position than the pad group F4.

The power supply pads PA2, PA3 and the pad groups PA4 to PA9 formed within the chip are connected to the pads F2, F3 and the pad groups F4 to F9 provided along the peripheral part of the film substrate 7 through the metal lines FL2 and FL3, and metal line groups FL4 to FL9 (shown by double dashed lines) formed on a surface of or within the film substrate 7, respectively. Specifically, the pad group PA9 is connected to the pad group F9 through the metal line group FL9. The power supply pad PA2 is connected to the pad F2 through the metal line FL2. The power supply pad PA3 is connected to the pad F3 through the metal line FL3. The pad group PA4 is connected to the pad group F4 through the metal line group FL4. The pad group PA6 is connected to the pad group F6 through the metal line group FL6. The pad group PA7 is connected to the pad group F7 through the metal line group FL7. The pad group PA8 is connected to the pad group F8 through the metal line group FL8. Here, the material of the metal lines (FL2 to FL4 and FL6 to FL9) formed on the film substrate 7 is a material having lower resistance than the material of the metal wiring within the chip (for example, aluminum), for example, copper.

Figure 13B:
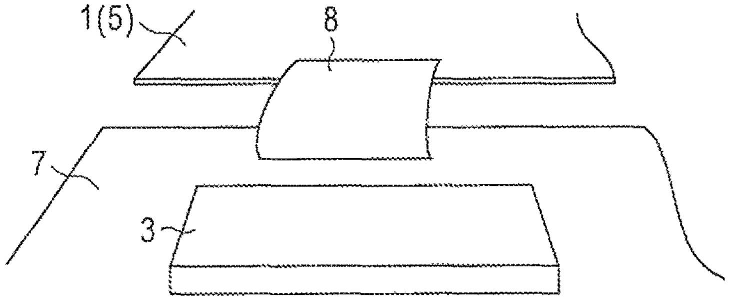

When the layout shown in FIG. 12 is adopted, the pads F2, F3 and the pad groups F4 to F9 provided along the peripheral part of the film substrate 7 are connected to the control substrate 1 by an FPC 8 as shown in FIG. 13B. Specifically, the pad group F9 is connected to the panel controller 10 through the metal line group PL9 wired within the FPC 8. The pads F2 and F3 are connected to the power supply circuit 11 through the metal lines PL2 and PL3 wired within the FPC 8, respectively. The pad group F4 is connected through the metal line group PL4 wired within the FPC 8 to the reference gradation voltage supply line group $\mathbf{12}_R$ formed on the first substrate layer K1 of the control substrate 1 as a multi-layer substrate as shown in FIG. 8C. The pad group F6 is connected through the metal line group PL6 wired within the FPC 8 to the reference gradation voltage supply line group $12_R$ formed on the first substrate layer K1 of the control substrate 1 as shown in FIG. 8C. The pad group F7 is connected through the metal line group PL7 wired within the FPC 8 to the reference gradation voltage supply line group $12_G$ formed on the second substrate layer K2 of the control substrate 1 as shown in FIG. 8C. The pad group F8 is connected through the metal line group PL8 wired within the FPC 8 to the reference gradation voltage supply line group $12_B$ formed on the third substrate layer K3 of the control substrate 1 as shown in FIG. 8C.

As described above, in the layout shown in FIG. 12, the power supply pads PA2, PA3 and the pad groups PA4 to PA8 are provided under the reference gradation voltage generating part 220 and the gradation voltage generating parts for the respective colors ($223_R$, $223_G$, $223_B$). These power supply pads PA2, PA3 and the pad groups PA4 to PA8 are connected to the control substrate 1 through the metal wiring (FL2 to FL4, FL6 to FL9) and the metal wiring (PL2 to PL4, PL6 to PL9) formed within the FPC8. Here, the metal wiring formed within the film substrate 7 and the FPC 8 is made of a material having resistance lower than that of the metal wiring within the chip, and furthermore, can be made of wiring thicker than the metal wiring within the chip.

Therefore, voltage loss incident to wiring resistance can be more greatly suppressed according to the COF layout as shown in FIG. 12 compared with a case where the COG layout as shown in FIG. 7 is adopted.

Figure 14:
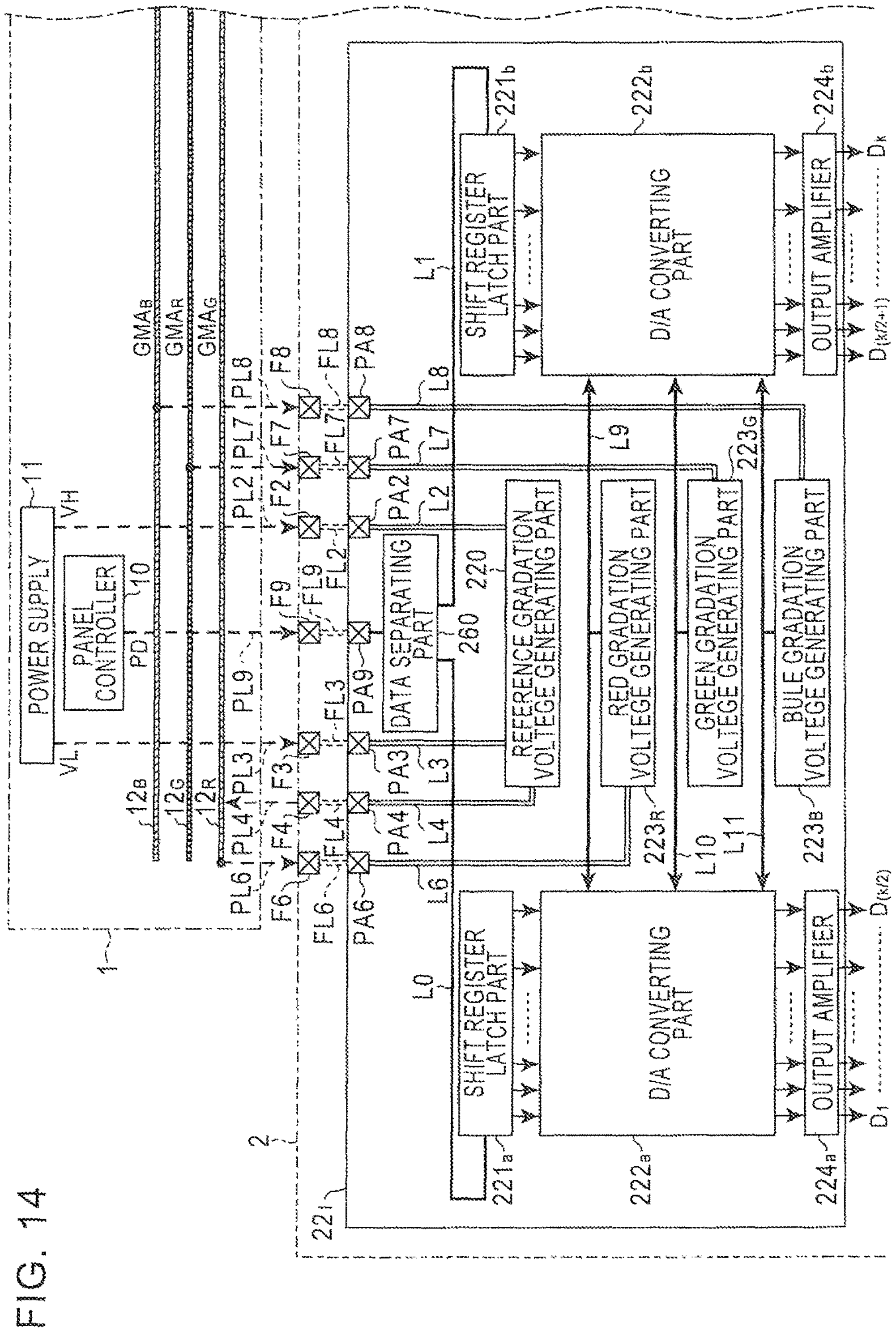
FIG. 14 is a layout chart showing a modification of the arrangement of functional blocks and wiring within the chip shown in FIG. 12.

FIG. 14 is a layout chart showing a modification of the arrangement of functional blocks and wiring configuration within the chip shown in FIG. 12 to be applied where the source drivers $22_1$, $22_2$ and $22_3$ are formed on a film substrate 7 in the form of COF.

In the layout shown in FIG. 14, the arrangement of functional blocks and respective wiring configuration of the metal line groups L0, L1, L9 to L11, within the chip is the same as that shown in FIG. 7. Furthermore, similarly to the layout shown in FIG. 12, the pads F2, F3 and the pad groups F4 to F9 are disposed along a peripheral part closer to the control substrate 1 out of four peripheral parts of the film substrate 7.

The layout shown in FIG. 14 is different from that shown in FIG. 12 in that the power supply pads PA2, PA3 and the pad groups PA4 to PA9 are disposed along the peripheral part of the chip. The power supply pads PA2, PA3 and the pad groups PA4 to PA9 are connected to the pads F2, F3 and the pad groups F4 to F9 disposed along the peripheral part of the film substrate 7 through the metal lines FL2, FL3, and the metal line groups FL4 to FL9 (shown by double dashed lines) formed on a surface of or in the film substrate 7, respectively. Similarly to the layout shown in FIG. 12, the pads F2, F3 and the pad groups F4 to F9 provided along the peripheral part of the film substrate 7 are connected the control substrate 1 through the metal lines PL2, PL3, and the metal line groups PA4, PL6 to PL9 formed in the FPC 8 as shown in FIG. 13B.

In the above embodiments, the configurations of the present invention have been described where they are applied to a source driver which drives an organic electroluminescent display panel; however, the present invention can be similarly applied to a source driver which drives a liquid crystal display panel.

Figure 15:
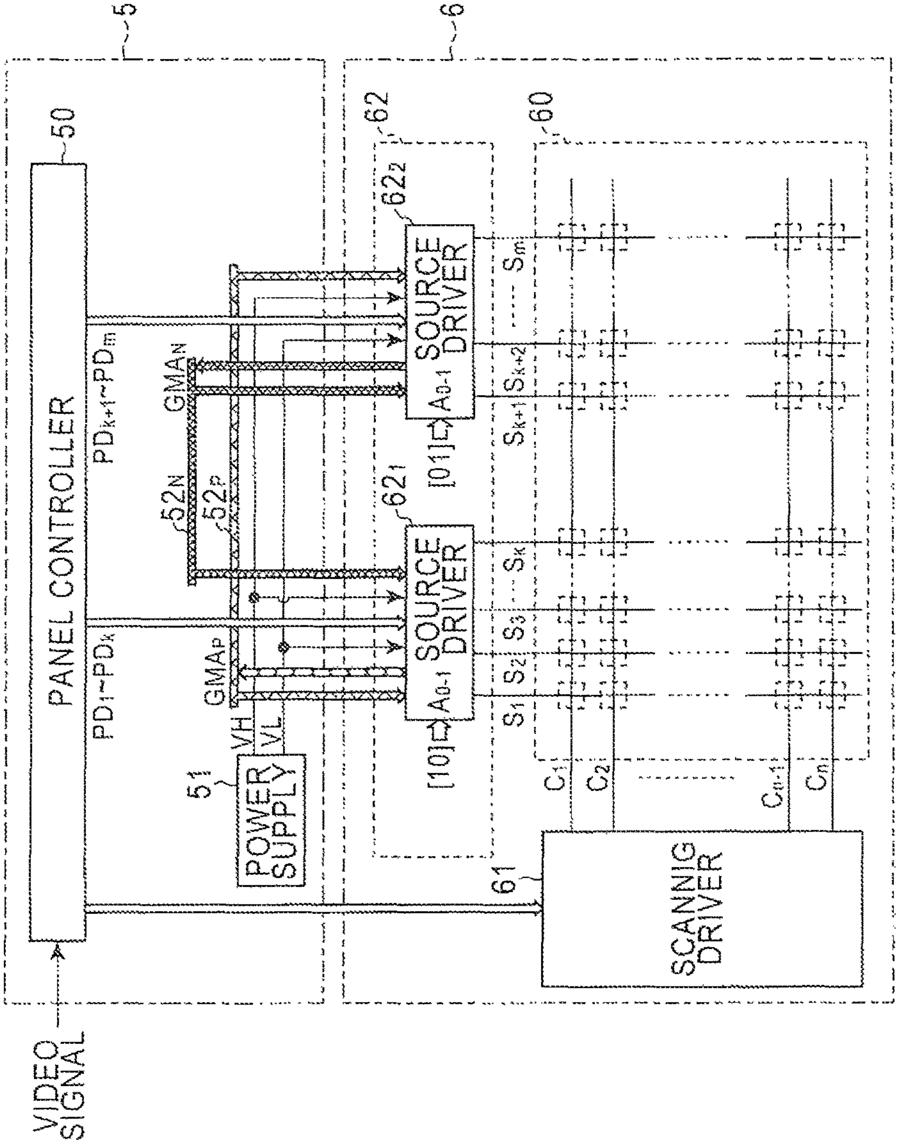
FIG. 15 is a diagram schematically showing the configuration of a liquid crystal display device having thereon a source driver in accordance with the present invention.

FIG. 15 is a diagram schematically showing the configuration of a liquid crystal display device having source driver IC chips in accordance with the present invention.

In FIG. 15, a control substrate 5 is provided with a panel controller 50 and a power supply circuit 51, each of which is a separate IC chip.

A display substrate 6 has on its surface a display panel 60 as a liquid crystal display panel, a scanning driver 61 and a source driver 62. The display substrate 6 is made of a film substrate of polyimide and the like, or a glass substrate. The display panel 60 has n scanning lines C1 to Cn (n is a natural number greater than or equal to 2) each extending in a horizontal direction of a two-dimensional screen and source lines $S_1$ to $S_m$ (m is a natural number greater than or equal to 2) each extending in a vertical direction of the two-dimensional screen, and at respective intersections of the scanning lines C and source lines S liquid crystal cells carrying pixels are formed.

The power supply circuit 51 formed on the control substrate 5 generates a power supply voltage VH having a high potential and a power supply voltage VL having a low potential for the generation of a reference gradation voltage, and supplies the generated voltages to the source driver 62. The panel controller 50 formed on the control substrate 5 generates a scanning control signal which causes the scanning lines $C_1$ to $C_n$ of the display panel 60 to be selected sequentially and alternatively in response to an input video signal, and supplies this to a scanning driver 61 provided on the display substrate 6. The scanning driver 61 sequentially and alternatively applies a scanning pulse to the scanning lines $C_1$ to $C_n$ of the display panel 60 in response to the scanning control signal. The panel controller 50 also generates a pixel data PD representing a brightness level of each of the pixels in response to an input video signal. Here, every time m pixel data $PD_1$ to $PD_m$ for a display line on the display panel 60 are generated, the panel controller 50 divides the generated pixel data $PD_1$ to $PD_m$ into two divided-pixel-data series $PD_1$ to $PD_k$ (k=m/2) and $PD_{k+1}$ to $PD_m$. The panel controller 50 supplies the two groups of the divided-pixel-data series, $PD_1$ to $PD_k$ and $PD_{k+1}$ to $PD_m$ individually to the source driver 22. The control substrate 5 further has printed wiring of a reference gradation voltage supply line group $52_P$ for supplying a positive reference gradation voltage group $GMA_P$ (described later) and a reference gradation voltage supply line group $52_N$ for supplying a negative reference gradation voltage group $GMA_N$ (described later). The wiring of each of the reference gradation voltage supply lines group $52_P$ and $52_N$ is printed on the control substrate 5 to extend in a horizontal direction of a screen of the display panel 60.

The scanning control signal, the pixel data $PD_1$ to $PD_m$ and the power supply voltages VH, VL generated in the control substrate 5 are supplied to the display substrate 6 as described above through an FPC described below. The respective wiring of the reference gradation voltage supply line groups $52_P$ and $52_N$ printed on the control substrate 5 are also connected to the display substrate 6 through the FPC.

As shown in FIG. 15, the source driver 62 provided on a surface of the display substrate 6 is divided into two source drivers $62_1$ and $62_2$, each of which is made of a source driver IC chip formed on an independent rectangular silicon substrate.

The source driver $62_1$ sequentially receives the divided-pixel-data series $PD_1$ to $PD_k$ supplied from the panel controller 50 for respective pixels, generates k driving pulses having gradation voltages corresponding to brightness levels represented by the respective pixel data PD, and applies the generated driving pulses to the source lines $S_1$ to $S_k$ of the display panel 60. The source driver $62_2$ sequentially receives the divided-pixel-data series $PD_{k+1}$ to $PD_m$ supplied from the panel controller 50 for respective pixels, generates k driving pulses having gradation voltages corresponding to brightness levels represented by the respective pixel data PD, and applies the generated driving pulses to the source lines $S_{k+1}$ to $S_m$ of the display panel 60.

Figure 16:
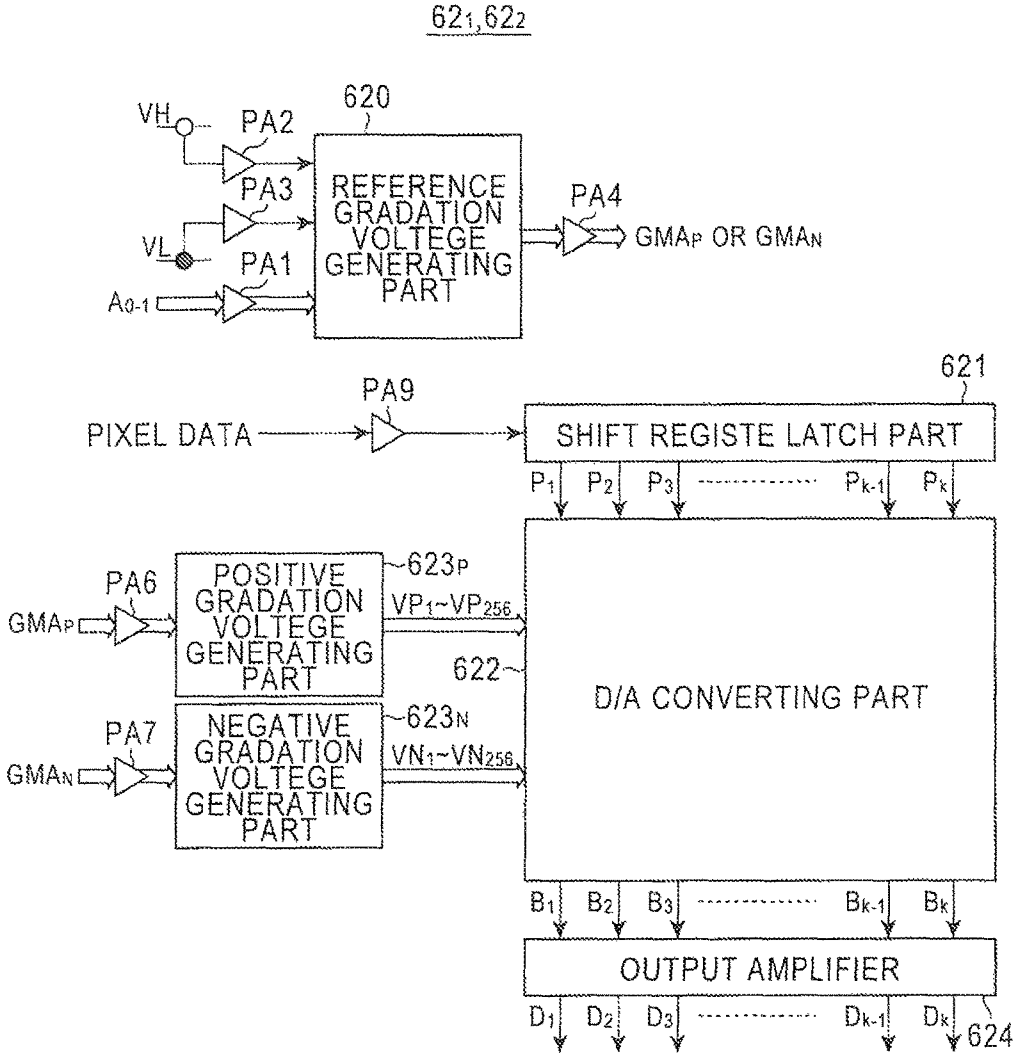
FIG. 16 is a block diagram showing the internal configuration of each of source drivers $\mathbf{62}_1$ and $\mathbf{62}_2$.

Each of the source drivers $62_1$ and $62_2$ has the same internal configuration as shown in FIG. 16.

In FIG. 16, a reference gradation voltage generating part 620 generates, based on a power supply voltage VH inputted through a power supply pad PA2 and a power supply voltage VL inputted through a power supply pad PA3, reference gradation voltages $V1_P$ to $V9_P$ for positive gradation driving each including nine kinds of voltages and reference gradation voltages $V1_N$ to $V9_N$ for negative gradation driving each including nine kinds of voltages. Here, the reference gradation voltage generating part 620 selects one voltage group out of the reference gradation voltages $V1_P$ to $V9_P$ and $V1_N$ to $V9_N$ described above based on an address $A_{0-1}$ inputted through a pad group PA1. When the reference gradation voltage generating part 620 selects the reference gradation voltages $V1_P$ to $V9_P$, the part 620 outputs to the outside of the chip through a pad group 4 a positive reference gradation voltage group $GMA_P$ obtained by individually amplifying each of the selected reference gradation voltages $V1_P$ to $V9_P$. When the reference gradation voltage generating part 620 selects the reference gradation voltages $V1_N$ to $V9_N$, the part 620 outputs to the outside of the chip through the pad group 4 a negative reference gradation voltage group $GMA_N$ obtained by individually amplifying each of the selected voltages $V1_N$ to $V9_N$.

Figure 17:
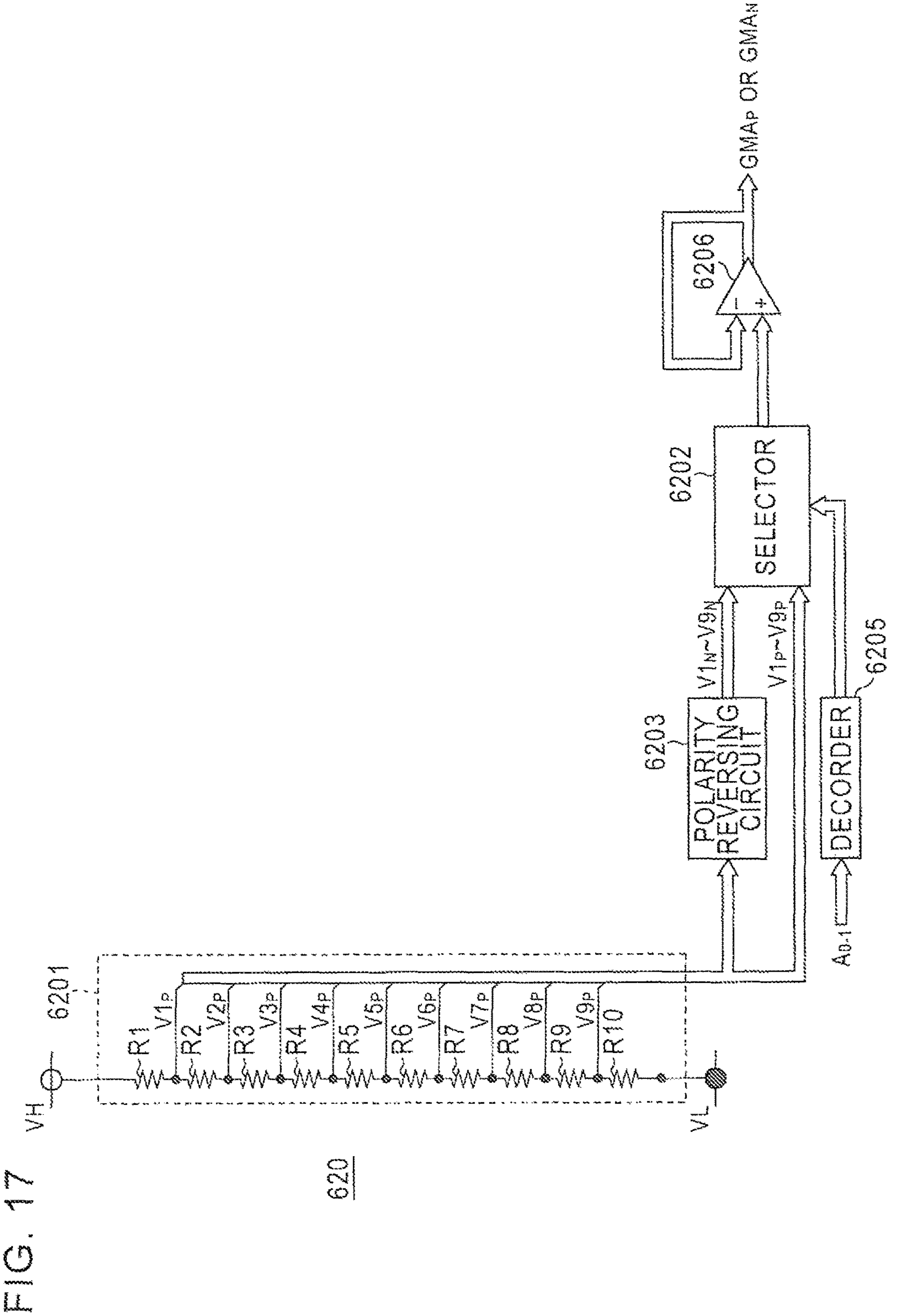
FIG. 17 is a circuit diagram showing an example of the internal configuration of a reference gradation voltage generating part 620.

FIG. 17 is a diagram showing an example of the internal configuration of the reference gradation voltage generating part 620.

In FIG. 17, a voltage-dividing resistor circuit 6201 sends positive reference gradation voltages $V1_P$ to $V9_P$ having voltages based on a gamma characteristic for positive gradation driving from respective connection points between each of resistors R1 to R10 serially connected between the power supply voltages VH and VL, and supplies these voltages to a selector 6202 and a polarity reversing circuit 6203. The polarity reversing circuit 6203 individually converses the respective reference gradation voltages $V1_P$ to $V9_P$ to negative voltages and supplies the negative voltages to the selector 6202 as the reference gradation voltages $V1_N$ to $V9_N$ for negative gradation driving. A decoder 6205 generates a selection signal SEL which caused reference gradation voltages for positive gradation driving to be selected when the address $A_{0-1}$ indicates [10], and supplies the generated selection signal to the selector 6202. When the address $A_{0-1}$ indicates [01], the decoder 6205 generates a selection signal SEL which causes reference gradation voltages for negative gradation driving to be selected and supplies the generated selection signal to the selector 6202.

The selector 6202 selects only one group of reference gradation voltages indicated by the selection signal SEL out of the two groups of the reference gradation voltages $V1_P$ to $V9_P$ and the reference gradation voltages $V1_N$ to $V9_N$, and supplies the selected system of reference gradation voltages to an operational amplifier 6206. Specifically, when a selection signal SEL which causes the reference gradation voltages for positive gradation driving to be selected is supplied, the selector 6202 selects the reference gradation voltages $V1_P$ to $V9_P$ and supplies them to the operational amplifier 6206. On the other hand, when a selection signal SEL which causes the reference gradation voltages for negative gradation driving to be selected is supplied, the selector 6202 selects the reference gradation voltages $V1_N$ to $V9_N$ and supplies them to the operational amplifier 6206. Actually, the operational amplifier 6206 has nine operational amplifiers which individually amplify the respective reference gradation voltages V1 to V9 supplied from the selector 6202. When the reference gradation voltages $V1_P$ to $V9_P$ are supplied from the selector 6202, the operational amplifier 6206 individually amplifies the respective reference gradation voltages and outputs the amplified reference gradation voltages as the positive reference gradation voltage group $GMA_P$. On the other hand, when the reference gradation voltages $V1_N$ to $V9_N$ are supplied from the selector 6202, the operational amplifier 6206 individually amplifies the reference gradation voltages $V1_N$ to $V9_N$ and outputs the amplified reference gradation voltages as the negative reference gradation voltage group $GMA_N$.

Figure 18:
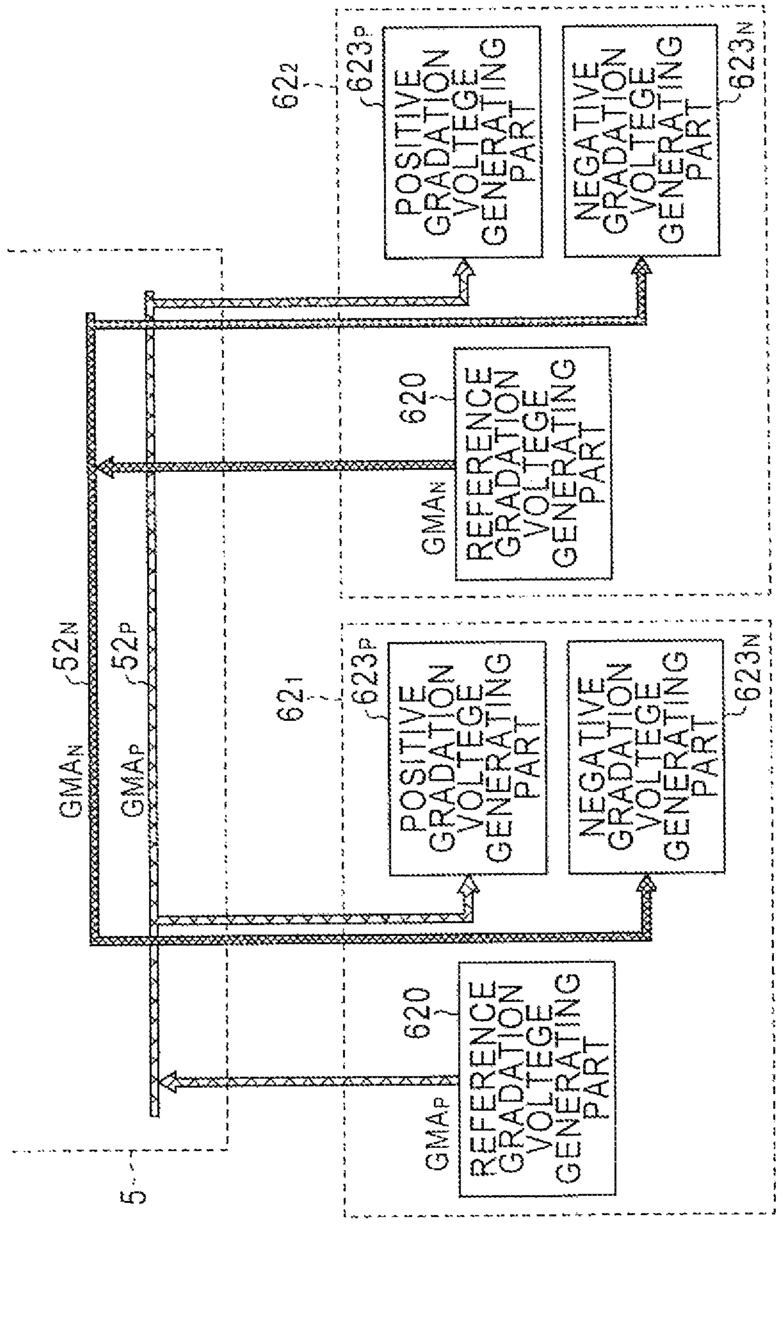
FIG. 18 is a block diagram showing an example of the internal connection between the source drivers $\mathbf{62}_1$, $\mathbf{62}_2$ and a control substrate 5.

In the embodiment shown in FIG. 15, an address $A_{0-1}$ with a value of [10] is fixedly inputted to the source driver $62_1$. Thus, the reference gradation voltage generating part 620 formed in the source driver $62_1$ outputs only the positive reference gradation voltage group $GMA_P$ external to the chip as shown in FIG. 18, and sends the positive reference gradation voltage group to the outside of the chip, and sends the outputted positive reference gradation voltage group to the reference gradation voltage supply line group $52_P$ of the control substrate 5. In this manner, the positive reference gradation voltage group $GMA_P$ is supplied to a positive gradation voltage generating part $623_P$ provided in each of the source drivers $62_1$ and $62_2$ through the reference gradation voltage supply line group $52_P$ formed in the control substrate 5 as shown in FIG. 18. Similarly, in the embodiment shown in FIG. 15, an address $A_{0-1}$ with a value of [01] is fixedly inputted to the source driver $62_2$. Thus, the reference gradation voltage generating part 620 formed in the source driver $62_2$ outputs only the negative reference gradation voltage group $GMA_N$ external to the chip as shown in FIG. 18, and sends the outputted negative reference gradation voltage group to the reference gradation voltage supply line group $52_N$ of the control substrate 5. In this manner, the negative reference gradation voltage group $GMA_N$ is supplied to a negative gradation voltage generating part $623_N$ provided in each of the source drivers $62_1$ and $62_2$ through the reference gradation voltage supply line group $52_N$ formed in the control substrate 5 as shown in FIG. 18.

As seen from the above, the reference gradation voltage generating part 620 generates, based on the address $A_{0-1}$ as an inputted gamma characteristic setting signal, reference gradation voltages for either one system out of the following:

the reference gradation voltages $V1_P$ to $V9_P$ ($GMA_P$) based on a first gamma characteristic for positive gradation; and the reference gradation voltages $V1_N$ to $V9_N$ ($GMA_N$) based on a second gamma characteristic for negative gradation.

Accordingly, even though each of the reference gradation voltage generating parts 620 provided in the respective source drivers $62_1$ and $62_2$ generates a reference gradation voltage different from each other, reference gradation voltage generating parts 620 both have the same internal configuration (shown in FIG. 16). This allows manufacture of the source drivers $62_1$ and $62_2$ using a common mask pattern, making it possible to reduce production costs of the overall system.

Referring again to FIG. 16, a shift register latch part 621 sequentially receive each pixel data PD within the divided-pixel-data series inputted through a pad group 9, and every time k (k=m/2) pixel data have been received, the shift register latch part 621 supplies these k pixel data PD to a D/A converting part 622 as pixel data $P_1$ to $P_k$.

The positive gradation voltage generating part $\mathbf{623}_P$ receives through a pad group PA6 the positive reference gradation voltage group $GMA_P$ supplied through the control substrate 5, generates positive driving gradation voltages $VP_1$ to $VP_{256}$ for 256 gradations based on the gamma characteristic for positive gradation driving based on the reference gradation voltages $V\mathbf{1}_P$ to $V\mathbf{9}_P$ in accordance with the positive reference gradation voltage group $GMA_P$, and supplies the generated positive driving gradation voltages to the D/A converting part 622.

The negative gradation voltage generating part $\mathbf{623}_N$ receives through a pad group PA7 the negative reference gradation voltage group $GMA_N$ supplied through the control substrate 5, generates negative driving gradation voltages $VN_1$ to $VN_{256}$ for 256 gradations based on the gamma characteristic for negative gradation driving based on the reference gradation voltages $V\mathbf{1}_N$ to $V\mathbf{9}_N$ in accordance with the negative reference gradation voltage group $GMA_N$, and supplies the generated negative driving gradation voltages to the D/A converting part 622.

The D/A converting part 622 selects, e.g., for each of the pixel data $P_1$ to $P_k$ corresponding to odd frames, one gradation voltage corresponding to the brightness level represented by the pixel data P out of the positive driving gradation voltages $VP_1$ to $VP_{256}$, and supplies the selected gradation voltages to an output amplifier 624 as gradation brightness voltages $B_1$ to $B_k$. For each of the pixel data $P_1$ to $P_k$ corresponding to even frames, the D/A converting part 622 selects one gradation voltage corresponding to the brightness level represented by the pixel data P out of the negative driving gradation voltages $VN_1$ to $VN_{256}$, and supplies the selected gradation voltages to the output amplifier 624 as gradation brightness voltages $B_1$ to $B_k$. By this operation of the D/A converting part 622, the polarity of the gradation brightness voltages $B_1$ to $B_k$ is reversed for every frame in accordance with the pixel data.

The output amplifier 624 amplifies the respective gradation brightness voltages $B_1$ to $B_k$ supplied from the D/A converting part 622 and outputs the amplified gradation brightness voltages as driving pulses $D_1$ to $D_k$. Here, the output amplifier 624 formed on the source driver $\mathbf{62}_1$ shown in FIG. 15 applies these driving pulses $D_1$ to $D_k$ to the source lines $S_1$ to $S_k$ of the display panel 60, respectively. The output amplifier 624 formed on the source driver $\mathbf{62}_2$ applies these driving pulses $D_1$ to $D_k$ to the source lines $S_{k+1}$ to $S_m$ of the display panel 60, respectively.

As described above, in the liquid crystal display device shown in FIG. 15, the source driver 62 is divided into two source drivers $\mathbf{62}_1$ and $\mathbf{62}_2$ each of which is an independent IC chip. The source driver 62 generates the driving pulses D having gradation voltages corresponding to brightness levels represented by an input video signals and applies the generated driving pulses to the source lines S of the display panel 60. Here, although the positive and negative reference gradation voltage groups $GMA_P$ and $GMA_N$ based the gamma characteristic of the respective polarities (positive and negative), which serve as references for gradation voltages are generated in the source driver 62, the source driver $\mathbf{62}_1$ is provided with a reference gradation voltage generating part 620 which generates only the positive reference gradation voltage group $GMA_P$. The source driver $\mathbf{62}_2$ is provided with a reference gradation voltage generating part 620 which generates only the negative reference gradation voltage group $GMA_N$. As shown in FIG. 18, the positive reference gradation voltage group $GMA_P$ generated in the reference gradation voltage generating part 620 of the source driver $\mathbf{62}_1$ is once outputted to the outside of the chip and the outputted $GMA_R$ is supplied to the positive gradation voltage generating parts $\mathbf{623}_P$ formed in the source drivers $\mathbf{62}_1$ and $\mathbf{62}_2$ respectively through the reference gradation voltage supply line group $\mathbf{52}_P$ printed on the control substrate 5. Similarly, the negative reference gradation voltage group $GMA_N$ generated in the reference gradation voltage generating part 620 of the source driver $\mathbf{62}_2$ is once outputted to the outside of the chip and the outputted $GMA_N$ is supplied to the negative gradation voltage generating parts $\mathbf{623}_N$ formed in the source drivers $\mathbf{62}_1$ and $\mathbf{62}_2$ respectively through the reference gradation voltage supply line group $\mathbf{52}_N$ printed on the control substrate 5.

In short, two reference gradation voltage generating parts needed to generate the positive and negative reference gradation voltage groups $GMA_P$ and $GMA_N$ each having different gamma characteristic for the brightness level of an input video signal are mounted one by one on the respective source drivers $\mathbf{62}_1$ and $\mathbf{62}_2$ in a distributed manner. The positive and negative reference gradation voltage groups $GMA_P$ and $GMA_N$ are once outputted to the outside of the chip from the source drivers $\mathbf{62}_1$ and $\mathbf{62}_2$ respectively, and then supplied to the positive and negative gradation voltage generating parts $\mathbf{623}_P$ and $\mathbf{623}_N$ provided in the respective source drivers $\mathbf{62}_1$ and $\mathbf{62}_2$ through the respective reference gradation voltage supply line groups $\mathbf{52}_P$ and $\mathbf{52}_N$ in the control substrate 5.

Such configuration makes it possible to reduce the costs of the overall system because the reference gradation voltage generating parts 620 are provided within the source drivers.

Furthermore, according to the above described configuration, the two systems of the operational amplifiers 6206 as shown in FIG. 17 necessary to generate the positive and negative reference gradation voltage groups $GMA_P$ and $GMA_N$ are distributed to the source drivers $\mathbf{62}_1$ and $\mathbf{62}_2$ with one source driver being provided with one operational amplifier.

This enables a smaller chip size of the respective source drivers compared with a case where operational amplifiers 6206 for two systems are provided in the respective source drivers, and also to reduction in power consumption and heat generation in the respective source drivers.

Furthermore, in the configuration shown in FIG. 15, the reference gradation voltage group ($GMA_P$, $GMA_N$) generated in the reference gradation voltage generating part 620 mounted on one of the source drivers $\mathbf{62}_1$ and $\mathbf{62}_2$ is shared among the source drivers $\mathbf{62}_1$ and $\mathbf{62}_2$. Here, the operational amplifier 6206 contained within the reference gradation voltage generating part 620 which generates the positive reference gradation voltage group $GMA_P$ is mounted only on the source driver $\mathbf{62}_1$ out of the source drivers $\mathbf{62}_1$ and $\mathbf{62}_2$. On the other hand, the operational amplifier 6206 contained within the reference gradation voltage generating part 620 which generates the negative reference gradation voltage group $GMA_N$ is mounted only on the source driver $\mathbf{62}_2$ out of the source drivers $\mathbf{62}_1$ and $\mathbf{62}_2$.

Therefore, even if offset voltages of the operational amplifiers 6206 are varied between the source drivers $\mathbf{62}_1$ and $\mathbf{62}_2$, reference gradation voltage group ($GMA_P$ or $GMA_N$) will not be affected by this with respect to each of the polarities (positive or negative) of the gradation driving voltages having different gamma characteristic. Therefore, flicker in the image displayed on the display panel 60 can be prevented.

In the source driver $22_1$ ($62_2$) in the above embodiment, the positive reference gradation voltage group $GMA_P$ ($GMA_N$) generated in the reference gradation voltage generating part 620 is supplied to the positive gradation voltage generating part $623_P$ of its own through the reference gradation voltage supply line group $52_P$ ($52_N$) in the control substrate 5 as shown in FIG. 18. However, the positive reference gradation voltage group $GMA_P$ ($GMA_N$) generated in the reference gradation voltage generating part 620 in the source driver $62_1$ ($62_2$) may be supplied to the positive gradation voltage generating part $623_P$ ($623_N$) of its own through wiring provided in the source driver $62_1$ ($62_2$) as shown in FIG. 19.

Figure 19:
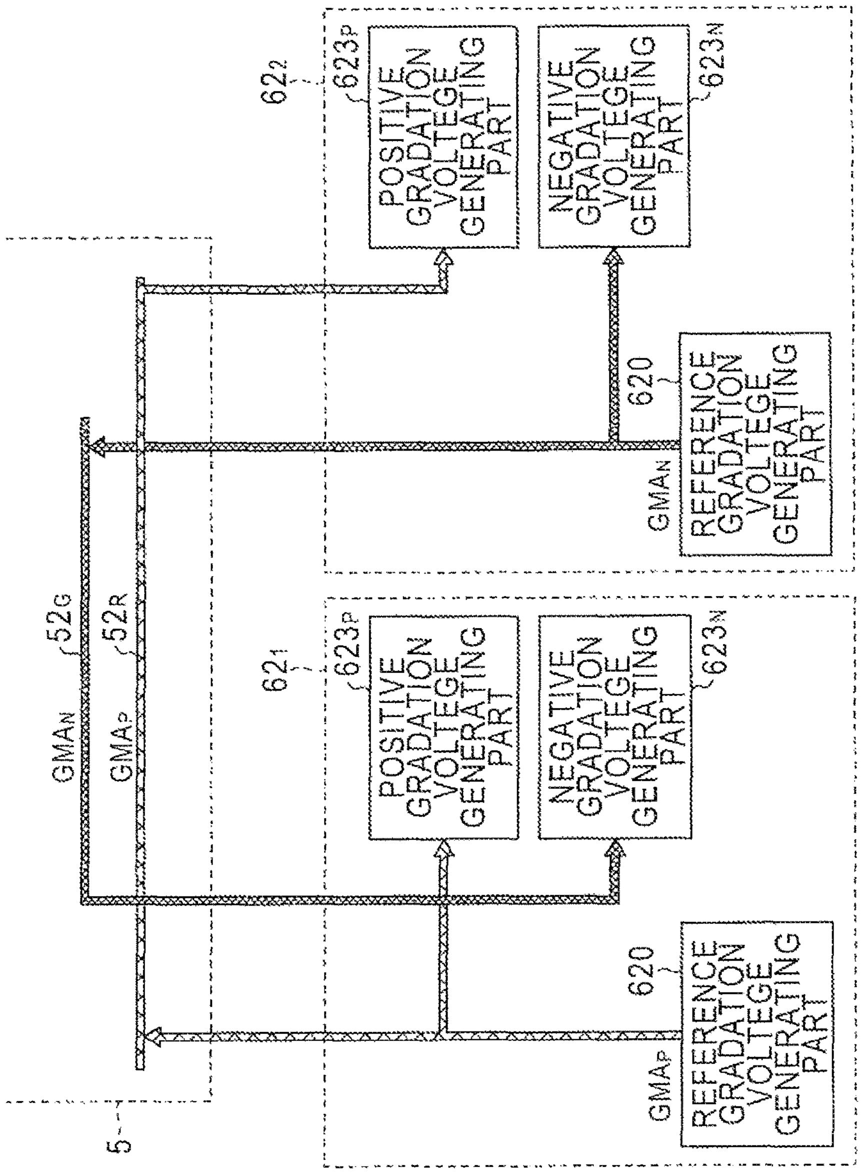
FIG. 19 is a block diagram showing another example of the internal connection between the source drivers $\mathbf{62}_1$, $\mathbf{62}_2$ and the control substrate 5.

The configuration shown in FIG. 19 requires less number of pad groups PA to be provided in each of the source drivers $62_1$ and $62_2$ compared with the configuration shown in FIG. 15.

In the embodiment shown in FIG. 15, the configuration has been explained taking as an example a source driver 62 which is divided into the two source drivers $62_1$ and $62_2$. However, the above configuration of the invention can be similarly applicable to a source driver divided into three or more source drivers.

Figure 20:
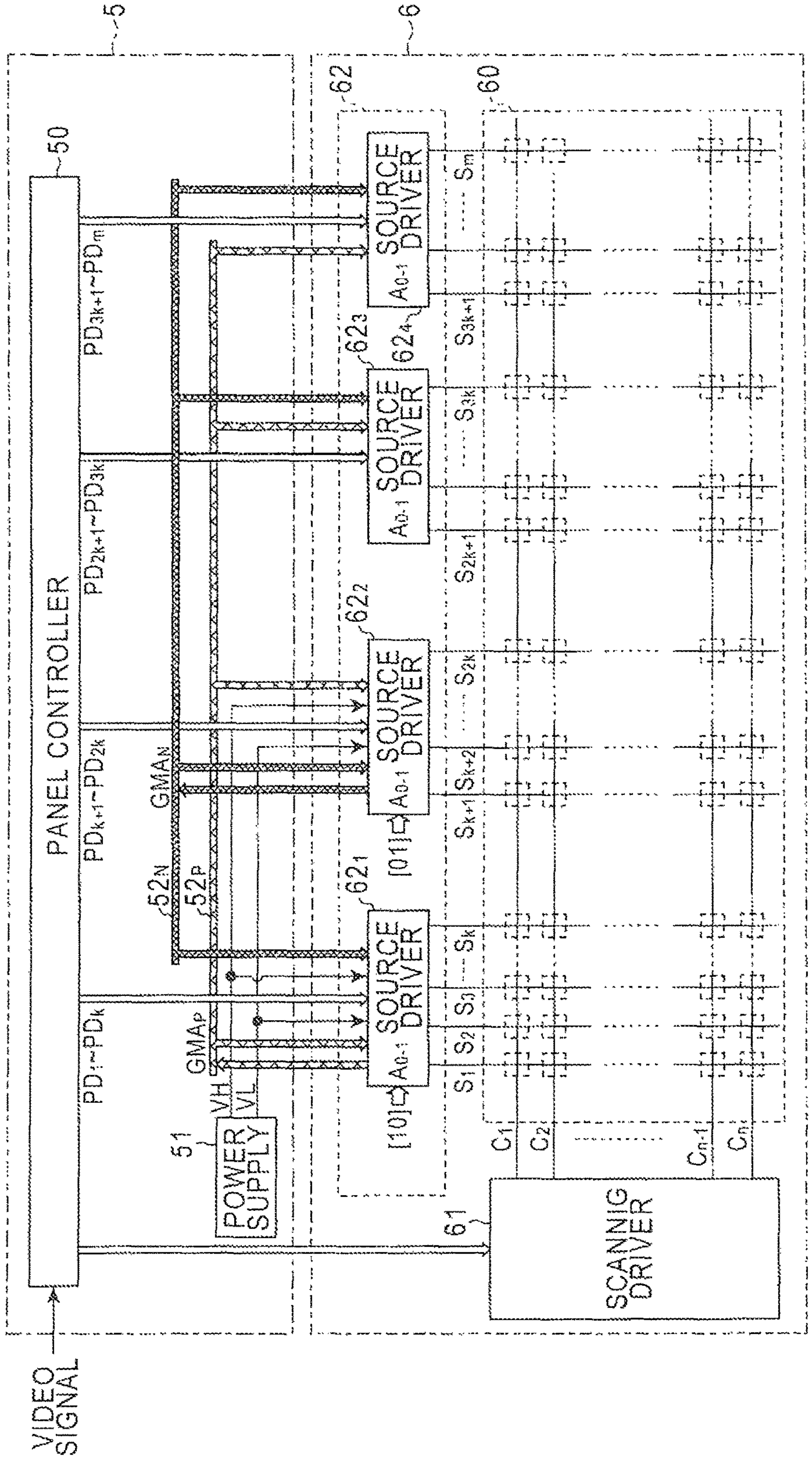
FIG. 20 is a diagram schematically showing another example of the configuration of a liquid crystal display device having thereon four source drivers $\mathbf{62}_1$ to $\mathbf{62}_4$.

FIG. 20 shows an example of a configuration wherein the source driver 62 is divided into four source drivers $62_1$ to $62_4$.

The configuration shown in FIG. 20 is the same as that shown in FIG. 15 except that the source lines $S_1$ to $S_m$ of the display panel 60 are driven separately by four source drivers $62_1$ to $62_4$.

In the configuration shown in FIG. 20, the panel controller 50 divides the pixel data $PD_1$ to $PD_m$ for a display line generated in accordance with an input video signal into four divided-pixel-data series $PD_1$ to $PD_k$ (k=m/4), $PD_{k+1}$ to $PD_{2k}$, $PD_{2k+1}$ to $PD_{3k}$, and $PD_{3k+1}$ to $PD_m$. The panel controller 50 supplies the divided-pixel-data series $PD_1$ to $PD_k$, $PD_{k+1}$ to $PD_{2k}$, $PD_{2k+1}$ to $PD_{3k}$, and $PD_{3k+1}$ to $PD_m$ to the source drivers $62_1$, $62_2$, $62_3$ and $62_4$, respectively. The source drivers $62_1$ to $62_4$ all have the same internal configuration (shown in FIG. 16). Therefore, the source driver $62_1$ generates driving pulses $D_1$ to $D_k$ corresponding to the pixel data $PD_1$ to $PD_k$ respectively to apply the generated driving pulses $D_1$ to $D_k$ to the source lines $S_1$ to $S_k$ of the display panel 60, respectively. The source driver $62_2$ generates driving pulses $D_1$ to $D_k$ corresponding to the pixel data $PD_{k+1}$ to $PD_{2k}$ respectively to apply the generated driving pulses $D_1$ to $D_k$ to the source lines $Sk+_1$ to $S_{2k}$ of the display panel 60, respectively. The source driver $62_3$ generates driving pulses $D_1$ to $D_k$ corresponding to the pixel data $PD_{2k+1}$ to $PD_{3k}$ respectively to apply the generated driving pulses $D_1$ to $D_k$ to the source lines $S_{2k+1}$ to $S_{3k}$ of the display panel 60, respectively. The source driver $62_4$ generates driving pulses $D_1$ to $D_k$ corresponding to the pixel data $PD_{3k+1}$ to $PD_m$ respectively to apply the generated driving pulses $D_1$ to $D_k$ to the source lines $S_{3k+1}$ to $S_m$ of the display panel 60, respectively.

Similarly to the configuration shown in FIG. 15, in the configuration shown in FIG. 20, an address $A_{0-1}$ with a value of [10] is fixedly inputted to the source driver $62_1$, and an address $A_{0-1}$ with a value of [01] to the source driver $62_2$. Thus, similarly to the configuration shown in FIG. 15, the source driver $62_1$ is a supply source of the positive reference gradation voltage group $GMA_P$ for all the source drivers $62_1$ to $62_4$, and the source driver $62_2$ a supply source of the negative reference gradation voltage group $GMA_N$ for all the source drivers $62_1$ to $62_4$.

Here, in the configuration shown in FIG. 20, the address $A_{0-1}$ and the power supply voltages VH and VL are not supplied to the source drivers $62_3$ and $62_4$. In short, in the source drivers $62_3$ and $62_4$, the pad group PA1 and the power supply pads PA2 and PA3 to which the address $A_{0-1}$ and the power supply voltages VH and VL are inputted respectively are left in an open state. Since the power supply voltages VH and VL are not supplied to the source drivers $62_3$ and $62_4$, the operation of each of the reference gradation voltage generating parts 620 mounted on the respective source drivers $62_3$ and $62_4$ comes to a stopped state. In other words, since the source drivers $62_3$ and $62_4$ do not need to generate reference gradation voltages, the pad group PA1 for the address $A_{0-1}$ and the power supply pad PA2 for the power supply voltages VH and the power supply pad PA3 for the power supply voltage VL are left in an open state, thereby stopping the operation of the reference gradation voltage generating part 620 to suppress power consumption. Since the source drivers $62_3$ and $62_4$ need not generate reference gradation voltages, it is possible to assign an address $A_{0-3}$ with a value of [0000] to the source drivers $62_3$ and $62_4$ to stop the operation of the operational amplifier 6206. It is also possible to set the address $A_{0-3}$ the same manner as either one of the source driver $62_1$ and $62_2$ to generate reference gradation voltages in parallel. It is further possible to supply a fixed potential such as a ground potential in place of not supplying the power supply voltages Vh and VL.

The arrangement of respective functional blocks and wiring to be constructed within the respective source driver $62_1$ and $62_2$ as an independent IC chip, and connection configuration between the control substrate 5 and the respective source drivers $62_1$ and $62_2$ will be explained referring only to the source driver $62_1$.

Figure 21:
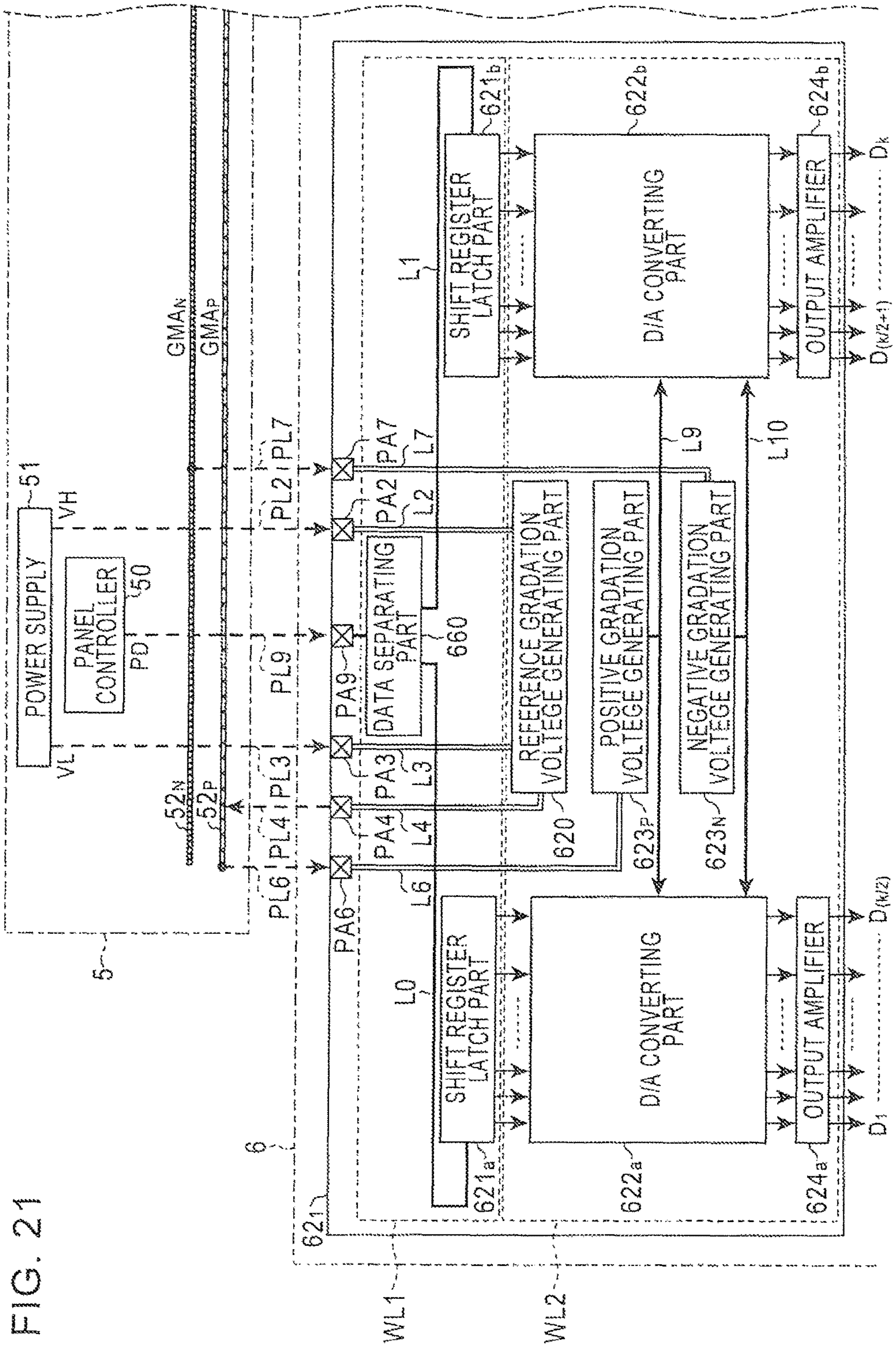
FIG. 21 is a layout chart showing the arrangement of functional blocks and wiring within a chip of the source driver $\mathbf{62}_1$ when the source driver $\mathbf{62}_1$ is formed on a display substrate 6 in the form of COG (Chip On Glass).

FIG. 21 is a layout diagram showing the arrangement of functional blocks and wiring within the chip of the source driver $62_1$ which is applied to a case where the source driver $62_1$ and $62_2$ are formed on the display substrate 6 in the form of COG, i.e., where the display substrate 6 is a glass substrate.

As shown in FIG. 21, a shift register latch part 621, a D/A converting part 622 and an output amplifier 624 as functional blocks are disposed within the chip divided into two parts, one of which generates driving pulses $D_1$ to $D_{k/2}$ and the other of which generates driving pulses $D_{(k/2+1)}$ to $D_k$, out of driving pulses $D_1$ to $D_k$.

In other words, a shift register latch part 621*a*, a D/A converting part 622*a* and an output amplifier 624*a* as a first drive part are formed in an area on a left side of the center of the chip in a horizontal direction of a screen. The first drive part generates driving pulses $D_1$ to $D_{k/2}$ in response to an input video signal to apply the generated driving pulses $D_1$ to $D_{k/2}$ to the source lines $S_1$ to $S_{k/2}$ of the display panel 60, respectively. A shift register latch part 621*b*, a D/A converting part 622*b* and an output amplifier 624*b* as a second drive part are formed in an area on a right side of the center of the chip in the horizontal direction of the screen. The second drive part generates driving pulses $D_{(k/2+1)}$ to $D_k$ in response to an input video signal to apply the generated driving pulses $D_{(k/2+1)}$ to $D_k$ to the source lines $S_{(k/2+1)}$ to $S_k$ of the display panel 60, respectively. A reference gradation voltage generating part 620 is formed in an intermediate area between the area in which the shift register latch part 621*a*, the D/A converting part 622*a* and the output amplifier 624*a* are formed and the area in which the shift register latch part 621*b*, the D/A converting part 622*b* and the output amplifier 624*b* are formed, i.e., in a central area of the chip. A positive gradation voltage generating part $623_P$ and a negative gradation voltage generating part $623_N$ are formed in locations in the intermediate area closer to the display panel 60 than the reference gradation voltage generating part 620. In the intermediate area, a data separating part 660 is further constructed in a location closer to the control substrate 1 than the reference gradation voltage generating part 620.

Functional blocks (660, 621*a*, 621*b*) like a logic power supply which operate at low voltages (e.g. 3.3 V) are disposed on a side closer to the control substrate 1 as shown in FIG. 21, and other functional blocks (620, 622*a*, 622*b*, 624*a*, 624*b*, $623_P$, $623_N$) which operate at high voltages are disposed on a side closer to the display panel 60.

Figure 22A:
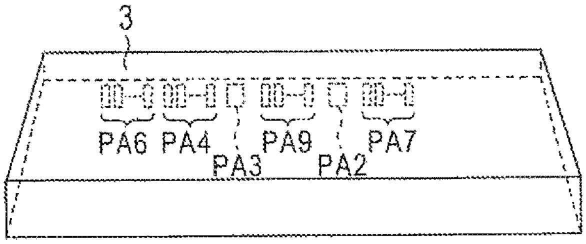

Furthermore, as shown in FIG. 21, power supply pads PA2 and PA3 and pad groups PA4, PA6, PA7 and PA9 are formed under a peripheral part on the side of the control substrate 1 out of four peripheral parts of the chip, i.e., on a bottom side of the chip 3 as shown in FIG. 22A. "A pad group" refers to a group of pads constituted by a plurality of input/output pads. In FIG. 21, the pad group PA9 to which the pixel data PD is inputted is located in a central position of the peripheral part of the chip. The power supply pads PA2 and PA3 to which the power supply voltages VH and VL are inputted respectively are located adjacently on the right and left sides of the pad group PA9, respectively. The pad group PA7 to which the negative reference gradation voltage group $GMA_N$ is inputted is disposed at a location adjacent to the power supply pad PA2 farther from the central position than the power supply pad PA2. The pad group PA4 which externally outputs the reference gradation voltage group ($GMA_P$ or $GMA_N$) generated by the reference gradation voltage generating part 620 is disposed at a location adjacent to the power supply pad PA3 farther from the central position than the power supply pad PA3. The pad group PA6 to which the positive reference gradation voltage group $GMA_P$ is inputted is disposed at a location adjacent to the pad group PA4 farther from the central position than the pad group PA4.

Figure 22B:
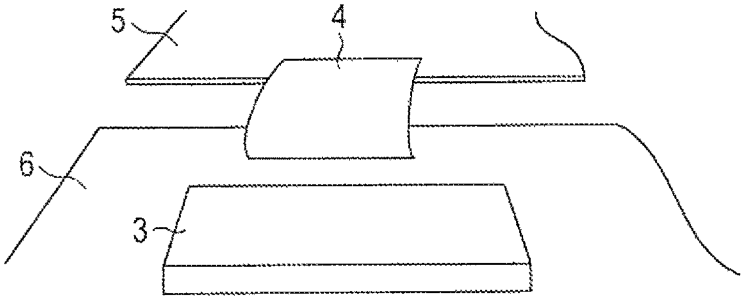

The power supply pads PA2, PA3 and pad groups PA4, PA6, PA7 and PA9 described above which are formed on the bottom side of the chip 3 which includes the source drivers ($62_1$, $62_2$) are connected to a power supply circuit 51 and a panel controller 50 formed on a control substrate 5 through an FPC 4 which connects the control substrate 5 and the display substrate 6 as shown in FIG. 22B and metal line groups (PL2 to PL4, PL6, PA7 and PL9) formed on the surface of the display substrate 6.

Figure 22C:
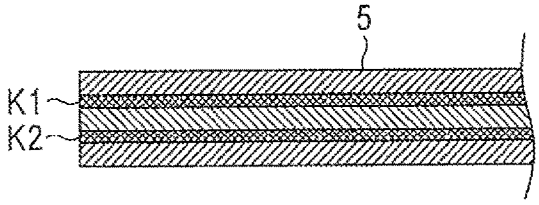

Specifically, the pad group PA9 is connected to the panel controller 50 through the metal line group PL9 wired in the display substrate 6 and the FPC 4. The power supply pads PA2 and PA 3 are connected to the power supply circuit 51 through the respective metal lines PL2 and PL3 wired in the display substrate 6 and the FPC 4. The pad group PA4 is connected to the reference gradation voltage supply line group $52_P$ formed on a first substrate layer K1 of the control substrate 5 as a multi-layer substrate as shown in FIG. 22C through the metal line group PL4 wired in the display substrate 6 and the FPC 4. The pad group PA6 is connected to the reference gradation voltage supply line group $52_P$ formed on the second substrate layer K2 of the control substrate 5 as shown in FIG. 22C through the metal line group PL6 wired in the display substrate 6 and the FPC 4. The pad group PA7 is connected to the reference gradation voltage supply line group $52_N$ through the metal line group PL7 wired in the display substrate 6 and the FPC 4.

In such chip, the data separating part 660 separates the divided-pixel-data series PD inputted through the pad group PA9 into first and second halves of the pixel-data series, and supplies the first half to the shift register latch part 621*a* through a metal line group L0 formed on a first wiring layer (not shown). The data separating part 660 also supplies the second half to the shift register latch part 621*b* through a metal line group L1 formed on the first wiring layer.

The power supply voltage VH inputted through the power supply pad PA2 is supplied to the reference gradation voltage generating part 620 through a metal line L2 formed on a second wiring layer (not shown) different from the first wiring layer. The power supply voltage VL inputted through the power supply pad PA3 is supplied to the reference gradation voltage generating part 620 through a metal line L3 formed on the second wiring layer.

The reference gradation voltage group $GMA_P$ ($GMA_N$) generated in the reference gradation voltage generating part 620 is sent to the pad group PA4 through the metal line group L4 formed on the second wiring layer.

The positive reference gradation voltage groups $GMA_P$ inputted through the pad group PA6 is supplied to the positive gradation voltage generating part $623_P$ through the metal line group L6 formed on the second wiring layer. The negative reference gradation voltage group $GMA_N$ inputted through the pad group PA7 is supplied to the negative gradation voltage generating part $623_N$ through the metal line group L7 formed on the second wiring layer.

Positive gradation voltages $VP_1$ to $VP_{256}$ generated by the positive gradation voltage generating part $623_P$ are supplied to the D/A converting parts 622*a* and 622*b* through the metal line group L9 formed on the first wiring layer. The negative gradation voltages $VN_1$ to $VN_{256}$ generated by the negative gradation voltage generating part $623_N$ are supplied to the D/A converting parts 622*a* and 622*b* through a metal line group L10 formed on the first wiring layer.

In the layout shown in FIG. 21, a low-voltage functional block group (660, 621*a*, 621*b*) which operates at low voltages (e.g. 3.3 V) is formed in a low-voltage well area WL1 provided on the chip surface on a side closer to the control substrate 1. On the other hand, high-voltage functional block group (620, 622*a*, 622*b*, 624*a*, 624*b*, $623_P$, $623_N$) which handles relatively high voltages to be applied to the source lines of the display panel 60 are formed in a high-voltage well area WL2 provided at a location on the chip surface closer to the display panel 60 than the well area WL1.

As described above, in the layout shown in FIG. 21, voltage loss incident to the wiring length between the high-voltage functional block groups and the display panel 60 is suppressed by forming the high-voltage functional block groups which generate high voltages to be applied to the display panel 60 on the side of the chip closer to the display panel 60.

In reality, the D/A converting part (622*a*, 622*b*) shown in FIG. 21 has k D/A converting elements (not shown) corresponding to the respective source lines $S_1$ to $S_k$ arranged along one of the four peripheral parts of the chip (the peripheral part on the side closer to the display panel 60).

Therefore, if the D/A converting part (622*a*, 622*b*) is not divided in the manner as shown in FIG. 21, there will be a large difference between the wiring length of the metal line groups L9 and L10 for supplying gradation voltages to a D/A converting element corresponding to the source line $S_1$ and the wiring length of the metal line groups L9 and L10 for supplying gradation voltages to a D/A converting element corresponding to the source line $S_k$. In short, there will be a large difference between the longest and shortest wiring lengths among the wiring lengths of the metal line groups L9 and L10 for the respective k D/A converting elements, thus causing variations in brightness incident to a large difference in wiring resistance.

Therefore, in the layout shown in FIG. 21, the drive part which includes the D/A converting part is configured to be divided, along one of the four peripheral parts of the chip, into an area on the left side and an area on the right side of the center of the chip in a horizontal direction of a screen, and the positive gradation voltage generating part $\mathbf{623}_P$ and the negative gradation voltage generating part $\mathbf{623}_N$ are formed in an intermediate area between the two areas.

This will decrease the difference between the longest and shortest wiring lengths among the wiring lengths of the metal line groups L9 and L10 for the respective k D/A converting elements, thereby variations in brightness can be reduced.

Also, in the layout shown in FIG. 21, the reference gradation voltage generating part 620 is formed in the intermediate area, and the power supply voltages VH and VL are supplied to the reference gradation voltage generating part 620 through the metal lines L2 and L3, respectively. The power supply voltages VH and VL are inputted through the power supply pads PA2 and PA3 respectively which are provided on the left and right sides of the central position of the peripheral part of the chip on the side closer to the control substrate 5. Furthermore, the reference gradation voltage group ($GMA_P$ or $GMA_N$) generated by the reference gradation voltage generating part 620 is outputted externally through the pad group PA4 which is leftward adjacent to the pad PA3 in the horizontal direction of the screen.

Specifically, the reference gradation voltage generating part 620 is formed in a central area of the chip, and the power supply pads PA2 and PA3 to which the power supply voltages VH and VL to be supplied to the reference gradation voltage generating part 620 are inputted respectively are disposed in the two areas separated by the central position of the peripheral part of the chip on the display panel side. Then, the pad group PA4 for externally outputting the reference gradation voltage group ($GMA_P$ or $GMA_N$) generated by the reference gradation voltage generating part 620 is disposed adjacent to the power supply pad PA3, thereby the length of the wiring which connects the reference gradation voltage generating part 620 and the control substrate 5 is reduced and voltage loss caused by wiring resistance is suppressed.

Furthermore, the positive reference gradation voltage group $GMA_P$ inputted through the pad group PA6 leftward adjacent to the pad group PA4 in the horizontal direction of the screen is supplied to the positive gradation voltage generating part $\mathbf{623}_P$ through the metal line group L6. The negative reference gradation voltage group $GMA_N$ inputted through the pad group PA7 rightward adjacent to the pad group PA2 in the horizontal direction of the screen is supplied to the negative gradation voltage generating part $\mathbf{623}_N$ through the metal line group L7.

According to the layout described above, two sets of metal line groups (L4, L6) and pad groups (PA4, PA6) for transmitting a reference gradation voltage group ($GMA_P$) is located in the area on the left relative to the center of the chip in the horizontal direction of the screen as shown in FIG. 21. Furthermore, one set of metal line group (L7) and pad group (PA7) for transmitting a reference gradation voltage group ($GMA_N$) is located in the area on the right relative to the center of the chip in the horizontal direction of the screen.

In this manner, it becomes possible to disposed the data separating part 660 in the central position in the horizontal direction of the screen as shown in FIG. 21. Therefore, it becomes possible to decrease the difference in length between the wring of the metal line group L0 which supplies pixel data to the shift register latch parts 621*a* and the metal line group L1 which supplies pixel data to the shift register latch parts 621*b*.

Furthermore, in the configuration shown in FIG. 21, a reference gradation voltage generated in each of the source driver chips to be externally outputted is supplied to the respective source driver chips through the reference gradation voltage supply line group ($\mathbf{52}_P$, $\mathbf{52}_N$) printed on the control substrate 5 in a manner to extend in the horizontal direction of the display panel 60.

Therefore, each source driver chip can be connected with the reference gradation voltage supply line group formed on the control substrate 5 by the FPC, and thus the number of production processes can be reduced and production costs can be suppressed compared with a case where the respective chips are individually connected with separate lines.

Figure 23:
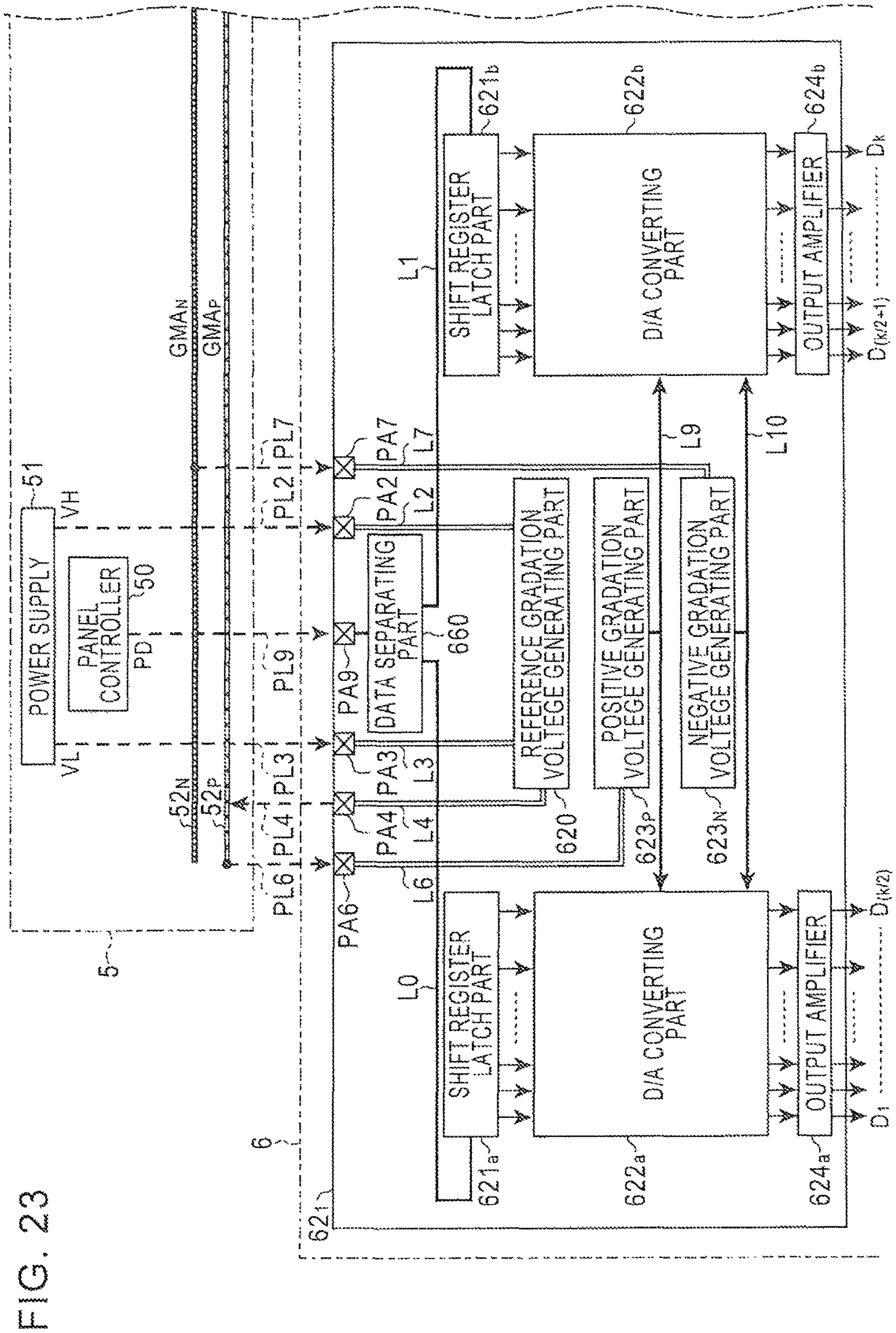
FIG. 23 is a layout chart showing a modification of the arrangement of functional blocks and wiring within the chip shown in FIG. 21.

FIG. 23 is a layout chart showing a modification of the arrangement of functional blocks and wiring configuration within the chip shown in FIG. 21.

In the layout shown in FIG. 23, the layout and wiring arrangement are the same as those shown in FIG. 21 except that a location at which the power supply pad PA3 is disposed is exchanged with a location at which the pad group PA6 is disposed.

According to the layout shown in FIG. 23, the wiring length of the metal line L4 which transmits the reference gradation voltage group (GMA) generated in the reference gradation voltage generating part 620 to the pad group PA4 becomes shorter than a case where the layout shown in FIG. 21 is adopted. Therefore, if voltage loss inside of the chip is large when the reference gradation voltage group is sent to the control substrate 5, adoption of the layout shown in FIG. 23 in place of that shown in FIG. 21 is preferable.

Figure 24:
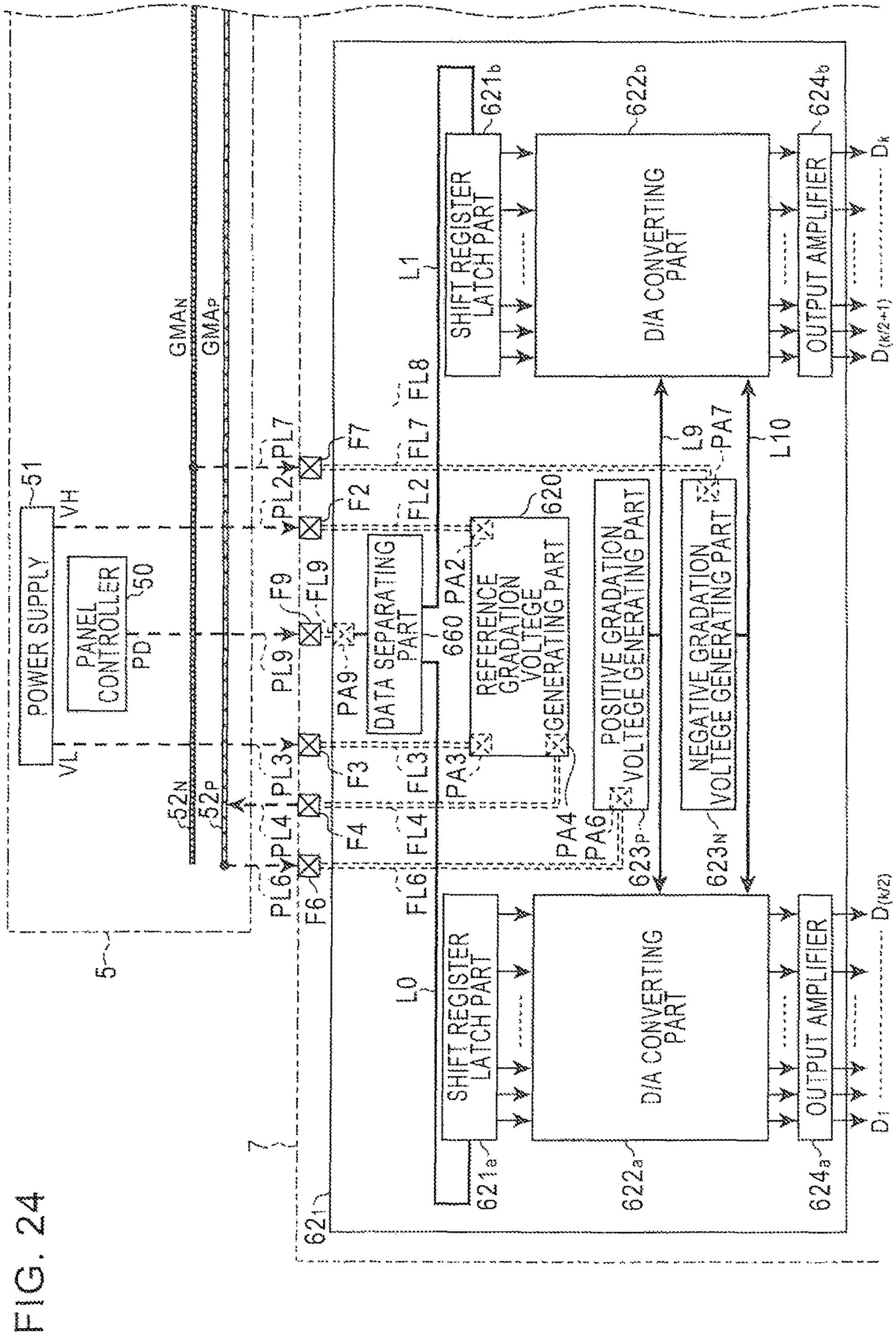
FIG. 24 is a layout chart showing the arrangement of functional blocks and wiring within the chip of the source driver $\mathbf{62}_1$ when the source driver $\mathbf{62}_1$ is formed on a film substrate 7 in the form of COF.

FIG. 24 is a layout chart showing the arrangement of functional blocks and wiring configuration within the chip of a source driver $\mathbf{62}_1$ which is applied when source drivers $\mathbf{62}_1$ and $\mathbf{62}_2$ are formed in the form of COF (Chip On Film) on a film substrate 7 as described above.

In the layout shown in FIG. 24, the locations of the respective functional blocks (620, 621*a*, 621*b*, 622*a*, 622*b*, $\mathbf{623}_P$, $\mathbf{623}_N$, 624*a*, 624*b* and 660) are the same as those shown in FIG. 21. In addition, the layout shown in FIG. 24 is the same as that shown in FIG. 21 in that the data separating part 660 is connected to the respective shift register latch parts 621*a* and 621*b* by the respective metal line groups L0 and L1, and that the gradation voltage generating parts ($\mathbf{623}_P$ and $\mathbf{623}_N$) are connected, through the metal line groups L9 and L10 respectively, to the D/A converting parts 622*a* and 622*b*.

In the layout shown in FIG. 24, however, the power supply pads PA2, PA3 and the pad group PA4 are provided under an area on which the reference gradation voltage generating part 620 is formed, the pad group PA6 is provided under an area on which the positive gradation voltage generating part $\mathbf{623}_P$ is formed, and the pad group PA7 is provided under an area on which the negative gradation voltage generating part $\mathbf{623}_N$ is formed. Specifically, as shown in FIG. 13A, the power supply pads PA2, PA3 and the pad groups PA4, PA6, and PA7 are provided at locations on a bottom surface of the chip 3 corresponding to the areas on which the reference gradation voltage generating part 620, the positive gradation voltage generating parts $623_P$ and the negative gradation voltage generating parts $623_N$ are formed, respectively.

Furthermore, in the layout shown in FIG. 24, pads F2, F3 and the pad groups F4, F6, F7, and F9 are disposed on a peripheral part closer to the control substrate 1 out of four peripheral parts of the film substrate 7. The pad group F9 is disposed in a central position of the peripheral part of the film substrate. The pads F2 and F3 are disposed leftward and rightward adjacent to the pad group F9, respectively. The pad group F7 is disposed at a location adjacent to the pad group F2 farther from the central position than the pad F2. The pad group F4 is disposed at a location adjacent to the pad F3 farther from the central position than the pad F3. The pad group F6 is disposed at a location adjacent to the pad group F4 farther from the central position than the pad group F4.

The power supply pads PA2, PA3 and the pad groups PA4, PA6, PA7 and PA9 formed within the chip are connected to the pads F2, F3 and the pad groups F4, F6, F7 and F9 provided along the peripheral part of the film substrate 7 through the metal lines FL2 and FL3, and metal line groups FL4, FL6, FL7 and FL9 (shown by double dashed lines) formed on a surface of or within the film substrate 7, respectively. Specifically, the pad group PA9 is connected to the pad group F9 through the metal line group FL9. The power supply pad PA2 is connected to the pad F2 through the metal line FL2. The power supply pad PA3 is connected to the pad F3 through the metal line group FL3. The pad group PA4 is connected to the pad group F4 through the metal line group FL4. The pad group PA6 is connected to the pad group F6 through the metal line group FL6. The pad group PA7 is connected to the pad group F7 through the metal line group FL7.

When the layout shown in FIG. 24 is adopted, the pads F2, F3 and pad groups F4, F6, F7 and F9 provided along the peripheral part of the film substrate 7 are connected to the control substrate 1 by an FPC 8 as shown in FIG. 13B.

As described above, in the layout shown in FIG. 24, the power supply pads PA2, PA3 and the pad groups PA4, PA6 and PA7 are provided under the reference gradation voltage generating part 620 and the gradation voltage generating parts for the respective polarities ($623_P$ and $623_N$). These power supply pads PA are connected to the control substrate 5 through the metal wiring (FL2 to FL4, FL6, FL7 and FL9) formed on the film substrate 7 and the metal wiring (PL2 to PL4, PL6, PL7 and PL9) formed within the FPC8. The metal wiring formed within the film substrate 7 and the FPC 8 is made of a material having resistance lower than the metal wiring within the chip, and furthermore, can be made of wiring thicker than the metal wiring within the chip.

Therefore, voltage loss incident to wiring resistance can be more greatly suppressed according to the COF layout as shown in FIG. 24 compared with a case where the COG layout as shown in FIG. 21 is adopted.

Figure 25:
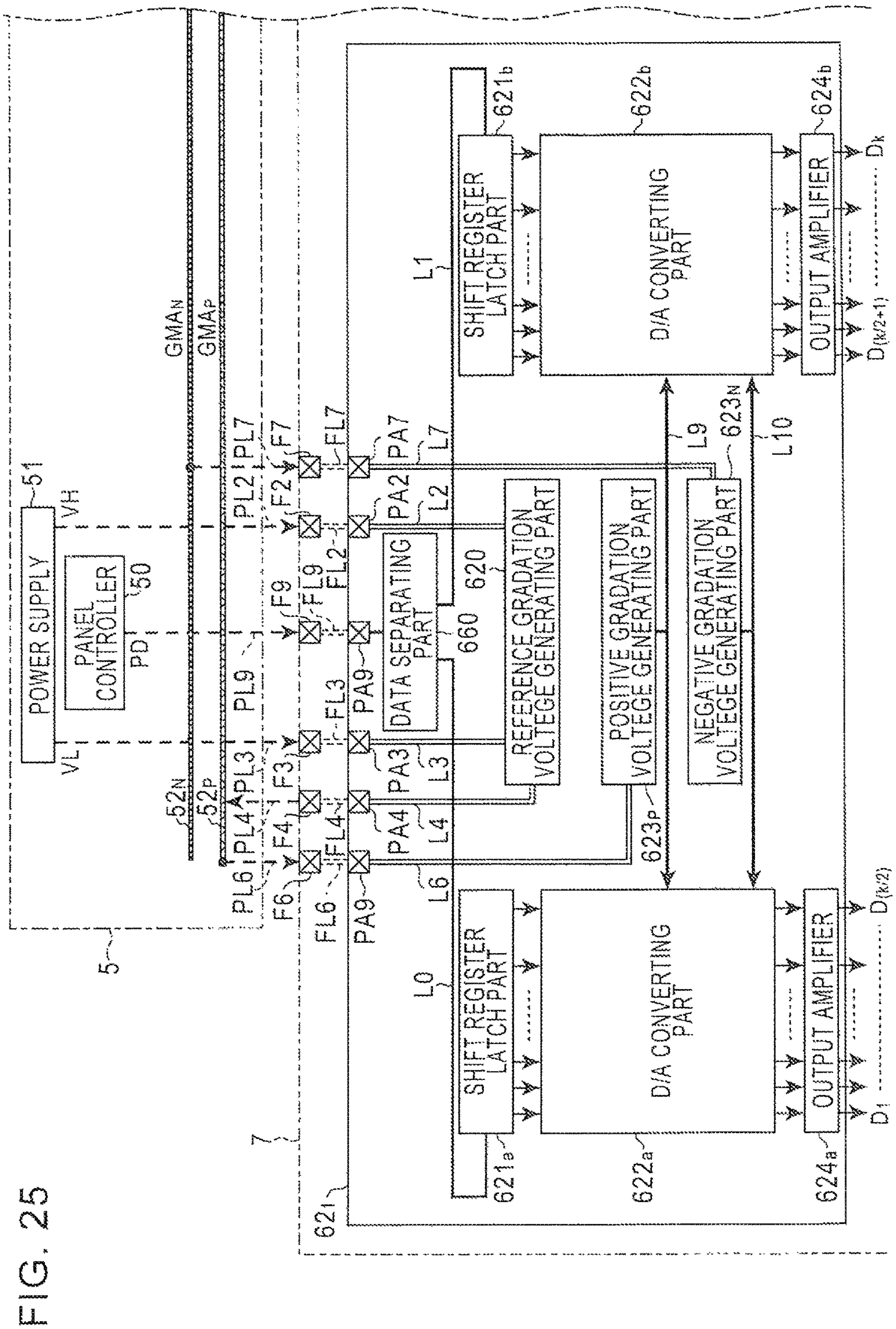
FIG. 25 is a layout chart showing a modification of the arrangement of functional blocks and wiring within the chip shown in FIG. 24.

FIG. 25 is a layout chart showing a modification of the arrangement of functional blocks and wiring configuration within the chip shown in FIG. 24 to be applied where the source drivers $62_1$ and $62_2$ are formed on a film substrate 7 in the form of COF.

In the layout shown in FIG. 25, the arrangement of functional blocks and respective wiring configuration of the metal line groups L0, L1, L9 and L10 within the chip are the same as those shown in FIG. 24. However, the layout shown in FIG. 25 is different from that of FIG. 24 in that the power supply pads PA2, PA3 and the pad groups PA4, PA6, PA7 and PA9 are disposed along a peripheral part of the chip. Furthermore, similarly to the configuration shown in FIG. 24, the pads F2, F3 and the pad groups F4, F6, F7 and F9 are disposed along the peripheral part closer to the control substrate 5 out of the four peripheral parts of the film substrate 7. The respective power supply pads PA3, PA4 and the pad groups PA4, PA6, PA7, PA9 provided on the chip are connected to the pads F2, F3 and the pad groups F4, F6, F7, F9 disposed on the peripheral part of the film substrate 7 through the metal lines FL2, FL3, and metal line groups FL4, FL6, FL7, FL9 (shown by double dashed lines) formed on a surface of or within the film substrate 7. Similarly to the configuration shown in FIG. 24, the pads F2, F3 and the pad groups FL4, FL6, FL7, FL9 provided along the peripheral part of the film substrate 7 are connected the control substrate 5 through the FPC 8 as shown in FIG. 13B.

In the above embodiments, the control substrate 1(5) and the source driver 22 (62) are connected with each other relayed by the FPC 4(8): however, the FPC as a relay means may be eliminated by forming the control substrate 1(5) itself as an FPC.

Figure 26:
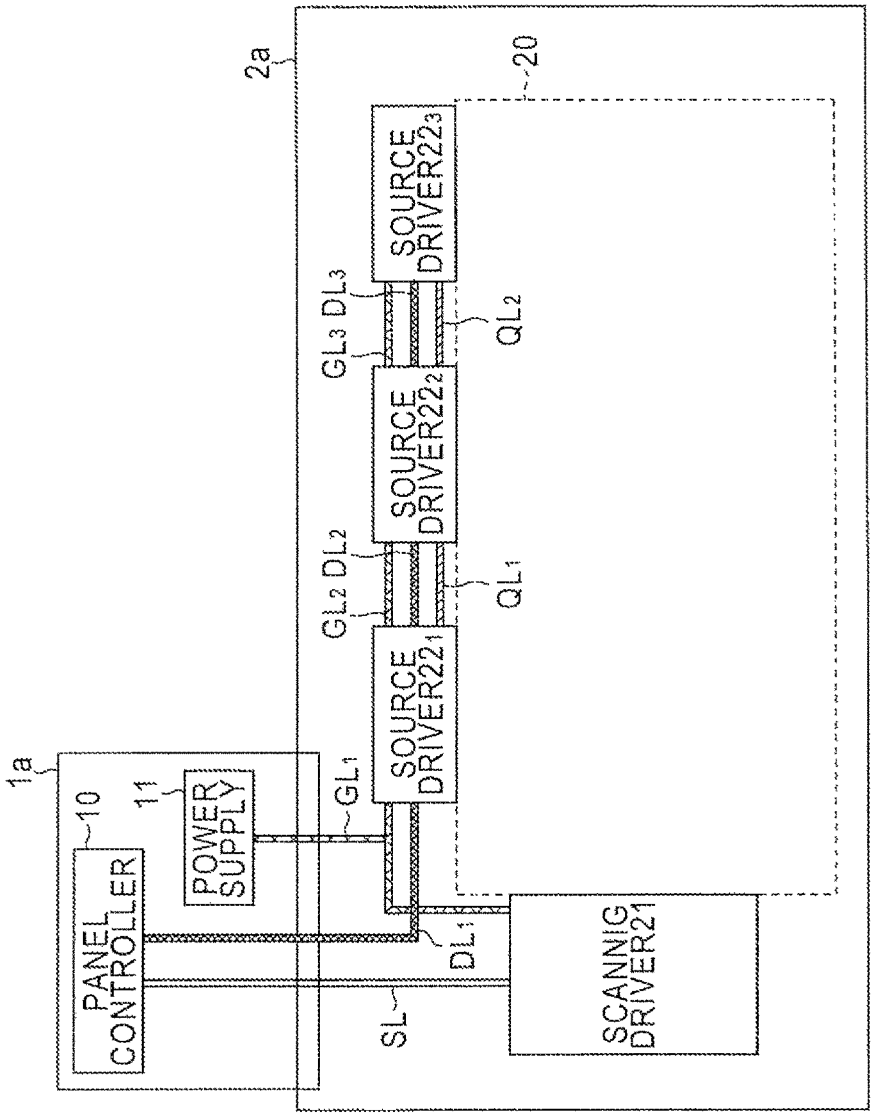
FIG. 26 is a diagram schematically showing an example of wiring arrangement between the control substrate and each of the source drivers.

FIG. 26 is a diagram schematically showing an example of wring arrangement between the control substrate and the respective source drivers made in view of this point.

In FIG. 26, a control substrate 1*a* is a control substrate formed as an FPC having the panel controller 10 and the power supply circuit 11 shown in FIG. 1 thereon. However, the control substrate 1*a* does not have the reference gradation voltage supply line groups ($12_R$, $12_G$, $12_B$) which the control substrate 1 has. The panel controller 10 of the control substrate 1*a* sends a scanning control signal described above to a scanning control line SL while sending pixel data $PD_1$ to $PD_m$ to a data line $DL_1$. The power supply circuit 11 of the control substrate 1*a* sends the power supply voltages VH and VL to a power supply line $GL_1$.

A display panel 2*a* has the same internal configuration as the display panel 2 shown in FIG. 1 in having a display panel 20, source drivers $22_1$ to $22_3$, and a scanning driver 21. However, the scanning control line SL described above and the power supply line $GL_1$ are connected to the scanning driver 21 of the display substrate 2*a*, and the data line $DL_1$ and the power supply line $GL_1$ are connected to the source driver $22_1$ of the display substrate 2*a*. In short, the panel controller 10 and the power supply circuit 11 of the control substrate 1*a* are electrically connected to the source driver $22_1$ and the scanning driver 21 of the display substrate 2*a* without through the FPC 4 described above as relay means.

Here, the source driver $22_1$ sends the pixel data PD supplied through the data line $DL_1$ to a data line $DL_2$ via a terminal different from the terminal to which the data line $DL_1$ is connected. The source driver $22_1$ sends the power supply voltages VH an VL supplied through the power supply line $GL_1$ to a power supply line $GL_2$ via a terminal different from the terminal to which the power supply line $GL_1$ is connected.

The data line $DL_2$ and the power supply line $GL_2$ are connected to the source driver $22_2$. The source driver $22_2$ sends the pixel data PD supplied through the data line $DL_2$ to a data line $DL_3$ via a terminal different from the terminal to which the data line $DL_2$ is connected. The source driver $22_2$ sends the power supply voltages VH an VL supplied through the power supply line $GL_2$ to a power supply line $GL_3$ via a terminal different from the terminal to which the power supply line $GL_2$ is connected. The source drivers $22_1$ and $22_2$ are connected to each other via a reference gradation voltage relay line $QL_1$ for connecting the reference gradation voltage supply line groups ($12_R$, $12_G$, $12_B$) between the chips.

The data line $DL_3$ and the power supply line $GL_3$ are connected to the source driver $22_3$. The source drivers $22_2$ and $22_3$ are connected to each other via a reference gradation voltage relay line $QL_2$ for connecting the reference gradation voltage supply line groups ($12_R$, $12_G$, $12_B$) between the chips.

Due to the wiring arrangement described above, pixel data $PD_1$ to $PD_m$ sent from the panel controller 10 of the control substrate 1*a* are supplied to the respective source drivers $22_1$ to $22_3$ through the data lines $DL_1$ to $DL_3$ and the respective source drivers 22 formed on the display substrate 2*a*. The power supply voltages VH and VL generated in the power supply circuit 11 are supplied to the respective source drivers $22_1$ to $22_3$ through the power supply lines $GL_1$ to $GL_3$ and the respective source drivers 22 formed on the display substrate 2*a*.

Therefore, the wiring arrangement shown in FIG. 26 eliminates the need of the FPC as a relay means when electrically connecting the control substrate and the display substrate, and thus voltage loss incident to wiring resistance can be suppressed.

FIG. 26 shows a wiring arrangement where the source drivers $22_1$ to $22_3$ are provided on the display substrate 2*a*. It is however possible to adopt similar wiring arrangement where the respective source drivers are provided on the film substrate 7 as shown in FIG. 12, 14, 24 or 25.

Figure 27:
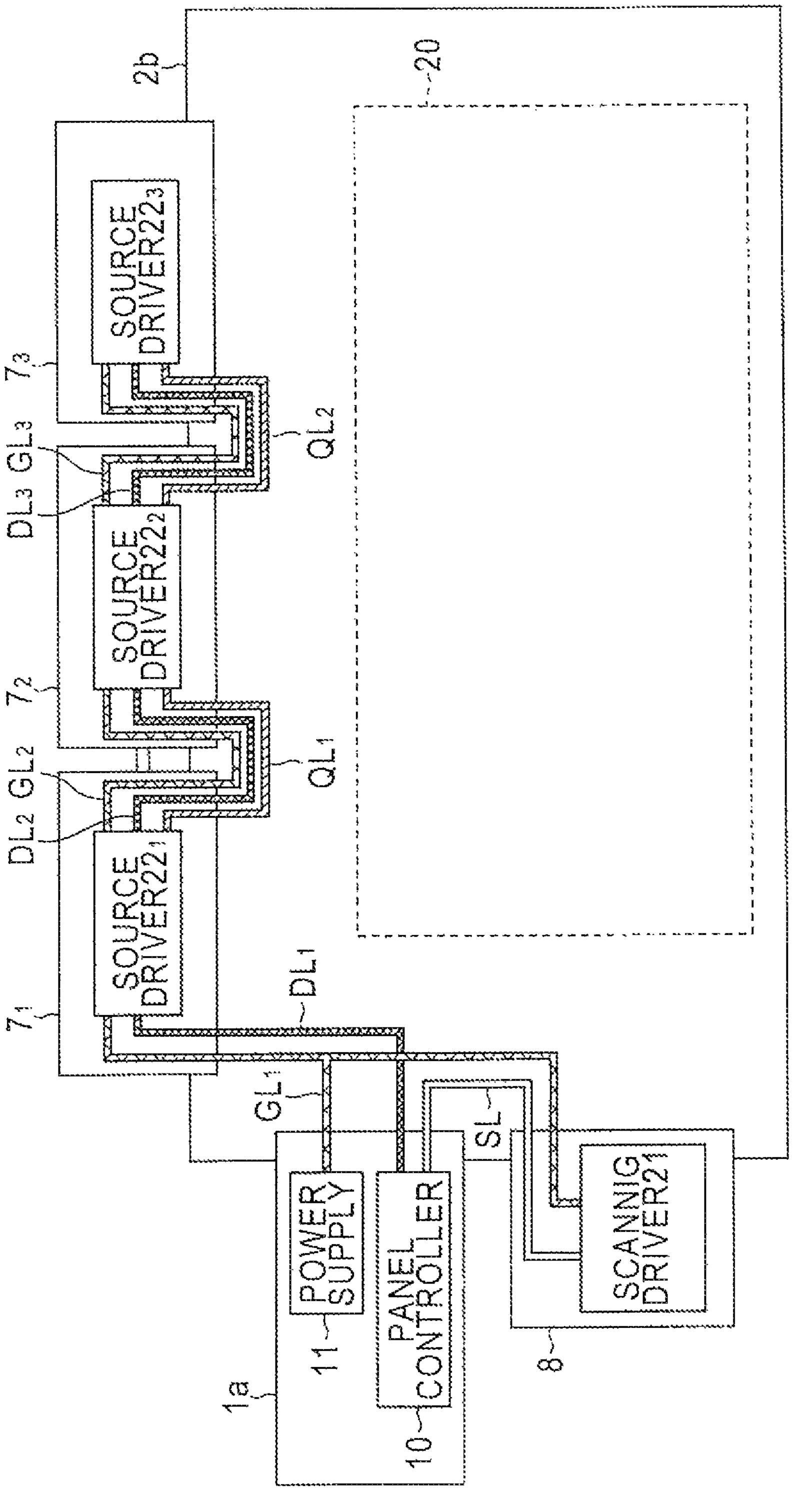
FIG. 27 is a diagram schematically showing another example of wiring arrangement between the control substrate and each of the source drivers.

FIG. 27 is a diagram schematically showing another example of wring arrangement between the control substrate and the respective source drivers made in view of this point.

In the embodiment shown in FIG. 27, film substrates $7_1$ to $7_3$ on which source drivers $22_1$ to $22_3$ are formed respectively, a film substrate 8 on which a scanning driver 21 is formed, and a control substrate 1*a* described above are individually connected to a display substrate 2*b*. The panel controller 10 of the control substrate 1*a* sends a scanning control signal to a scanning control line SL while sending pixel data $PD_1$ to $PD_m$ to a data line $DL_1$. A power supply circuit 11 of the control substrate 1*a* sends the power supply voltages VH and VL to a power supply line $GL_1$.

On the display substrate 2*b*, the display panel 20 shown in FIG. 1 is formed, and following various lines are formed: a power supply line $GL_1$ which connects a power supply circuit 11 with the source driver $22_1$ and the scanning driver 21; a data line $DL_1$ which connects the panel controller 10 and the source driver $22_1$; and the scanning control line SL which connects the panel controller 10 and the scanning driver 21. Similarly to the display substrate 2*a* shown in FIG. 26, the display substrate 2*b* further has a data line $DL_2$ which connects the source drivers $22_1$ and $22_2$, a power supply line $GL_2$, and a reference gradation voltage relay line $QL_1$, a data line $DL_3$ which connects the source drivers $22_2$ and $22_3$, a power supply line $GL_3$, and a reference gradation voltage relay line $QL_2$. However, in the display substrate 2*b*, the power supply circuit 11 and the source drivers $22_1$ are connected with each other through the power supply line $GL_1$ wired through the control substrate 1*a* and the film substrate $7_1$, and the panel controller 10 and the source drivers $22_1$ are connected with each other through the data line $DL_1$. In the display substrate 2*b*, the source drivers $22_1$ and $22_2$ are connected with each other through the data line $DL_2$, the power supply line $GL_2$ and the reference gradation voltage relay line $QL_1$ which are wired through the film substrates $7_1$ and $7_2$. In the display substrate 2*b*, the source drivers $22_2$ and $22_3$ are connected with each other through the data line $DL_3$, the power supply line $GL_3$, and the reference gradation voltage relay line $QL_2$ which are wired through the film substrates $7_2$ and $7_3$.

In the embodiment shown in FIG. 27, the control substrate (la) formed as an FPC is directly connected with the display substrate (2*b*). However, a wiring arrangement may be adopted wherein a control substrate made of paper phenol or a plate member made of glass, epoxy and the like is connected to either one of the film substrates $7_1$ to $7_3$.

Figure 28:
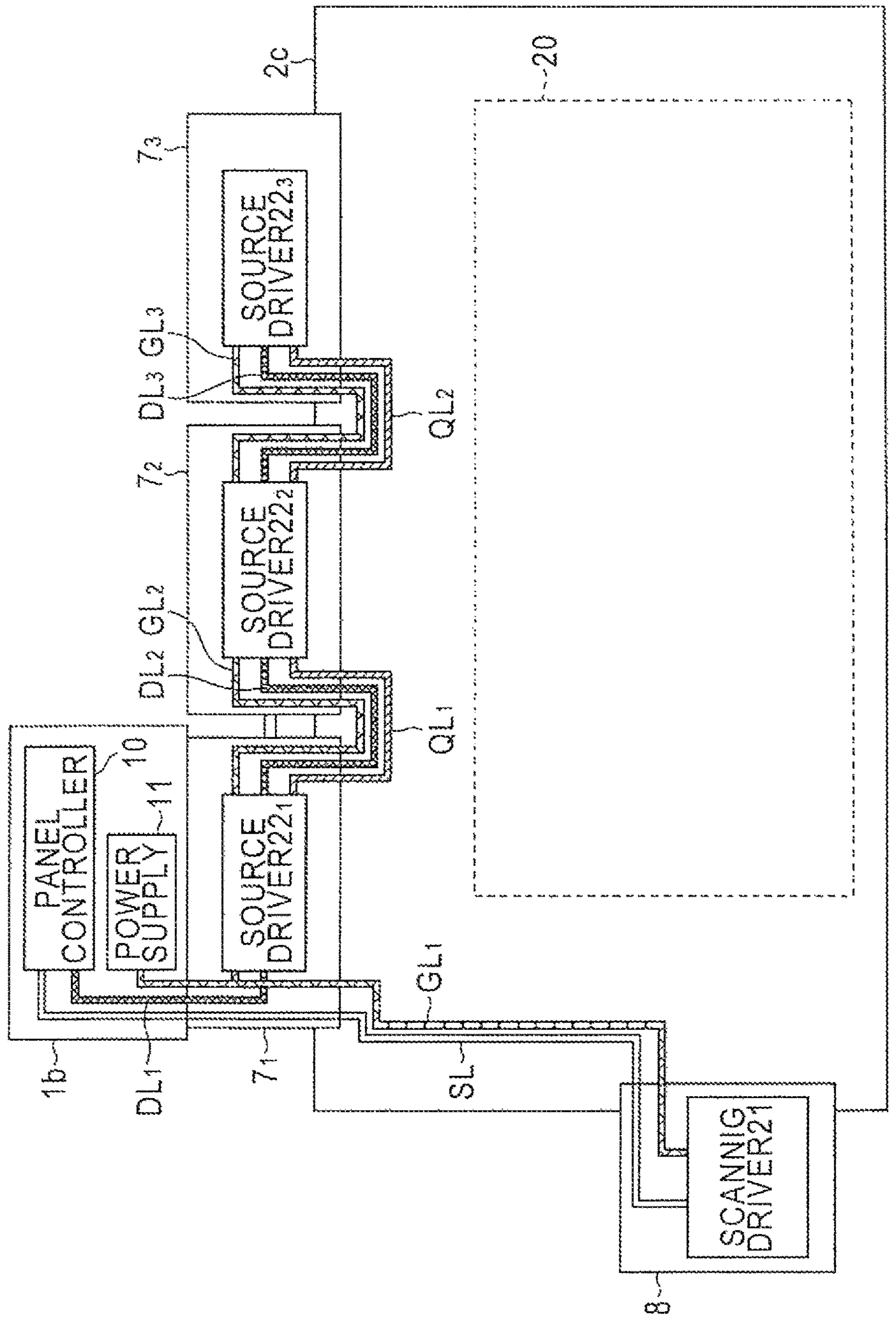
FIG. 28 is a diagram schematically showing a modification of the wiring arrangement shown in FIG. 27.

FIG. 28 is a diagram schematically showing a modification of the wring arrangement shown in FIG. 27 made in view of this point.

The configuration shown in FIG. 28 is the same as that shown in FIG. 27 except that a control substrate 1*b* made of paper phenol, or a plate member of glass, epoxy and the like is adopted in place of the control substrate 1*a* formed as an FPC and the control substrate 1*b* is connected to the film substrate $7_1$. Though the control substrate 1*b* also has the panel controller 10 and the power supply circuit 11 described above formed thereon similarly to the control substrate 1*a*, it does not have the reference gradation voltage supply line groups ($12_R$, $12_G$, $12_B$).

When the configuration shown in FIG. 28 is adopted, the panel controller 10 and the scanning driver 21 are connected with each other through a scanning control line SL wired through the control substrate 1*b*, film substrate $7_1$, and film substrate 8. The panel controller 10 and the source driver $21_1$ are connected with each other through a data line $DL_1$ wired through the control substrate 1*b* and film substrate $7_1$. The power supply circuit 11 and the source driver $21_1$ are connected with each other through a power supply line $GL_1$ wired through the control substrate 1*b* and film substrate $7_1$. Furthermore, the power supply circuit 11 and the scanning driver 21 are connected with each other through the power supply line $GL_1$ wired through the control substrate 1*b*, film substrate $7_1$, and film substrate 8.

In the embodiment shown in FIG. 17, the negative reference gradation voltages $V1_N$ to $V9_N$ are generated by reversing, in the polarity reversing circuit 6203, the polarity of the positive reference gradation voltages $V1_P$ to $V9_P$ generated in the voltage-dividing resistor circuit 6201. However, the negative reference gradation voltages $V1_N$ to $V9_N$ may be directly generated by a voltage dividing resistor circuit without using the polarity reversing circuit 6203.

Figure 29:
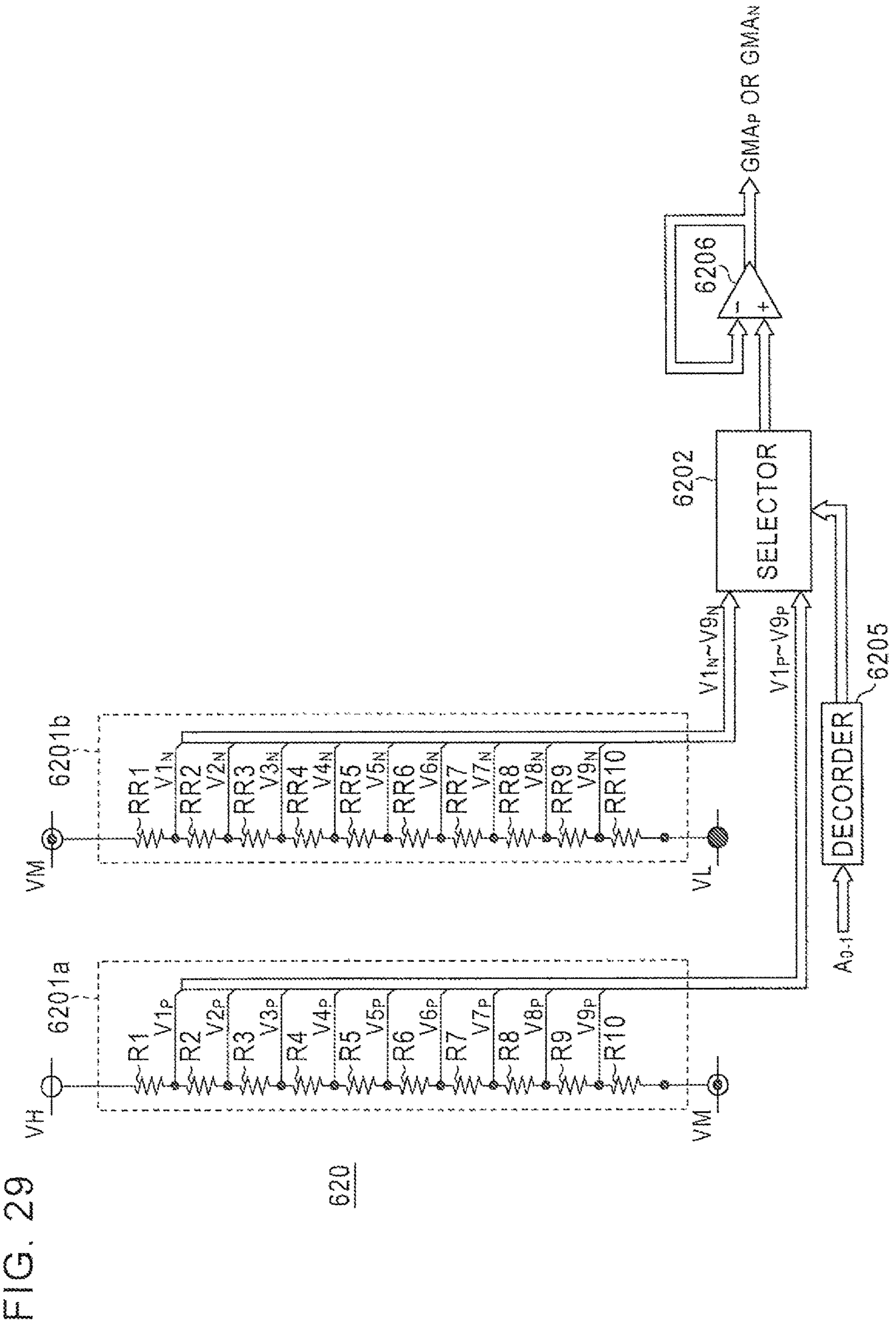
FIG. 29 is a circuit diagram showing another example of the internal configuration of a reference gradation voltage generating part 620.

FIG. 29 is a block diagram showing another example of the internal configuration of the reference gradation voltage generating part 620 made in view of this point.

The configuration shown in FIG. 29 is the same as that shown in FIG. 17 except that a voltage-dividing resistor circuit 6201*a* is adopted in place of the voltage-dividing resistor circuit 6201, and a voltage-dividing resistor circuit 6201*a* is adopted in place of the polarity reversing circuit 6203. Furthermore, with the adoption of the configuration shown in FIG. 29, the power supply circuit 11 is adapted to generate not only the power supply voltage VH having a high potential and the power supply voltage VL having a low potential but also a power supply voltage VM having a voltage intermediate between the voltages VH and VL, and supplies these voltages to the source driver 22.

In FIG. 29, the voltage-dividing resistor circuit 6201*a* sends positive reference gradation voltages $V1_P$ to $V9_P$ having voltages based on gamma characteristic for positive gradation driving from respective connection points between each of resistors R1 to R10 serially connected between the power supply voltages VH and VL, and supplies these voltages to a selector 6202. The voltage-dividing resistor circuit 6201*b* sends negative reference gradation voltages $V1_N$ to $V9_N$ having voltages based on gamma characteristic for negative gradation driving from respective connection points between each of resistors RR1 to RR10 serially connected between the power supply voltages VH and VL, and supplies these voltages to the selector 6202.

In the foregoing part, the preferred embodiments have been explained in detail. There also are problems which are described in the following portions of the description.

When there is a line having relatively high wiring resistance within the respective source driver IC chips, it increases the likelihood of the source driver being judged to be defective in a post-manufacture test due to manufacturing variations. This has resulted in increase in the manufacturing costs.

To solve the above-described problem, an objective is to provide a low power consumption, low heat generation source driver IC chip capable of suppressing increase in manufacturing costs while preventing flicker in images displayed on a display panel.

A source driver IC chip according to a first additional aspect to meet the first additional objective described above is a source driver IC chip formed on a rectangular-shaped substrate and configured to apply a driving pulse having a first gradation voltage based on a first gamma characteristic and a driving pulse having a second gradation voltage based on a second gamma characteristic to each of a plurality of source lines formed on a display panel in response to a video signal. The source driver IC chip includes: a reference gradation voltage generating part configured to generate a reference gradation voltage based on the first gamma characteristic or a reference gradation voltage based on the second gamma characteristic based on a first power supply voltage inputted through a first external terminal and a second power supply voltage inputted through a second external terminal, and output the generated reference gradation voltage through a third external terminal; a first gradation voltage generating part configured to generate the first gradation voltage based on the reference gradation voltage based on the first gamma characteristic inputted through a fourth external terminal; a second gradation voltage generating part configured to generate the second gradation voltage based on the reference gradation voltage based on the second gamma characteristic inputted through a fifth external terminal; a first drive part configured to generate the driving pulse having the first gradation voltage and the driving pulse having the second gradation voltage in response to the video signal to apply the generated driving pulses to a first source line group of the source lines; and a second drive part configured to generate the driving pulse having the first gradation voltage and the driving pulse having the second gradation voltage in response to the video signal to apply the generated driving pulses to a second source line group of the source lines, wherein the first and second drive parts are disposed along one of peripheral parts of the substrate, and the reference gradation voltage generating part is disposed in an intermediate area located between an area where the first drive parts is disposed and an area where the second drive parts is disposed.

Thus, the configuration described above requires only one set of operational amplifiers where normally two sets of operational amplifiers must be mounted within respective source driver IC chips, one for generating reference gradation voltages based on a first gamma characteristic and the other for generating reference gradation voltages based on a second gamma characteristic. Namely, it becomes possible to reduce the size, power consumption and heat generation of a source driver IC chip by amounts corresponding to the number of eliminated ones of amplifiers for the generation of reference gradation voltages.

Furthermore, the configuration described above allows a reference gradation voltage generated in a reference gradation voltage generating part mounted on one of the source driver IC chips to be used commonly by all of the source driver IC chips, and thus, even if offset voltages from the above described operational amplifiers vary among the source driver IC chips, reference gradation voltages will not be affected by this within the respective gamma characteristics. Thus, flicker in the image displayed on the display panel can be prevented.

Furthermore, in the configuration described above, a drive part configured to generate a driving pulse having a first gradation voltage and a driving pulse having a second gradation voltage as described above to apply the generated driving pulses to a plurality of source lines of a display panel is divided into first and second drive parts. The first drive part applies the generated driving pulses to a first source line group of the source lines and the second drive part applies the generated driving pulses to a second source line group of the source lines. The first and second drive parts are disposed along one of peripheral parts of a chip substrate and the reference gradation voltage generating part described above which is configured to generate a reference gradation voltage is disposed in an intermediate area between the first and second drive parts. According to such layout, it becomes possible to shorten the length of the wiring for supplying the power supply voltages inputted through the external terminals of the chip to the reference gradation voltage generating part and the length of the wiring for transmitting the reference gradation voltage generated in the reference gradation voltage generating part to the external terminals, thereby voltage loss incident to wiring resistance can be suppressed. This enables reduction in manufacturing failure rate of the chip due to manufacturing variations.

The following description of the additional aspect corresponds to the detailed explanation of the embodiments having been made with reference to FIG. 1 to FIG. 29 of the accompanying drawings as needed.

A source drive IC chip according to the first additional aspect is a source driver IC chip configured to apply a driving pulse having a first gradation voltage based on a first gamma characteristic and a driving pulse having a second gradation voltage based on a second gamma characteristic to a plurality of source lines of a display panel in response to a video signal, and includes a reference gradation voltage generating part (220, 620), a first gradation voltage generating part (223R, 623P), a second gradation voltage generating part (223G,623N), a first drive part (222*a*, 224*a*, 622*a*, 624*a*) and a second drive part (222*b*, 224*b*, 622*b*, 624*b*). The reference gradation voltage generating part generate a reference gradation voltage (GMA) based on a first or second gamma characteristic of the display panel based on a first power supply voltage (VH) inputted through a first external terminal (PA2) and a second power supply voltage (VL) inputted through a second external terminal (PA3) to output the generated reference gradation voltage through a third external terminal (PA4). The first gradation voltage generating part generates the first gradation voltage described above based on a reference gradation voltage (GMAR, GMAP) based on the first gamma characteristic inputted through a fourth external terminal (PA6). The second gradation voltage generating part generates the second gradation voltage described above based on a reference gradation voltage (GMAC, GMAN) based on the second gamma characteristic inputted through a fifth external terminal (PA7). The first drive part generates a driving pulse having the first gradation voltage and a driving pulse having the second gradation voltage in response to a video signal to apply the generated driving pulses to a first source line group (S1 to Sk/2) of the source lines. The second drive part generates a driving pulse having the first gradation voltage and a driving pulse having the second gradation voltage in response to a video signal to apply the generated driving pulses to a second source line group (S (k/2) to Sk) of the source lines. The first and second drive parts are disposed along one of peripheral parts of the IC chip, and the reference gradation voltage generating part described above is disposed in an intermediate area located between the area where the first drive part is disposed and the area where the second drive part is disposed.

A source driver IC chip according to the first additional aspect is a source driver IC chip formed on a rectangular-shaped substrate, said source driver IC chip being configured to apply a driving pulse having a first gradation voltage based on a first gamma characteristic and a driving pulse having a second gradation voltage based on a second gamma characteristic to each of a plurality of source lines formed on a display panel in response to a video signal, said source driver IC chip comprising:

a reference gradation voltage generating part configured to generate a reference gradation voltage based on said first gamma characteristic or a reference gradation voltage based on said second gamma characteristic based on a first power supply voltage inputted through a first external terminal and a second power supply voltage inputted through a second external terminal, and output the generated reference gradation voltage through a third external terminal;

a first gradation voltage generating part configured to generate said first gradation voltage based on said reference gradation voltage based on said first gamma characteristic inputted through a fourth external terminal;

a second gradation voltage generating part configured to generate said second gradation voltage based on said reference gradation voltage based on said second gamma characteristic inputted through a fifth external terminal;

a first drive part configured to generate said driving pulse having said first gradation voltage and said driving pulse having said second gradation voltage in response to said video signal to apply the generated driving pulses to a first source line group of said source lines; and a second drive part configured to generate said driving pulse having said first gradation voltage and said driving pulse having said second gradation voltage in response to said video signal to apply the generated driving pulses to a second source line group of said source lines, wherein said first and second drive parts are disposed along one of peripheral parts of said substrate, and said reference gradation voltage generating part is disposed in an intermediate area located between an area where said first drive part is disposed and an area where said second drive part is disposed.

A source driver IC chip according to a further aspect features that, in said intermediate area, said first and second gradation voltage generating parts are further disposed and that said forth and fifth external terminals are disposed in respective two areas along a peripheral part located opposite to said one of peripheral parts of said substrate with a central position of said peripheral part located opposite to said one of peripheral parts of said substrate between said two areas.

A source driver IC chip according to a further aspect features that, in said respective two areas along said peripheral part located opposite to said one of peripheral parts of said substrate, said first and second external terminals are further disposed with a central position of said peripheral part located opposite to said one of peripheral parts of said substrate between said two areas, and that said third external terminal is disposed at a location adjacent to said second external terminal on said peripheral part located opposite to said one of peripheral parts of said substrate.

A source driver IC chip according to a further aspect features that, said second external terminal is disposed at a location closer to said central position than said third external terminal.

A source driver IC chip according to a further aspect features that, said third external terminal is disposed at a location closer to said central position than said second external terminal.

A source driver IC chip according to a further aspect features that, said first to third external terminals are disposed along said one of peripheral parts of said substrate.

A source driver IC chip according to a further aspect features that, said first to third external terminals are disposed on or under an area on which said reference gradation voltage generating part is formed.

The source driver IC chip according to the first additional aspect has been described.

To solve the problem described in the introductory part of the description, an objective is to provide a low power consumption, low heat generation video display panel driving device which can prevent flicker in images displayed on a display panel.

A video display panel driving device according to a second additional aspect to meet the second objective described above is a video display panel driving device including a first source driver IC chip and a second source driver IC chip. The first source driver IC chip is configured to apply to a first source line group of a plurality of source lines of a display panel a driving pulse having a gradation voltage corresponding to a brightness level of respective pixels represented by a video signal, and the second source driver IC chip is configured to apply the driving pulse to a second source line group of the source lines. Each of the first and second source driver IC chips includes: a first external terminal for receiving a reference gradation voltage; a first gradation voltage generating part configured to generate a plurality of first gradation voltages having a first gamma characteristic; a second gradation voltage generating part configured to generate a plurality of second gradation voltages having a second gamma characteristic; and a reference gradation voltage generating part configured to generate a reference gradation voltage serving as a basis for said first or second gamma characteristic to output the generated said reference gradation voltage through a second external terminal.

The reference gradation voltage generating part of the first source driver IC chip generates a reference gradation voltage serving as a basis for the first gamma characteristic, outputs the generated reference gradation voltage through the second external terminal, and supplies the outputted reference gradation voltage to the first external terminal of the second source driver IC chip through a first reference gradation voltage supply line. The reference gradation voltage generating part of the second source driver IC chip generates a reference gradation voltage serving as a basis for the second gamma characteristic, outputs the generated reference gradation voltage through the second external terminal, and supplies the outputted reference gradation voltage to the first external terminal of the first source driver IC chip through a second reference gradation voltage supply line. The first and second source driver IC chips generate the first and second gradation voltages based on the reference gradation voltage outputted from the second external terminal and the reference gradation voltage received from the first external terminal.

In the configuration described above, a source driver which applies a driving pulse having a gradation voltage in accordance with a video signal to source lines of a display panel is divided into a plurality of source driver IC chips. A reference gradation voltage based on a first gamma characteristic generated in a first source driver IC chip is outputted, and the outputted reference gradation voltage based on the first gamma characteristic is supplied to the respective first and second source driver IC chips. A reference gradation voltage based on a second gamma characteristic generated in a second source driver IC chip is outputted, and the outputted reference gradation voltage based on the second gamma characteristic is supplied to the respective first and second source driver IC chips. Within the respective source driver IC chips, a first gradation voltage based on the first gamma characteristic is generated based on the reference gradation voltage based on the input first gamma characteristic and a second gradation voltage based on the second gamma characteristic is generated based on the reference gradation voltage based on the input second gamma characteristic.

The following description of the second additional aspect corresponds to the detailed explanation of the embodiments having been made with reference to FIG. 1 to FIG. 29 of the accompanying drawings as needed.

A video display panel driving device according to the second additional aspect is a video display panel driving device including a source driver which is configured to apply to source lines of a display panel a driving pulse having a gradation voltage corresponding to a gradation level represented by a video signal, and which is divided into a plurality of source driver IC chips. The plurality of source driver IC chips include a first source driver IC chip (221, 621) and a second source driver IC chip (222, 622) both having a first gradation voltage generating part (223R, 623P), a second gradation voltage generating part (223G, 623N) and a reference gradation voltage generating part (220, 620). The first gradation voltage generating part generates a first gradation voltage based on a reference gradation voltage inputted through a first external terminal (PA6). The second gradation voltage generating part generates a second gradation voltage based on a reference gradation voltage inputted through a first external terminal (PA7). The reference gradation voltage generating part generates a reference gradation voltage based on a first or second gamma characteristic and output the generated reference gradation voltage through a second external terminal (PA4). The reference gradation voltage generating part mounted on the first source driver IC chip generates only a reference gradation voltage based on a first gamma characteristic (GMAR, GMAP), whereas the reference gradation voltage generating part mounted on the second source driver IC chip generates only a reference gradation voltage based on a second gamma characteristic (GMAG, GMAN).

The second external terminal of the first source driver IC chip is externally connected to the respective first external terminals of the first and second source driver IC chips through a first reference gradation voltage supply line (12R, 52P), and thereby the reference gradation voltage based on the first gamma characteristic generated in the first source driver IC chip is supplied to the first and second source driver IC chips. The second external terminal of the second source driver IC chip is externally connected to the respective first external terminals of the first and second source driver IC chips through a second reference gradation voltage supply line (12G, 52N), and thereby the reference gradation voltage based on the second gamma characteristic generated in the second source driver IC chip is supplied to the second and first source driver IC chips. The first gradation voltage generating parts in the respective first and second source driver IC chips generate a first gradation voltage based on the first gamma characteristic based on the reference gradation voltage based on the first gamma characteristic generated in the first source driver IC chip. The second gradation voltage generating parts in the respective first and second source driver IC chips generate a second gradation voltage on the basis of the second gamma characteristic based on the reference gradation voltage based on the second gamma characteristic generated in the second source driver IC chip.

A video display panel driving device according to the second additional aspect is a video display panel driving device including a first source driver IC chip and a second source driver IC chip, said first source driver IC chip being configured to apply to a first source line group of a plurality of source lines of a display panel a driving pulse having a gradation voltage corresponding to a brightness level of respective pixels represented by a video signal, and said second source driver IC chip being configured to apply said driving pulse to a second source line group of said source lines, wherein each of said first and second source driver IC chips includes:

a first external terminal for receiving a reference gradation voltage;

a first gradation voltage generating part configured to generate a plurality of first gradation voltages having a first gamma characteristic;

a second gradation voltage generating part configured to generate a plurality of second gradation voltages having a second gamma characteristic; and a reference gradation voltage generating part configured to generate a reference gradation voltage serving as a basis for said first or second gamma characteristic to output the generated said reference gradation voltage through a second external terminal, wherein said reference gradation voltage generating part of said first source driver IC chip generates a reference gradation voltage serving as a basis for said first gamma characteristic, outputs said generated reference gradation voltage through said second external terminal, and supplies said reference gradation voltage to said first external terminal of said second source driver IC chip through a first reference gradation voltage supply line, wherein said reference gradation voltage generating part of said second source driver IC chip generates a reference gradation voltage serving as a basis for said second gamma characteristic, outputs said generated reference gradation voltage through said second external terminal, and supplies said reference gradation voltage to said first external terminal of said first source driver IC chip through a second reference gradation voltage supply line, and wherein said first and second source driver IC chips generate said first and second gradation voltages based on said reference gradation voltage outputted from said second external terminal and said reference gradation voltage received from said first external terminal.

A video display panel driving device according to a further aspect features that said first and second gradation voltage generating parts contained in each of said first and second source driver IC chips both generate said first and second gradation voltages based on said reference gradation voltage received through said first external terminal.

A video display panel driving device according to a further aspect features that said first gradation voltage generating part contained in one of said first and second source driver IC chips generates said first gradation voltage based on said reference gradation voltage received through said first external terminal, and said second gradation voltage generating part contained in said one of said first and second source driver IC chips generates said second gradation voltage based on said reference gradation voltage generated in said reference gradation voltage generating part contained in said one of said first and second source driver IC chips, wherein said second gradation voltage generating part contained in the other of said first and second source driver IC chips generates said second gradation voltage based on said reference gradation voltage received through said first external terminal, and said first gradation voltage generating part contained in the other of said first and second source driver IC chips generates said first gradation voltage based on said reference gradation voltage generated in said reference gradation voltage generating part contained in the other of said first and second source driver IC chips.

A video display panel driving device according to a further aspect further comprises a power supply circuit configured to supply at least two power supply voltages of high and low for operating said reference gradation voltage generating part.

A video display panel driving device according to a further aspect features that said first gamma characteristic is a gamma characteristic for positive gradation driving and said second gamma characteristic is a gamma characteristic for negative gradation driving.

A video display panel driving device according a further aspect features that said video display panel driving device further comprising a third source driver IC chip which comprises said reference gradation voltage generating part, and said first and second gradation voltage generating parts, and applies said driving pulse to a third source line group of said source lines, wherein each of said first to third source driver IC chips has power supply terminals formed thereon for receiving said power supply voltages, wherein lines for supplying said power supply voltages are connected to respective ones of said power supply terminals of each of said first and second source driver IC chips, while said power supply terminals of said third source driver IC chip are in an open state.

A video display panel driving device according to a further aspect features that each of said first to third source driver IC chips further comprises a third external terminal for selecting, as said reference gradation voltage to be generated in said reference gradation voltage generating part, either one of said reference gradation voltage serving as a basis for said first gamma characteristic and said reference gradation voltage serving as a basis for said second gamma characteristic.

A video display panel driving device according to a further aspect features that said third external terminal of said third source driver IC chip is in an open state.

A video display panel driving device according to a further aspect features that said video display panel driving device further comprising a third source driver IC chip which comprises said first and second gradation voltage generating parts, and a reference gradation voltage generating part configured to generate a reference gradation voltage based on a third gamma characteristic and output the generated reference gradation voltage through a third external terminal, and applies said driving pulse to a third source line group of said source lines, wherein said first gamma characteristic is a gamma characteristic for red pixels, said second gamma characteristic is a gamma characteristic for green pixels, and said third gamma characteristic is a gamma characteristic for blue pixels.

A video display panel driving device according to a further aspect features that said video display panel driving device further comprising a fourth source driver IC chip which comprises said reference gradation voltage generating part, and said first and second gradation voltage generating parts, and applies said driving pulse to a fourth source line group of said source lines, wherein each of said first to fourth source driver IC chips has power supply terminals formed thereon for receiving said power supply voltages, wherein lines for supplying said power supply voltages are connected to respective ones of said power supply terminals of each of said first to third source driver IC chips, while said power supply terminals of said fourth source driver IC chip are in an open state.

A video display panel driving device according to a further aspect features that each of said first to fourth source driver IC chips further comprises a fourth external terminal for selecting, as said reference gradation voltage to be generated in said reference gradation voltage generating part, either one of said reference gradation voltage serving as a basis for said first gamma characteristic, said reference gradation voltage serving as a basis for said second gamma characteristic and a reference gradation voltage serving as a basis for said third gamma characteristic.

A video display panel driving device according to a further aspect features that said third terminal of said fourth source driver IC chip is in an open state.

The video display panel driving device according to the second additional aspect has been described.

Next, when a source driver is divided into a plurality of source driver ICs, connections need to be made with respect to each of the source driver IC chips, which has caused a problem of high manufacturing costs due to increased manufacturing processes.

To solve the above-described problem, an objective is to provide a low power consumption, low heat generation video display device capable of suppressing increase in manufacturing costs while preventing flicker in images displayed on a display panel.

A video display device according to a third aspect to meet the third objective described above is a video display device including a first substrate having a power supply circuit configured to generate a power supply voltage, a second substrate constituting a display panel, a first source driver IC chip configured to generate a driving pulse having a first and a second gradation voltage corresponding to a brightness level represented by a video signal to apply the generated driving pulse to a first source line group of a plurality of source lines of the display panel, and a second source driver IC chip configured to generate a driving pulse having a first and a second gradation voltage corresponding to a brightness level represented by a video signal to apply the generated driving pulse to a second source line group of the plurality of source lines of the display panel. Each of the first and second source driver IC chips includes: a reference gradation voltage generating part configured to generate a reference gradation voltage based on a first or a second gamma characteristic to output the generated reference gradation voltage through a first external terminal; a first gradation voltage generating part configured to generate said first gradation voltage based on a voltage inputted through a second external terminal; and a second gradation voltage generating part configured to generate said second gradation voltage based on a voltage inputted through a third external terminal. A first wiring layer of the first substrate has a first reference gradation voltage supply line formed thereon, and a second wiring layer of the first substrate has a second reference gradation voltage supply line formed thereon. The first external terminal of the first source driver IC chip, the second external terminal of the first source driver IC chip and the third external terminal of the second source driver IC chip are connected to the first reference gradation voltage supply line. The third external terminal of the first source driver IC chip, the first external terminal of the second source driver IC chip and the second external terminal of the second source driver IC chip are connected to the second reference gradation voltage supply line.

In the configuration described above, a source driver configured to apply a driving pulse having a gradation voltage in accordance with a video signal to source lines of a display panel is divided into a plurality of source driver IC chips. A reference gradation voltage based on a first gamma characteristic generated in a first source driver IC chip is outputted, and the outputted reference gradation voltage based on the first gamma characteristic is supplied to the respective first and second source driver IC chips. Furthermore, a reference gradation voltage based on a second gamma characteristic generated in a second source driver IC chip is outputted, and the outputted reference gradation voltage based on the second gamma characteristic is supplied to the respective first and second source driver IC chips. Within the respective source driver IC chips, the first gradation voltage based on the first gamma characteristic is generated based on the reference gradation voltage based on the externally inputted first gamma characteristic and the second gradation voltage based on the second gamma characteristic is generated based on the reference gradation voltage based on the externally inputted second gamma characteristic.

Thus, the present invention requires only one set of operational amplifiers where normally two sets of operational amplifiers must be mounted within respective source driver IC chips, one for generating reference gradation voltages based on a first gamma characteristic and the other for generating reference gradation voltages based on a second gamma characteristic. Thus, it becomes possible to reduce the size, power consumption and heat generation of a source driver IC chip correspondingly to the number of amplifiers for the generation of reference gradation voltages eliminated from chip.

Furthermore, in the configuration described above, a reference gradation voltage generated in a reference gradation voltage generating part mounted on one of the source driver IC chips is used commonly by all of the source driver IC chips, and thus, even if offset voltages from the above described operational amplifiers vary among the source driver IC chips, reference gradation voltages will not be affected by this within the respective gamma characteristics. Thus, flicker in the images displayed on the display panel can be prevented.

Furthermore, in the video display device described above, the reference gradation voltages generated in and outputted from the respective source driver IC chips are supplied to the respective source driver IC chips through reference gradation voltage supply lines printed on the substrate to extend in a horizontal direction of a screen of the display panel.

Therefore, connection between the respective source driver IC chips and the respective reference gradation voltage supply lines formed on the substrate can be made by an FPC, thus the number of production processes can be reduced and the production costs can be suppressed compared with a case where the respective chips are individually connected with separate lines.

The following description of the third additional aspect corresponds to the detailed explanation of the embodiments having been made with reference to FIG. 1 to FIG. 29 of the accompanying drawings as needed.

A video display device according to the third aspect is a video display device including a first substrate (1, 5) and a second substrate (2, 7). On the second substrate (2, 7) are formed a first source driver IC chip (221, 621) configured to apply driving pulses having first and second gradation voltages corresponding to brightness levels represented by a video signal to a first source line group (S1 to Sk/2) of the display panel, and a second source driver IC chip (222, 622) configured to apply the above-described driving pulses to a second source line group (S(k/2+1) to Sk) of the display panel. The first and second source driver IC chips both have a first gradation voltage generating part (223R, 623P), a second gradation voltage generating part (223G,623N) and a reference gradation voltage generating part (220, 620) as described below. The first gradation voltage generating part generates a reference gradation voltage (GMA) based on the first or second gamma characteristic and outputs the generated reference gradation voltage through the first external terminal (PA4). The first gradation voltage generating part generates a first gradation voltage based on a voltage inputted through a second external terminal (PA6). The second gradation voltage generating part generates a second gradation voltage based on a voltage inputted through a third external terminal (PA7). On a first substrate layer (K1) of the first substrate, the wiring of a first reference gradation voltage supply line (12R, 52P) which extends in a horizontal direction of a screen of the display panel is printed. On a second substrate layer (K2) of the first substrate, the wiring of a second reference gradation voltage supply line (12G, 52N) which extends in the horizontal direction of the screen of the display panel is printed.

In the first source driver IC chip, the first external terminal is connected to the first reference gradation voltage supply line through a first external wiring (PL4), the second external terminal is connected to the first reference gradation voltage supply line through a second external wiring (PL6), and the third external terminal is connected to the second reference gradation voltage supply line through a third external wiring (PL7). On the other hand, in the second source driver IC chip, the first external terminal is connected to the second reference gradation voltage supply line through a first external wiring (PL4), the second external terminal is connected to the second reference gradation voltage supply line through the second external wiring (PL6), and the third external terminal is connected to the first reference gradation voltage supply line through the third external wiring (PL7).

A video display device according to the third additional aspect is a video display device comprising a first substrate having a power supply circuit configured to generate a power supply voltage, a second substrate constituting a display panel, a first source driver IC chip configured to generate a driving pulse having a first and a second gradation voltage corresponding to a brightness level represented by a video signal to apply the generated driving pulse to a first source line group of a plurality of source lines of said display panel, and a second source driver IC chip configured to generate a driving pulse having a first and a second gradation voltage corresponding to a brightness level represented by a video signal to apply the generated driving pulse to a second source line group of said plurality of source lines of said display panel, wherein each of said first and second source driver IC chips includes:

a reference gradation voltage generating part configured to generate a reference gradation voltage based on a first or a second gamma characteristic to output the generated reference gradation voltage through a first external terminal, a first gradation voltage generating part configured to generate said first gradation voltage based on a voltage inputted through a second external terminal; and a second gradation voltage generating part configured to generate said second gradation voltage based on a voltage inputted through a third external terminal, wherein a first wiring layer of said first substrate has a first reference gradation voltage supply line formed thereon, and a second wiring layer of said first substrate has a second reference gradation voltage supply line formed thereon, wherein said first external terminal of said first source driver IC chip, said second external terminal of said first source driver IC chip and said third external terminal of said second source driver IC chip are connected to said first reference gradation voltage supply line, and wherein said third external terminal of said first source driver IC chip, said first external terminal of said second source driver IC chip and said second external terminal of said second source driver IC chip are connected to said second reference gradation voltage supply line.

A video display device according to a further aspect features that each of said first and second source driver IC chips is mounted on said second substrate.

A video display device according to a further aspect features that each of said first and second source driver IC chips is a COF package mounted on a film substrate.

A video display device according to a further aspect features that connection between said respective first and second source driver IC chips and said first substrate is made via an FPC (Flexible Printed Circuit).

A video display device according to claim a further aspect features that said first substrate is a flexible substrate with multi-layer wiring, and connected to said second substrate through a conductive member.

A video display device according to a further aspect features that said substrate further includes a timing controller IC.

This application is based on Japanese Patent Applications Nos. 2012-214492, 2012-214493, 2012-214494, and 2012-214495 which are herein incorporated by reference.

What is claimed is:

1. A video display device comprising a first substrate having a power supply circuit configured to generate a power supply voltage, a second substrate constituting a display panel, a first source driver IC chip configured to generate a driving pulse having a first and a second gradation voltage corresponding to a brightness level represented by a video signal to apply the generated driving pulse to a first source line group of a plurality of source lines of said display panel, and a second source driver IC chip configured to generate a driving pulse having a first and a second gradation voltage corresponding to a brightness level represented by a video signal to apply the generated driving pulse to a second source line group of said plurality of source lines of said display panel, wherein each of said first and second source driver IC chips includes:

a first external terminal;

a second external terminal;

a third external terminal;

a first gradation voltage generating part configured to generate said first gradation voltage based on a voltage inputted through said second external terminal; and a second gradation voltage generating part configured to generate said second gradation voltage based on a voltage inputted through said third external terminal, wherein a first wiring layer of said first substrate has a first reference gradation voltage supply line formed thereon, and a second wiring layer of said first substrate has a second reference gradation voltage supply line formed thereon, wherein said first external terminal of said first source driver IC chip, said second external terminal of said first source driver IC chip and said second external terminal of said second source driver IC chip are connected to said first reference gradation voltage supply line, wherein said third external terminal of said first source driver IC chip, said first external terminal of said second source driver IC chip and said third external terminal of said second source driver IC chip are connected to said second reference gradation voltage supply line, wherein said first source driver IC chip includes a first reference gradation voltage generating part configured to generate a first reference gradation voltage based on a first gamma characteristic to output said first reference gradation voltage through the first terminal, and wherein said second source driver IC chip includes a second reference gradation voltage generating part configured to generate a second reference gradation voltage based on a second gamma characteristic different from said first gamma characteristic to output said second reference gradation voltage through the first terminal.

2. The video display device according to claim 1 that each of said first and second source driver IC chips is mounted on said second substrate.

3. The video display device according to claim 1 that each of said first and second source driver IC chips is a COF package mounted on a film substrate.

4. The video display device according to claim 1 that connection between said respective first and second source driver IC chips and said first substrate is made via an FPC (Flexible Printed Circuit).

5. The video display device according to claim 1 that said first substrate is a flexible substrate with multi-layer wiring, and connected to said second substrate through a conductive member.

6. The video display device according to claim 1 that said first substrate further includes a timing controller IC.

* * * * *